US00RE37668E

(19) United States
(12) Reissued Patent
Etoh

(10) Patent Number: US RE37,668 E
(45) Date of Reissued Patent: Apr. 23, 2002

(54) IMAGE ENCODING/DECODING DEVICE

(75) Inventor: Minoru Etoh, Yokohama (JP)

(73) Assignee: Matsushita Electric Industrial Co., Ltd., Osaka (JP)

(21) Appl. No.: 09/596,366

(22) Filed: Jun. 16, 2000

Related U.S. Patent Documents

Reissue of:
(64) Patent No.: 5,768,438
Issued: Jun. 16, 1998
Appl. No.: 08/545,539
Filed: Oct. 19, 1995

(30) Foreign Application Priority Data

Oct. 19, 1994 (JP) ..... 6-253400
Nov. 2, 1994 (JP) ..... 6-270021
May 30, 1995 (JP) ..... 7-131333

(51) Int. Cl.[7] ..... G06K 9/36
(52) U.S. Cl. ..... 382/251; 382/283
(58) Field of Search ..... 382/173, 181, 382/190, 232, 233, 235, 236, 238, 239, 241, 242–244, 248, 251–253, 257, 260, 274, 275, 283; 345/432; 348/396, 391, 424, 272, 398; 358/430; 386/21, 33, 40

(56) References Cited

U.S. PATENT DOCUMENTS 4,656,500 A * 4/1987 Mori ..... 358/13
4,989,087 A * 1/1991 Pele et al. ..... 358/136
5,214,502 A * 5/1993 Stone et al. ..... 358/13
5,220,647 A * 6/1993 Kumagai ..... 395/132
5,231,487 A * 7/1993 Hurley et al. ..... 358/133
5,311,310 A 5/1994 Jozawa et al. ..... 348/416

FOREIGN PATENT DOCUMENTS

DE 41 38 517 A1 5/1993 ..... G06F/15/66
EP 0 330 455 A2 8/1989 ..... H04N/7/137
EP 0 434 429 A2 6/1991 ..... G06F/15/64
EP 0 480 353 A2 4/1992 ..... H04N/7/133

OTHER PUBLICATIONS

Freeman, "Computer Processing of Line–Drawing Images", Computer Surveys, vol. 5, No. 1, pp. 57–97, Mar. 1974.*

Wang et al., "Layered Representation for Image Sequence Coding", IEEE Int. Conf. Accoustic speech Signal Processing, pp. V221–V224, 1993.*

Wang et al., "Layered Representation for Motion Analysis", IEEE Proc. Computer Vision and Pattern Recongnition, pp. 361–366, 1993.*

(List continued on next page.)

*Primary Examiner*—Bhavesh Mehta
*Assistant Examiner*—Duy M. Dang
(74) *Attorney, Agent, or Firm*—Smith, Gambrell & Russell, LLP

(57) ABSTRACT

For encoding and decoding images of the luminance and the opacity which constitute the layer images divided by the front and back relations in the direction of eyes at high efficiency, the apparatus has a deformation analyzer to take the correlation of plane expressing the luminance plane and the opacity, and extract a deformation parameter which is expressed by the affine transformation and the block movement, and a deformation synthesizer which forms a predicted image from the decoding result of the previous frame and the result of the deformation analyzer, the predicted image being composed of the luminance plane and plane, respective difference being subjected to the error coding, and the output bit stream including the affine transformation parameter, the block movement parameter, the luminance plane error code and the plane error code.

25 Claims, 35 Drawing Sheets

OTHER PUBLICATIONS

Lucas et al., "An Iterative Image Registration Technique with Application for Stereo Vision", Proc. Image understanding Workshop, pp. 121–130, Apr. 1981.*

Haralick et al., "Image Analysis Using Mathematical Morphology", IEEE Transactions on Pattern Analysis and Machine Intelligence, vol. PAMI–9, No. 4, pp. 532–550, Jan. 1987.

Heijmans, "Morphological Image Operators", Academic Press, Inc., pp. 1–17, 1994.

Linde et al. "Algorithm for Vector Qunatizer Design", IEEE Transactions on Communications, vol. COM–28, No. 1, pp. 84–95, Jan. 1980.

Kim, et al., *Visual Communication and Image Processing 91'Visual Communication*, vol. 1605: Part 2, 851–862, Nov. 11, 1991.

Ting, et al., *Society for Information Display*, 24: Part 2, 227–230, May 16, 1993.

Xie, et al., *IEEE Transactions on Communications*, 39:11, 1662–1671, Nov. 1, 1991.

Wang, et al., *IEEE Transactions on Image Processing*, 3:5, 625–638, Sep. 1, 1994.

Wang, et al., *Proceedings of The SPIE*, 2187, 116–127, Feb. 7, 1994.

Musmann, et al., *Signal Processing: Image Communication*, vol. 1, 117–138, Jan. 1, 1989.

Li et al., *Signal Processing*, 38: 1, 45–56, Jul. 1994.

Li, et al., *Image and Multidimensional Signal Processing*, vol. 5, V–357–V–360, Apr. 27, 1993.

* cited by examiner

DIVIDING INTO BLOCKS

TO EXTRACT BLOCKS WHERE THE OPACITY CHANGES AND SUBJECT THEM TO THE CHAIN CODING

WAVEFORM CODING FOR EVERY BLOCK

TO SUBJECT THEM TO THE SMOOTHING PROCESSING AND DISCRETE COSINE TRANSFORM CODING

CODING IN THE CLOCKWISE DIRECTION

FIG. 7(a)

| | | |
|---|---|---|
| +1 | -2 | +1 |
| +1 | -2 | +1 |
| +1 | -2 | +1 |

1/3

VERTICAL EDGE-DETECTING FILTER

FIG. 7(b)

| | | |
|---|---|---|
| +1 | +1 | +1 |
| -2 | -2 | -2 |
| +1 | +1 | +1 |

1/3

HORIZONTAL EDGE-DETECTING FILTER

FIG. 7(c)

| | | |
|---|---|---|
| +1 | | -1 |
| | | |
| -1 | | +1 |

1/4

DIAGONAL EDGE-DETECTING FILTER

FIG. 7(d)

| | | |
|---|---|---|
| | +1 | |
| +1 | +4 | +1 |
| | +1 | |

1/8

LOW-PASS FILTER

MORPHOLOGY OPERATION

DILATION PROCESSING

STRUCTURING ELEMENTS

EROSION PROCESSING

STRUCTURING ELEMENTS

STRUCTURE OF STRUCTURING ELEMENTS

CENTRAL PIXEL

INPUT IMAGE

PREDICTED IMAGE

RESIDUAL IMAGE

MASK PATTERN

RESULT OF IMAGE DECODING

IMAGE ENCODING/DECODING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to image-encoding methods, image-decoding methods, image-processing methods available for encoding, transmitting and accumulating images, especially regional images showing the occupancy region of a projective image of a substance, and devices thereof.

The present invention relates to a motion vector-detecting device used for image encoding and format transformation such as a frame frequency transformation, an image-encoding device for transmitting and recording images with a little encoded volume, and an image-decoding device.

The present invention relates to image-encoding methods for transmitting and accumulating images with a smaller encoded volume, and a device thereof.

2. Related Art of the Invention

Conventionally, when images are synthesized by computer graphics and the like, information relating to the opacity(transparency) of a substance referred to as "a value", other than the luminance of the substance are required.

The $\alpha$ value is determined for every pixel, and the $\alpha$ value of 1 means non-opacity, and the $\alpha$ value of 0 means complete opacity. Namely, when an image of a certain substance is embedded in the background, an image having the $\alpha$ value is necessary. Hereinafter, the images having such $\alpha$ values are referred to as "$\alpha$ plane". Incidentally, the $\alpha$ value has an intermediate value of [0, 1] in the case of substances such as clouds, frosted glass and the like, but in many substances, it tends to have two values of {0, 1}.

Encoding of the $\alpha$ plane may be conducted as direct enumeration of the pixel value, however, when the $\alpha$ plane is composed of two values of {0, 1}, binary image-encoding techniques MH, MR, MMR encoding which are the international standard by CCITT and used conventionally for facsimile and the like may be used. These are named generally as "run-length coding".

In the run-length coding, pixel number of horizontally or horizontally/vertically continuous 0 and 1 is entropy-coded to perform coding efficiently.

Furthermore, taking notice of the contour of substance boundary, positional informations of each pixel constituting the contour may be coded. In the present specification, encoding of the contour of substance boundary is hereinafter referred to as contour encoding.

As typical contour encoding, there can be mentioned a chain enconding (described in H. Freeman: "Computer Processing of line drawing data", Computing Surveys, vol. 6, no. 1, pp. 57–96, (1974)).

In an image having a simple contour of the substance boundary, the value of $\alpha$ plane can be encoded highly efficiently by chain-coding the group of each pixel constituting the contour of the region having the $\alpha$ value of 1.

Considering the visual characteristics affected by the decoded result of $\alpha$ plane, there has been a defect in that in the above-mentioned run-length coding method and the chain coding method and the devices thereof, since encoding/decoding are carried out for every pixel, patterns of {0, 1} are coded/decoded accurately more than required from the view point of human visual characteristics, though it is not necessarily required to decode the pattern of {0,1} accurately, thereby a large coded volume becomes necessary.

Namely, concretely explained, in a general image synthesizing, a processing to mix the image with the color value of the background image referred to as "anti-aliasing" is performed in the vicinity of boundary of the image to be synthesized. This is equal to smooth the $\alpha$ value in the vicinity of the substance boundary, considering the $\alpha$ value to be a gray scale of [0, 1] equivalently. Namely, in the image such as $\alpha$ plane, the space resolution is not so required. Instead, the amplitude resolution becomes necessary in the vicinity of the substance boundary.

In the conventional run-length coding and chain coding, there has been a problem in that since they are reversible coding, the space resolution is more than necessary from the view point of visual characteristics, thereby a large coded volume becomes necessary.

Furthermore, there has been conventionally proposed a method to encode dynamic images by resolving the dynamic image into layer image, as shown in FIG. 31, in order to efficiently perform opacity and recording of the dynamic image, by J. Wang and E. Adelson.

According to the literature "Layered Representation for Image Sequence Coding" by J. Wang and E. Adelson, Proc. IEEE Int. Conf. Acoustic Speech Signal Processing '93, pp. V221–V224, 1993, and "Layered Representation for Motion Analysis" by J. Wang and E. Adelson, Proc. Computer Vision and Pattern Recognition, pp. 361–366, 1993, in which this method is disclosed, the image processings of from (1) to (3) described below are performed:

(1) A region described by the same motion parameter (in the conventional case, affine transformation parameter) is extracted from the dynamic images.

(2) A layer image is formed by superposing the same motion region. Each layer image is expressed by the opacity and luminance for every pixel showing the occupancy of the superposed region.

(3) The upper and lower relations in the eyes' direction between layer images are examined and sequenced.

Here, the affine transformation parameter means the coefficient of a0–a5 shown in Expression 1, when the horizontal/vertical position in the image is assumed to be (x, y), and the horizontal/vertical component of the motion vector is assumed to be (u, v).

$$(u(x,y), v(x,y))=(\alpha_0+\alpha_1x+\alpha_2y,\ \alpha_3+\alpha_4x+\alpha_5y) \quad (1)$$

It is known that the motion of the projective image of a rigid body located with a sufficient distance from a camera can be approximated by the affine transformation parameter. They utilize this to synthesize dynamic images of from several tens to several hundreds of frames, while transforming several kinds of layer images composed of one frame by the affine transformation. The informations required for transmitting and recording this dynamic image are only the image which is the base of deformation relating to each layer image (hereinafter referred to as "template"), the affine transformation parameter, and the upper and lower relations of each layer image, therefore, recording and opacity of the dynamic image can be performed at a very high coding efficiency. In addition, the template is expressed by the opacity and the luminance for every pixel showing the occupancy of the region, for the image synthesis.

in the dynamic image expression by J. Wang and E. Adelson, the projective image deals with only the motion of a rigid body which can be described by the affine transformation. Therefore, their dynamic image expression cannot cope with the case where the motion of the projective image cannot be described by the affine transformation. For example, when a person shown in FIG. 31 conducts a motion of non-rigid body, if the camera-substance distance is small and the nonlinear item of perspective transformation cannot be ignored, it cannot be applied thereto. Moreover, their technique to determine the motion of projective image as the affine transformation parameter is composed of processings of two stages described below:

1. To determine a local motion vector at respective positions on the screen by a method based on the relational expression of space-time gradient of the luminance that the time change of the luminance can be approximated by the space luminance gradient and the inner product of the motion vector (B. Lucas and T. Kanade: "An Iterative Image Registration Technique with Anaplication to Stereo Vision", Proc. Image Understanding Workshop, pp. 121–130, April 1981).
2. To determine the affine transformation parameter by clustering the obtained motion vector.

In the above-mentioned technique, however, it cannot be applied when there is a bit motion in the dynamic image such that the relational expression of the time-space gradient of the luminance cannot be realized. Furthermore, in the two-staged method to predict the affine transformation parameter from the obtained motion vector, there is caused a large prediction error when the motion vector which is the base of the parameter prediction is wrong. The motion vector is indefinite, in the region where there is no luminance change, or in the region composed of one-directional luminance change even if there is a luminance change. In the above-mentioned two-staged prediction technique, a special processing is required for the motion vector in these uncertain regions. Collectively, the following problems 1 and 2 are not solved.

Problem 1: Efficient encoding of images (template) having luminance and opacity having irregular deformation Problem 2: Strong prediction of the affine transformation parameter Furthermore, in the conventional image-encoding methods and the devices thereof, for example, there is a method or a device described in CCITT Recommendation H.261. FIG. 37 is a block diagram showing the structure of the image-encoding device and the decoding device based on this H.261, wherein reference numeral 70 represents an predicted image-forming means, 71 represents a motion vector-detecting means, 72 represents a differential device, 73 represents a waveform-encoding means, 74 represents a waveform-decoding means, 75 represents an adder, 76 represents a frame delay means, 77 represents a Huffman encoder, 78 represents a Huffman decoder, 79 represents a waveform-decoding means, 80 represents an adder, 81 represents a frame delay means and 82 represents an predicted image-forming means.

The image-encoding device and image-decoding device constituted as described above will now be described. First, the motion vector-detecting means 71 detects a motion vector having a minimum sum of the differential absolute value with the decoded image of the previous frame, with respect to the block composed of 16×16 pixels (referred to as a macro block) of the input image. The predicted image-forming means 70 forms an predicted image, by inputting this motion vector and the decoded image of the previous frame. The differential device 72 outputs the differential image of the input image and the predicted image (hereinafter referred to as "prediction error image" or "residual difference image"). The waveform-encoding means 73 subjects this differential image to the discrete cosine transform DCT with regard to blocks composed of 8×8 pixels, to transform the image to the DCT coefficient corresponding to the frequency, and the Huffman encoder 77 subjects this to the variable-length encoding. In order to make the predicted images formed on the encoding side and on the decoding side identical, the waveform-decoding means 75 has the same structure with that of the waveform-decoding means 79 on the decoding side, to perform the inverse discrete cosine transform (IDCT) and reconstruct the prediction error image. The adder 75 adds this to the present predicted image to form the image reconstructed on the decoding side. This image is delayed by the frame delay means 76 and used for the prediction of the next frame. On the decoding side, DCT coefficient is decoded by the inverse Huffman encoder 78, thereafter, respective blocks perform the same movements as those of blocks having the same name on the encoding side, thereby the image is reconstructed.

As described above, in the encoding mode between frames of the encoding device based on H.261, when the current frame image is encoded, the predicted image of the present frame is made as a motion-compensating image from the image of the previous frame by the block correlation method (hereinafter this processing is referred to as "motion compensation"), and the prediction error image of this motion compensation image and the present frame image is encoded. In this encoding device, when the motion-compensating image coincides with the previous frame without error, the volume of the information to be transmitted is only for the motion vector, thereby the image can be transmitted with a small encoded volume. Moreover, even if there is any movement in the dynamic image, when it is a simple movement or a local movement, the difference between the predicted image and the input image becomes small, thereby the dynamic image can be encoded with a smaller encoded volume compared to the case where the encoding within the frame is performed without utilizing the correlation between frames.

By the way, H.261 is a specification of the image-encoding method and device recommended for the purpose of transmitting the image having a size of length and breadth of at least 144×176 pixels or so with the encoded volume of about 64 kilobits/sec. When the image having the same size is tried to encode at an encoding speed of about 20 kilobits/sec., the DCT coefficient has to be quantized roughly. Thereby, the mosquito noise caused in the vicinity of the edge because a strong edge cannot be expressed by the DCT coefficient, and the block noise generated in the block boundary due to the difference between the average luminance levels of DCT blocks are perceived as a visual disturbance.

In H.261, the accuracy against the motion of the motion compensation is performed by the unit of one pixel. And in the recent dynamic image-encoding technique, it is performed with the motion accuracy of ½ pixel. When the motion of a substance takes an integer value of the pixel, the predicted image ideally coincides with the input image without error. Actually, however, it is not generally that the motion takes the integer value of the pixel, and even if the accuracy of motion is increased (for example, to ½ pixel accuracy of ¼ pixel accuracy), the input pixel value is predicted by the interpolation or extrapolation of the pixel value in the vicinity thereof, thereby the prediction error in an impulse form is generated in the vicinity of the edge, even if the motion prediction is correct. This is shown in FIG. 34. Referring to FIG. 34(a), the input image moves horizontally toward the right while being deformed. Referring to FIG. 34(b), the predicted image is square, and the position of "B" on the left edge is wrongly predicted due to the deformation. On the contrary, the portion "A" on the right edge coincides roughly.

In the portion "A", however, though a visually appropriate predicted image is formed by the motion compensation, there is caused a prediction error which is subjected to the residual difference encoding, which becomes the factor to make the whole encoded volume large. Here in the drawings, (g), (h) and (i) express the luminance level cutting the input image, the predicted image and the residual difference image by A–B. This problem cannot be solved even if the waveform encoding means 73 is replaced by other transformation encoding means such as a sub-band coding. Finally, selection of a portion where even if it is not a portion to be actually subjected to the residual difference encoding, it does not cause visual deterioration becomes a problem. This is not limited to H.261, but is a common problem for the methods and devices to encode the residual difference image by forming predicted image based on a certain image. In the example of FIG. 34, the portion "B" obviously requires the residual difference encoding, but in the portion "A", the residual difference encoding is not required under a limited encoding speed.

Then considering said conventional problem of the encoded volume, the object of the present invention is to provide image-encoding methods, image-decoding methods, image-processing methods and the devices thereof which can reduce the encoded volume compared to the conventional methods and devices, while suppressing the visual deterioration by adding the visual characteristics.

That is an image encoding method of the invention comprises:

dividing an image into blocks containing a plurality of pixels;

extracting a block where pixels with different values mingle in the same block, among said divided respective blocks;

obtaining a positional information for identifying a position on said image, of said extracted block and subjecting the positional information to a contour encoding; and subjecting a pixel pattern in the block to be subjected to said contour encoding to a waveform encoding.

Further the present invention intends to solve problems 1 and 2 and to offer devices of image encoding device, decoding device and motion vector detecting device for encoding and decoding efficiently the image of luminance opacity constituting hierarhchical images separated in a direction of the front and back relation on the axis of eyes.

That is an image encoding device of the first invention for solving the problem 1, comprises a predicting means for predicting an image of a luminance and an opacity for an image which is a subject to be encoded, by using a correspondence between partial regions from a reference image composed of a luminance and an opacity and an inputted image series composed of a luminance and an opacity of a substance, a prediction coding means for encoding the correspondence between the partial regions in said predicting means as a prediction code, an error operational means which determines a difference of the luminance and the opacity between said predicted image and said image to be encoded, as the error image, and an error coding means for encoding said error image as an error image code, and wherein said image series are transmitted as the error image code and the prediction code with respect to said reference image.

An image decoding device of the second invention for solving the problem 1, for holding the same reference image as that of the image encoding device according to the first invention and decoding an output of said image encoding device, has;

a prediction code decoding means for decoding the correspondence between the partial regions from the prediction code, a predicted image formation means for forming a predicted image from the reference image, by using the decoded correspondence between said partial regions, an error image decoding means for decoding the error image from the error image code, and an adding means for adding said predicted image and said error image to obtain the image comprising the luminance and the opacity, wherein an image composed of the luminance and an opacity is decoded as the output of said predicted image formation means or said adding means.

An image encoding device of the third invention for solving the problem 1, comprises a superposing means which inputs an image composed of a luminance and an opacity of a substance, classifies a region of the image into a transparent region and an opaque region, and forms a luminance image which is superposed with a luminance information and an opacity information in a manner that a luminance value of the substance is for the opaque region and a value outside the range of the luminance value is for the transparent region, wherein the luminance image superposed with said informatious of the luminance and the opacity is encoded.

An image decoding device of the fourth invention for solving the problem 1, has a dividing means for dividing the luminance image into the opacity image and the luminance image by making a transparent region when the luminance value is a value outside the range, and making a luminance value when it is a value inside the range, wherein the luminance image of the luminance and the opacity is decoded.

An image encoding device of the fifth invention for solving the problem 1, when an original image is layered by a front and back relation on an axis of eyes and an opacity of a region as well as a luminance, comprises;

a layer image encoding means for inputting a plurality of such layer images and encoding the luminance and the opacity as a layer image code for every layer image, and a layer image decoding means for obtaining decoded layer image from an output of said layer image encoding means, a synthesizing means for synthesizing said decoded plural layer image by the front and back relation, the luminance and the opacity thereof, and an error image encoding means for determining an error image between said original image and said synthesized image and encoding the error image, and said original image are transmitted as the plurality of layer image codes and the error code between the original image and the synthesized image.

An image decoding device of the sixth invention for solving the problem 1, when an original image is layered by a front and back relation on an axis of eyes and an opacity of a region as well as a luminance, comprises;

a layer image encoding means for inputting a plurality of such layer images and encoding the luminance and the opacity as a layer image code for every layer image, and a layer image decoding means for obtaining, which has a layer image decoding means for decoding the layer image comprising the luminance, the opacity, and the front and back relation on the axis of eyes by using the plurality of layer image code, a synthesizing means for forming a synthesized image with said layer image, and an error image decoding means for decoding the error image from the error code, and decoding the image by adding the error image to said synthesized image.

An image encoding device of the seventh invention for solving the preoblem 1 comprises;

a reference image encoding means for preliminarily recording and transmitting a plurality of reference images, an approximating means of correspondence between images which approximates a deviation of positions where a luminance is corresponding between an input image and said plurality of reference images, that is deformation, as a polynomial function which makes a position on a screen a variable, and determines an approximation error, and a minimum distortion reference image-selecting means which determines a reference image having small approximation error among said plurality of reference images and outputs an identifier for the selected reference image and a coefficient of the polynomial function, and wherein a plurality of reference images are encoded by said reference image encoding means and the input image are transmitted as at least the identifier for said selected reference image and the coefficient of said polynomial function.

An image decoding device of the eighth invention for solving the problem 1, has a reference image decoding means for reconstructing a plurality of reference images in advance, a reference image-selecting means for selecting from said plurality of reference images a reference image corresponding to the identifier of the reference image contained in the output, and a reference image-deforming means for determining the polynomial function which makes a position on a screen a variable on a basis of the coefficient of the polynomial function contained in the output and for deforming said selected reference image by said polynomial function, and wherein an image is decoded by using the reference image deformed by said reference image-deforming means.

A motion vector-detecting device of the nineth invention for solving the problem 2 comprises;

a superposing means which inputs a plurality of images composed of a luminance and an opacity of a substance, subjects the opacity to the addition/multiplication of a predetermined value to transform a value range, and forms the luminance image superposed with informations of the luminance and the opacity by adding the transformed value to the luminance, and an image analyzing means for obtaining a correspondence of the partial regions of two images by a correlation of a luminance, and wherein the image composed of the luminance and the opacity is transformed to the image composed only of the luminance by said superposing means, and a correspondence of the partial regions is obtained using said image analyzing means between the transformed plural images.

A motion vector-detecting device of the tenth invention for solvig the problem 2, is device for expressing a motion vector at an optional position on a screen as a polynomial function which makes a position a variable, and has an error calculating means for calculating a correspondence of the partial regions of two different images as an error, with respect to a plurality of partial regions obtained by dividing an image, and for determining a deviation between said partial regions which becomes the minimum error and the error value in a vicinity thereof, an error function-calculating means for determining a quadratic error function which makes a deviation a variable from said deviation which becomes said minimum error and the error value in the vicinity thereof, and an optimizing means for expressing a sum total or a partial sum of said quadratic error function with a coefficient of a polynomial function as a variable, and minimizing this sum total of the partial sum with regard to the coefficient, and wherein the motion vector between different images are issued as the coefficient of the polynomial function.

The image-encoding device of the first invention predicts the luminance and the opacity of the image to be encoded from a reference image to form a predicted image, by matching the partial region of the image to be encoded against the reference image (that is, template) by a prediction means. The correspondence of the partial region is output as the prediction signal by a prediction-encoding means. The difference of the luminance and the opacity between the predicted image and the image to be encoded is determined by an error calculation means, and it is encoded by an error-encoding means.

The image-decoding means of the second invention holds the same reference image with that of the image-encoding device of the first invention, and decodes the correspondence between partial regions from the prediction code by a prediction encoding/decoding means and a predicted image-forming means, to form the predicted image from the reference image. On the other hand, the error image is decoded from the error image code by an error image-decoding means. And an adding means adds the predicted image and the error image to obtain the image comprising the luminance and the opacity.

In the above two inventions, on the encoding side, the difference of luminance and opacity between the predicted image and the image to be encoded is determined to be encoded. On the other hand, on the decoding side, the difference of the opacity and luminance is decoded. Thereby, layer image allowing the irregular deformation of template can be encoded.

In the image-encoding device of the third invention, making an image composed of the luminance and the opacity of a substance an input, a superposing means classifies the region into two, that is, a transparent region and an opaque region, and forms a luminance image on which information of the luminance and the opacity are superposed so that the luminance of the substance is taken in the opaque region, and a predetermined value outside the luminance value is taken in the transparent region, thereafter the luminance image is encoded.

In the image-decoding device of the fourth invention, a dividing means divides the image into an opacity image and a luminance image, such that when the luminance value of the decoded image is a predetermined value outside the value, it is a transparent region, and when the luminance value is within the value, it is the luminance value. In the above two inventions, by transforming the two informations of the luminance and the opacity constituting the template into one luminance image, the deformation of the template can be treated as a variation of this luminance image.

In the image-encoding device of the fifth invention, the original image is layered by the back and forth relation on the axis of the eyes and the opacity of the region in addition to the luminance. The image-encoding device encodes the luminance and the opacity as the layer image code by a layer image-encoding means for every layer image, making a plurality of layer images an input. On the other hand, said decoded layer image is determined from the results of the layer image-encoding means by a hierarchical image-decoding means, and synthesizes a plurality of decoded layer images from the back and forth relation, the luminance and the opacity thereof by a synthesizing means. Thereby, the synthesized result of the layer image by the decoding means is predicted. And an error image-encoding means determines the error image between the original image and the predicted synthesized image and encodes the error image.

The image-decoding device of the sixth invention decodes the layer image comprising the luminance, the opacity, and the back and forth relation on the axis of the eyes from a plurality of layer image code by a layer image-decoding means and forms a synthesized image from the layer image by a synthesizing means. And an error image-decoding means decodes the error image from the error code. Lastly, by adding the error image to be synthesized image, the image is decoded. The above two inventions makes the synthesis of the layer image as an predicted image, not as the final result, and transmits and records the difference between this predicted image and the original image, thereby can transmit and record the image without any large visual deterioration, even if the template is irregularly deformed.

In the seventh invention, the template is preliminarily transmitted and recorded by a reference image-encoding means. The correspondence between the input image and a plurality of templates is approximated as a polynomial function of image coordinates, by an approximating means of correspondence between images. A minimum distortion reference image-selecting means determines the reference image having small approximate error among this plurality of templates from said plurality of reference images irrespective of the time order, and outputs the identifier of the selected reference image and the coefficient of the polynomial function. By preparing a plurality of templates, the degree of be approximated by said polynomial function can be improved.

In the image-decoding device of the eighth invention, a plurality of templates are preliminarily constituted by a reference image-decoding means. A reference image-selecting means selects the template corresponding to the identifier of the input template, and a reference image-deforming means deforms the image based on the coefficient of the input polynomial function. Since it is assured that the deformed result of the template by said polynomial function is analogous to the input image on the encoding device side, the image can be decoded with a small encoded volume.

The motion vector-detecting device of the ninth invention, which makes a plurality of images composed of the luminance and the opacity of a substance an input, subjects the opacity to the addition/multiplication of a predetermined value, and if necessary, to the threshold processing by a superposing means to transform the range, and forms a luminance image superposed with information of the luminance and the opacity by adding the transformed value to the luminance. And an image-analyzing means obtains the correspondence of the partial region of two images by the correlation of luminance. Thereby, motion vector detection utilizing the correlation of not only the luminance but also the opacity can be performed.

In a motion vector-detecting device of the tenth invention in which a motion vector at an optional position on the screen is expressed as a polynomial function of image coordinates, an error-calculating means calculates the correspondence of partial regions of two different images as an error, with regard to a plurality of partial regions obtained by dividing the image, and determines the quadratic error function which makes the deviation a variable, from the deviation which becomes said minimum error and the error value in the vicinity thereof. And an optimizing means expresses the sum total or a partial sum of said quadratic error function using the coefficient of said polynomial function as a variable, and minimizes this sum total or the partial sum with regard to the coefficient. In the present invention, a coefficient of the polynomial function of image coordinates (affine transformation is one example thereof) is determined so that the sum total or the partial sum is minimized, from the quadratic error function which makes the deviation a variable, not from the motion vector.

Furthermore, considering said residual difference encoding problem, it is the object of the present invention to solve the problems generally caused in the predicted-image encoding which utilizes the correlation between different images and to provide an image-encoding method and a device thereof, in which the residual difference image is divided into the portion to be subjected to the residual difference encoding and the portion not to be subjected to the residual difference encoding, and even in a limited encoding speed, image encoding can be performed with a little visual disturbance.

That is an image encoding method of the invention comprises: predicting the input image from different images, expressing a region with a large prediction error as a pattern information by the threshold processing of the prediction error, subjecting said pattern information to the morphology processing in which the region is dilated after being eroded and the equivalent processing to form a mask pattern, and performing the encoding of the predicted error image based on said mask pattern.

And an image encoding device of the invention comprises:

a means for predicting an input image from different images, a threshold processing means for expressing a region with a large prediction error as a pattern information, a morphology means for subjecting said pattern information to an equivalent processing to a morphology processing in which a region is dilated after being eroded, thereby to form a mask pattern, and a waveform encoding means for performing encoding for the predicted error image on the basis of said mask pattern.

First, the morphology processing comprising a processing of dilation after erosion will be described. The morphology processing is a processing conducted for a shape of binary image or a planar shape of density of a multi-value image, and this is explained in detail in Literature 1, "Academic Press" (Henk J. A. M. Heijmans: Morphological Image Operators, Academic Press, Inc. 1994) and Literature 2, "IEEE Transaction on Pattern Analysis and Machine Intelligence" (R. M. Harallick, S. R. Sternberg, and X. Zhuang: Image Analysis Using Mathematical Morphology, IEEE Transaction on Pattern Analysis and Machine Intelligence, Vol. PAMMI-9, No. 4, pp. 532–550, July 1987). Here, the action of the present invention will be described with reference to the definition described in Literature 3, Hua-Rong JIN and Idefumi KOBATAKE: "Extraction of Microcalcifications on Mammogram Using Morphological Filter with Multiple Structuring Elements", IEICE Transaction, D2, Vol. J75-D-II, No. 7, pp. 1170–1176, 1992-7.

<<Morphology Operation>>

(1) Binary Morphology Operation

Binary image which is an image to be processed is assumed to be X, and a structuring element (a set of a two-dimensional position vector, domain) is assumed to be B. And one image constituting B is assumed to be expressed by a pixel vector b. At this time, B' (here, ' is used for convenience) is referred to as "symmetry of B", and the following expression is realized:

$$B'=\{-b:b\epsilon B\} \tag{101}$$

Furthermore, Bz shows B which moves in translation by z (z is a two-dimensional vector), and means:

$$B_z=\{b+z:b\epsilon B\} \tag{102}$$

X−b means X which moves in translation by −b. What is the base of the morphology operation is Minskwski difference and sum, which are expressed by symbols (−) and (+). The definition is given by the following expression:

$$X\ominus B=\cap_{b\epsilon B}X_b \tag{103}$$

$$X\oplus B=\cup_{b\epsilon B}X_b \tag{104}$$

Namely, Minkowski difference gives a domain (product set) common to the structuring elements whose all constituent elements are moved in translation by X, and on the contrary, Minkowski sum gives a union thereof. Based on these basic operation, Erosion and Dilation are expressed by the following expression:

Erosion:

$$X\ominus B'=\{Z:B_z\subseteq X\}=_{b\epsilon B}X_{-b} \tag{105}$$

Dilation:

$$X\oplus B'=\{Z:B_z\cap X\neq 0\}=\cup_{b\epsilon B}X_{-b} \tag{106}$$

and Opening and Closing are defined as follows:

Opening:

$$X_B=XoB=(X\ominus B')\oplus B \tag{107}$$

Closing:

$$X^B=X\bullet B=(X\oplus B')\ominus B \tag{108}$$

Examples of Dilation processing and Erosion processing are shown in FIG. 35. The structuring elements are composed of a center pixel and four vicinity in the horizontal and vertical directions thereof.

(2) Gray-Scale Morphology Operation

When it is assumed that f(x) is luminance value, F is a defined region, g is a function of structuring elements (scalar value), and G is the defined region thereof (domain), it is defined that:

Erosion:

Erosion: (109)

$$(f\ominus g)(x)=\min_{Z\in G,X+Z\in F}\{f(x+z)-g(z)\}$$

Dilation: (110)

$$(f\oplus g)(x)=\max_{Z\in G,X+Z\in F}\{f(x-z)-g(z)\}$$

Opening: (111)

$$(f\circ g)(x)=(f\ominus g)\oplus g$$

Closing: (112)

$$(f\bullet g)(x)=(f\oplus g)\ominus g$$

If it is a pattern in which the pixel to be processed is two-valued, the dilation and erosion by the gray-scale morphology operation will have the same action with those shown in FIG. 35.

In the image-encoding method of the present invention, the input image is first predicted from different images, and subjected to the threshold processing and a region having a large residual difference is extracted as a pattern information. Thereafter, the pattern information is subjected to the dilation processing after the erosion processing of said morphology operation, that is, the opening processing, to be deformed. Thereby, in the conventional example shown in FIG. 34, as shown in (e) and (k) as the morphology operation results, the region in the form of impulse in the vicinity of the edge is eliminated. By using this as a mask pattern to encode the residual difference image, high efficient encoding can be performed, ignoring a region where the residual difference encoding is not required. Similarly in the image-encoding device of the present invention, the prediction means predicts the input image from different images, and the threshold processing means outputs the region having a large residual difference as a pattern information. Said morphology means subjects this pattern information to an equivalent processing as said opening processing by the morphology means, and outputs a mask pattern in which the region in the form of impulse is eliminated. The waveform encoding means encodes based on this mask pattern, ignoring the region where it does not cause a large visual deterioration even if the residual difference encoding is not performed.

BRIEF DESCRIPTION OF DRAWINGS

FIG. 7(a)–(d) are diagrams showing the characteristics of various kinds of filters of the other embodiment.

DESCRIPTION OF REFERENCE NUMERALS

Figure 1:
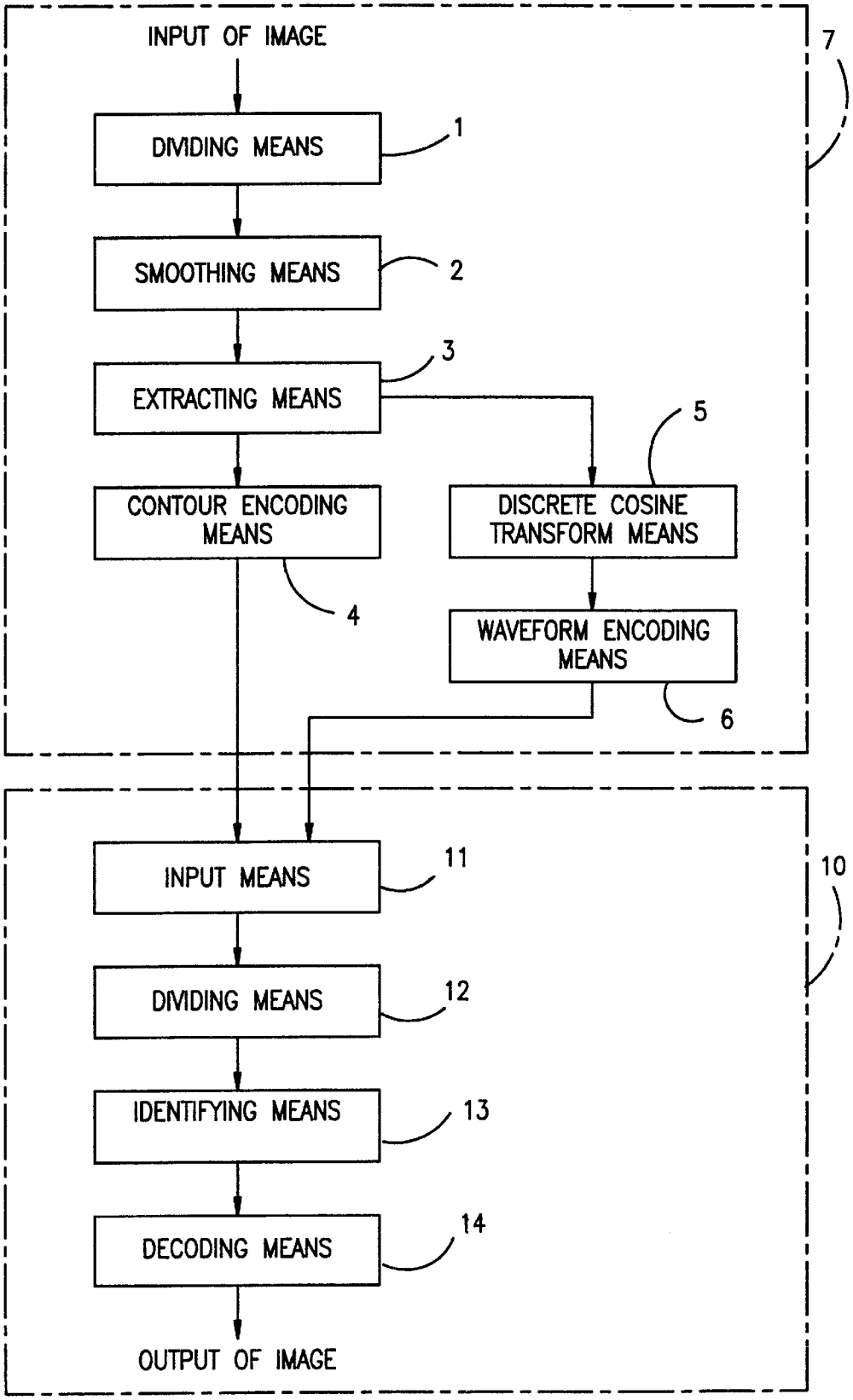
FIG. 1 is a block diagram showing the structure of the image-encoding device and the image-decoding device of one embodiment of the present invention.

7 represents an image-encoding device, 1 and 12 represent dividing means, 2 represents a smoothing means, 3 represents an extracting means, 4 represents a contour-encoding means, 5 represents a discrete cosine transform means, 6 represents a waveform-encoding means, 10 represents an image-decoding device, 11 represents an input means, 13 represents an identifying means, 14 represents an decoding means, 16 represents a code book, 17 represents a selection means, 18 represents a transmission means, 26 represents a vertical edge-detecting filter, 27 represents a horizontal edge-detecting filter, 28 represents an oblique edge-detecting filter, 29 represents a low-pass filter, 30 represents a singularity-calculating section, and 31 represents a mixer.

101 and 102 represent layer image encoders, 103 represents a multiplexer, 104 represents a demultiplexer, 105 and 106 represent layer image decoders, 107 represents a layer image synthesizer, 201 represents a deformation analyzer, 202 represents a deformation synthesizer, 203 and 204 represent differential devices, 205 represents a prediction code encoder, 206 represents a luminance plane error encoder, 207 represents an α plane error encoder, 208 represents a luminance plane error decoder, 109 represents an α plane error decoder, 210 represents a multiplexer, 211 and 212 represent adders, 313 and 214 represent frame delay devices, 301 represents a demultiplexer, 302 represents a luminance plane error decoder, 303 represents an α plane error decoder, 304 represents a prediction code decoder, 305 represents a deformation synthesizer, 306 and 307 represents adders, 308 and 309 represent frame delay devices, 401 and 402 represent luminance image memories, 403 and 404 represent α image memories, 405 and 406 represent luminance/α superposing sections, 407 represents an affine transformation section, 408 represents an affine transformation coefficient operational section, 409 represents an affine transformation image memory, 410 represents a block correlation operational section, 411 represents a multiplexer, 501 represents a block correlation operational section, 502 represents a SAD surface approximation section, 503 represents an error function parameter-storing memory, 504 represents an affine transformation parameter operation section, 601 represents a luminance image memory, 602 represents an α image memory, 603 represents a demultiplexer, 604 and 605 represent affine transformation sections, 606 and 607 represent affine transformation image memories, 608 and 609 represent image block-deforming section, 701 represents a DCT operational section, 702 represents a quantization section, 703 represents a variable-length coding section, 801 represents a Haar transformation operational section, 802 represents a quantization section, 803 represents a variable-length coding section, 901 represents a variable-length decoding section, 902 represents an inverse-quantization section, 903 represents an inverse DCT operational section, 1001 represents a variable-length decoding section, 1002 represents an inverse-quantization section, 1003 represents an inverse Haar transformation operational section, 1301 represents a deformation analyzer, 1302 represents a deformation synthesizer, 1303 represents a luminance/α dividing section, 1304 represents a luminance/α superposing section, 1305 represents a frame delay device, 1306 represents a differential device, 1307 represents an adder, 1308 represents a luminance/α superposing error encoder, 1309 represents a prediction code encoder, 1310 represents a luminance/α superposing error encoder, 1311 represents a multiplexer, 1401 represents a demultiplexer, 1402 represents a luminance/α superposing error decoder, 1403 represents a prediction code decoder, 1404 represents an adder, 1405 represents a deformation synthesizer, 1406 represents a frame delay device, 1407 represents a luminance/α dividing section, 1501 represents a luminance/α memory, 1502 represents a demultiplexer, 1503 represents an affine transformation section, 1504 represents an affine transformation image memory, 1505 represents an image block deforming section, 1506 represents a domain boundary judging section, 1602 and 1609 represent switches, 1603 represents a DCT operational section, 1604 represents a quantization section, 1605 represents a variable-length coding section, 1606 represents a Haar transformation operational section, 1607 represents a quantization section, 1608 represents a variable-length coding section, 1610 represents a multiplexer, 1701 represents a demultiplexer, 1702 represents a switching control section, 1703 and 1710 represent switches, 1704 represents a variable-length decoding section, 1705 represents an inverse quantization section, 1706 represents an inverse DCT operational section, 1707 represents a variable-length decoding section, 1708 represents an inverse quantization section, 1709 represents an inverse Haar transformation operational section, 1801 represents a foreground memory, 1802 represents a background memory, 1803 represents a foreground separator, 1804 and 1805 represent layer image encoders, 1806 represents a multiplexer, 1807 represents a demultiplexer, 1808 and 1809 represent layer image decoders, 1810 represents a layer image synthesizer, 1811 represents a predicted image memory, 1812 represents a differential device, 1813 represents a luminance plane error encoder, 1814 represents a multiplexer, 1911 and 1912 represent demultiplexers, 1913 and 1914 represent layer image decoders, 1915 represents a layer image synthesizer, 1916 represents a predicted image memory, 1917 represents a luminance plane error decoder, 1918 represents an adder, 2001 represents an affine transformation coefficient operational section, 2002 represents a luminance/α dividing section, 2003 represents a template storing memory, 2004 represents a affine distance-shortest template-determination section, 2005 represents a prediction code encoder, 2006 represents a multiplexer, 2101 represents a demultiplexer, 2102 represents a prediction code encoder, 2103 represents a template reading circuit, 2104 represents a storing memory, 2105 represents an affine transformation section, and 2106 represents a luminance/α superposing section.

48 and 64 represent predicted image-forming means, 49 represents a motion vector-detecting means, 50 represents a subtracter, 51 represents a threshold processing means, 52 represents a morphology operation means, 53 represents a smoothing filter, 54 represents a mask processing means, 55 represents a waveform coding means, 56 and 61 represent a waveform decoding means, 57 and 62 represent adders, 58 and 63 represent frame delay means, 59 represents a Huffman encoder, and 60 represents a Huffman decoder.

PREFERRED EMBODIMENTS OF THE INVENTION

[I]

The embodiments according to the present invention will now be described with reference to the accompanying drawings.

FIG. 1 is a block diagram showing the structure of the image-encoding device and the image-decoding device of one embodiment of the present invention, and the structure of the present embodiment will be described with reference to this drawing.

Referring to FIG. 1, the dividing means 1 inputs the image to be coded, and divides the input image into blocks comprising pixel numbers of 8×8. The smoothing means 2 is to transform α value 1 as a pixel value to 255 and α value 0 to 0 to subject the image to the smoothing processing, and to form a regional image having an intermediate value.

The extracting means 3 is a means to extract a block where pixels having different α value in the same block are mingled, among respective blocks divided by the dividing means 1.

The contour-encoding means 4 is a means to obtain a positional information for identifying the position on the original image of the block extracted by the extracting means 3, and to subject the positional information to the chain encoding.

The discrete cosine transform means 5 is a means to obtain the DCT coefficient by conducting the discrete cosine transform (hereinafter referred to as DCT) for the pixel pattern in the block extracted by the extracting means 2, and the waveform-encoding means 6 is a means to perform variable-length encoding for the DCT coefficient obtained by the discrete cosine transform means 5. The image-encoding device 7 is composed of respective means described above.

Furthermore, in the drawing, the input means 11 is to input the contour encoding data which is the output data from the contour encoding means of the image-encoding device 7, and the variable-length encoding data which is the output data from the waveform encoding means 6, and the dividing means 12 is to divide the image to be decoded into blocks comprising pixel numbers of 8×8 as in the dividing means 1. The identifying means 13 is to decode the contour encoding data input to the input means 11 among blocks divided by the dividing means 12, and as a result, to identify the block where pixels having different values are mingled, and the decoding means 14 is a means to decode the variable-length encoding data corresponding to the pixel pattern in the block identified by the identifying means 13. The image-decoding device 10 is composed of respective means of from the input means 11 to the decoding means 14 described above.

Figure 2A:
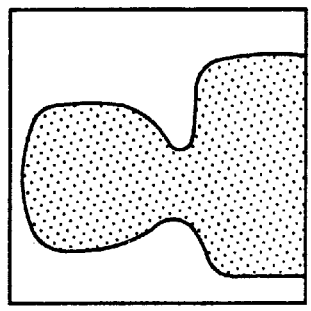
FIG. 2(a) is a view showing the image to be encoded of said embodiment.
Figure 2B:
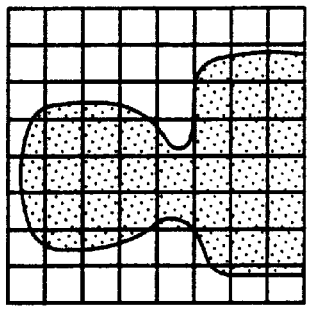
FIG. 2(b) is a view showing the image divided into blocks of said embodiment.
Figure 2C:
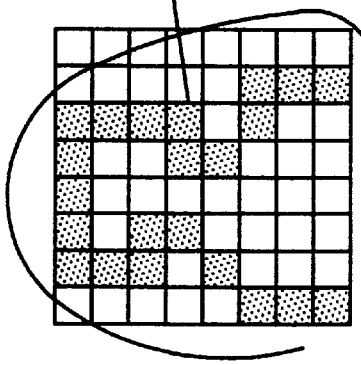
FIG. 2(c) is a view showing a block extracted as a subject to be chain-encoded and waveform-encoded of said embodiment.

In the image-encoding device and the image-decoding device of the present embodiment constituted as described above, one embodiment of the image-encoding methods and the image-decoding methods of the present invention will be described with reference to FIG. 1 and FIG. 2, while describing the actions thereof. FIGS. 2(a) to (c) are views illustrating the process of the encoding processing when a human image is embedded into the background image. FIG. 2(a) shows an image to be coded, and FIG. 2(b) shows the image divided into blocks, and FIG. 2(c) shows blocks extracted as subjects to be chain-coded and waveform-coded (regions painted black in the drawing).

Here, the image to be coded is an image of 0/1. Furthermore, $\alpha=1$ is assumed to express the existence region of a substance (in the present embodiment, corresponds to the human image), and $\alpha=0$ is assumed to express the opacity region where any substance does not exist.

The dividing means 1 obtains the image input (see FIG. 2(a)), and divides the image into blocks comprising pixel numbers of 8×8 (see FIG. 2(b)).

Then, $\alpha$ value 1 is transformed to 255 and $\alpha$ value 0 is transformed to 0 by the smoothing means 2 to subject the image to the smoothing processing. Thereby, a regional image having an intermediate value is constituted.

Here, blocks are divided into three types by the extracting means 3 as described below.

Namely, blocks in which all $\alpha$ values within the block are composed of 255 are blocks in the inside region of the substance. And blocks in which $\alpha$ values of from 0 to 255 are mingled within the block are blocks in the boundary region of the substance. And, blocks in which all $\alpha$ values within the block are composed of 0 are blocks in the outside region of the substance.

From blocks divided as described above, the extracting means 3 searches the regions where the $\alpha$ values of from 0 to 255 are mingled within the block toward inside in the clockwise direction in order to extract blocks where all the $\alpha$ values within the block are composed of 255, and extracts the applicable blocks.

The contour encoding means subjects the block positions as the positional information for identifying the positions of each block thus extracted, (x0, y0), (x1, y1), , , , (xN−1, yN−1) to the curvature chain coding.

Blocks in the boundary region also are subjected to the DCT (discrete cosine transform), and the DCT coefficient is subjected to the variable-length coding by the waveform coding means 6.

Figure 3:
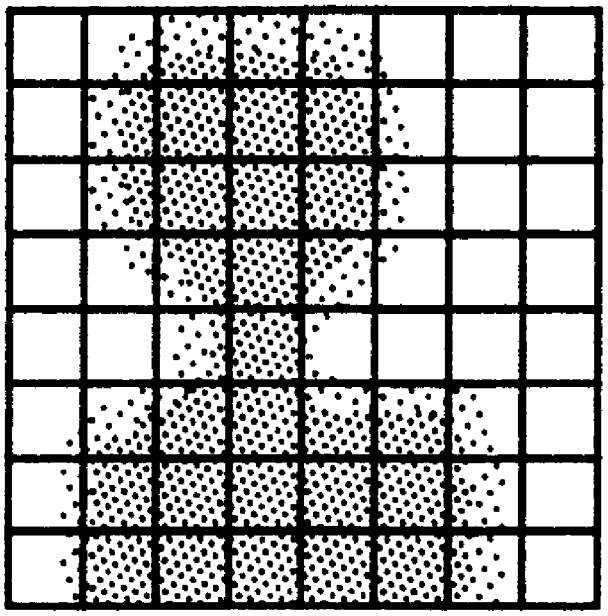
FIG. 3 is a view representing the smoothed image of said embodiment in which the boundary portion of a substance has an intermediate value of [0, 1], that is, a α value of from 0 to 255.

The result of the chain coding thus obtained and the DCT coefficient are output to the image-decoding device 10. By performing the chain coding in the clockwise direction, the blocks in the inside region and blocks in the outside region can be identified. Incidentally, FIGS. 2(a)–(c) show a case where the order of processings is slightly different from the above description and a processing to extract predetermined blocks is conducted before the smoothing processing, however, it is a matter of course that predetermined blocks may be extracted after being subjected to the smoothing processing as described above (see FIG. 3). FIG. 3 is a view showing the smoothed image in which the boundary portions of the substance have an intermediate value of [0, 1], that is, $\alpha$ values of from 0 to 255.

The action of the decoding processing is inverse of the action described above.

Namely, the data output from the image-encoding device 7 side is input to the input means 11, and the dividing means 12 divides the image to be decoded into blocks having pixel numbers of 8×8. The identifying means 13 decodes the chain coding data obtained by the input means 11. Thereby, the identifying means 13 classifies blocks into three types, that is, blocks which are encircled by the clockwise rotation are blocks in the inside region, blocks which are not encircled thereby are blocks in the outside region, and blocks in the boundary region, to identify the blocks in the boundary region. The decoding means 14 decodes the variable-length coding data for the blocks in the boundary region, inversely transforms the DCT coefficient, and outputs the image data shown in FIG. 3.

As described above, the present embodiment relates to the image-encoding device which transmits and accumulates the input image, especially the regional image showing the occupancy region of the projective image of a substance with a little coding volume, by the coding method which combines the chain coding and the waveform coding.

Namely, the image is divided into blocks to form an image with a low resolution equivalently which makes blocks comprising different pixel values the boundary, and blocks in this boundary are subjected to the contour coding. And, the pixel pattern within the block is subjected to the waveform coding. Therefore, when it is assumed that waveform coding within the block is a non-reversible coding, it exerts the effect that images having no visual deterioration can be coded with a few contour codes. Furthermore, such an effect is particularly successful when the image is animation or the like.

Thus, in the coding of $\alpha$ plane, even if it is a non-reversible coding, the space resolution is adequate in the range that there is no visual deterioration, and on the contrary, in the vicinity of the regional boundary, the coding devices and decoding devices having excellent amplitude resolution compared to the coding, and the coding methods and decoding methods using the same are quite effective.

Figure 4:
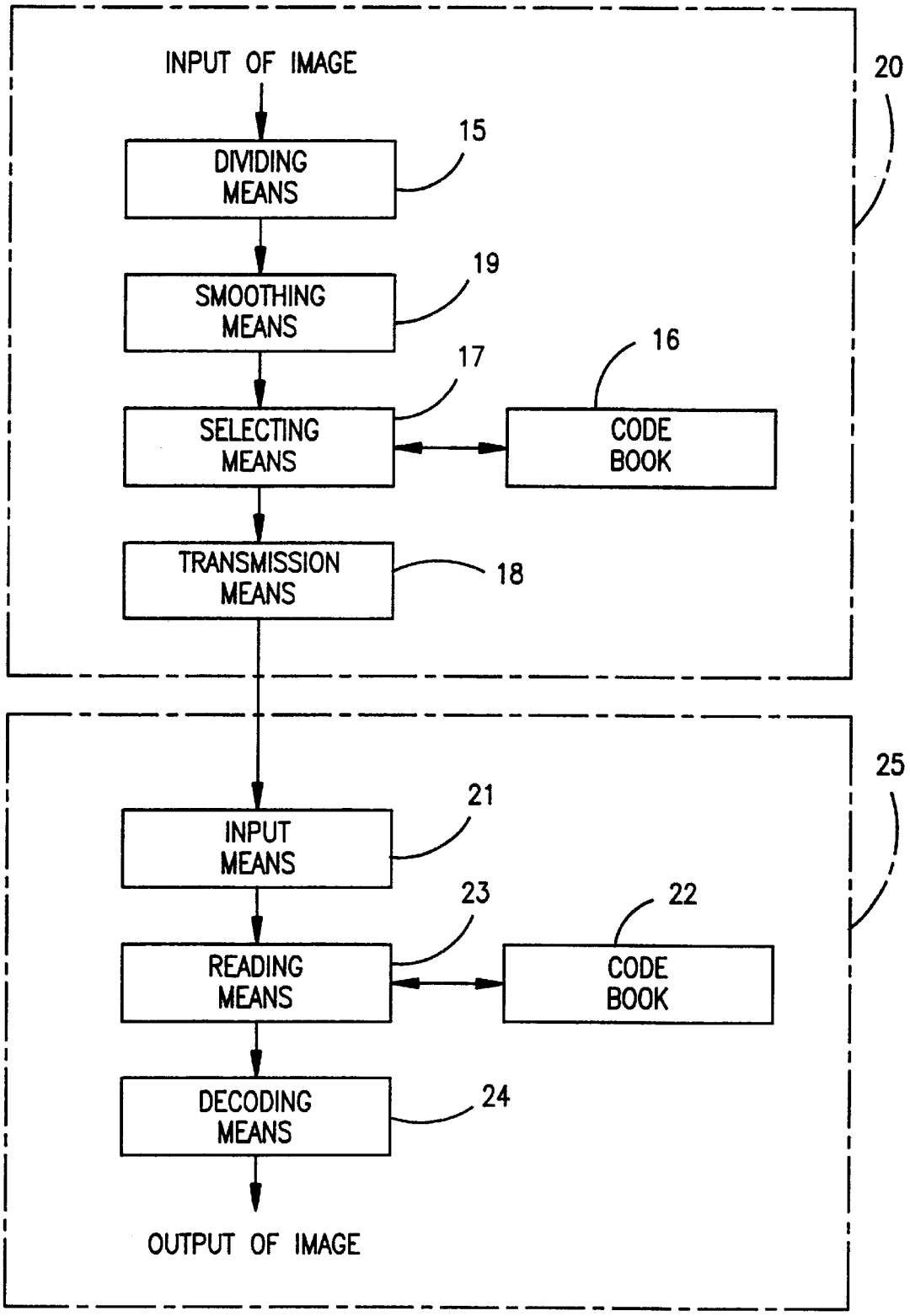
FIG. 4 is a block diagram showing the structure of the image-encoding device and the image-decoding device of other embodiment of the present invention.

Next, FIG. 4 is a block diagram showing the structure of the image-coding device and the image-decoding device which is other embodiment of the present invention, and the structure of the embodiment will be described with reference to FIG. 4.

Referring to FIG. 4, the dividing means 15 inputs the image to be coded, divides the input image into regions comprising pixel numbers of 4×4, and outputs the pixel pattern within the region obtained by the division. And, the smoothing means 19 as the quantization patterning means of the present invention is a means to smooth and output the data output from the dividing means 15. The smoothing processing here is a processing to transform respective pixel values comprising two values of {0, 1} of the pixel pattern in the image to be coded to the intermediate value of from 0 to 255 in order to quantize more finely. Therefore, this smoothing means 19 forms a regional image having an intermediate value of [0, 255] based on the image comprising binary pixel values of {0, 1} as a subject to be coded.

The code book 16 is formed to have quantized patterns selected as representative patterns, from quantized patterns in which the pixel values are more finely quantized compared to respective pixel values of the pixel pattern within the region obtained by dividing each image for every region by utilizing plural kinds of images, by LBG algorithm described below. The selection means 17 is a means to select the quantized pattern which most approximately represents the pixel pattern in the image, among the code books 16 formed as described above, and to output the index informations corresponding to the selected quantized pattern, and the transmission means 18 is a means to transmit the index information output from the selection means 17. The image-encoding device 20 is composed of the above-mentioned respective means.

Furthermore, in FIG. 4, when in the above-mentioned image-encoding device 20, the code book 16 is utilized and the index information corresponding to the quantized pattern selected as the one expressing most approximately the pixel pattern in the image to be coded is transmitted, the input means 21 obtains and outputs the transmitted index information. In the image-decoding device 25, the same code book 22 as the above-mentioned code book 16 is also provided. The reading means 23 is a means to examine the contents of the code book 22 from the index information output from the input means 21 and to read out the corresponding quantized pattern, and the decoding means 24 is a means to use the quantized pattern read out by the reading means 23 to decode the image to be decoded as the image whose pixel value is quantized more finely compared to the image to be coded. The image-decoding means 25 is composed of respective means of from the input means 21 to the decoding means 24 described above.

Figure 5:
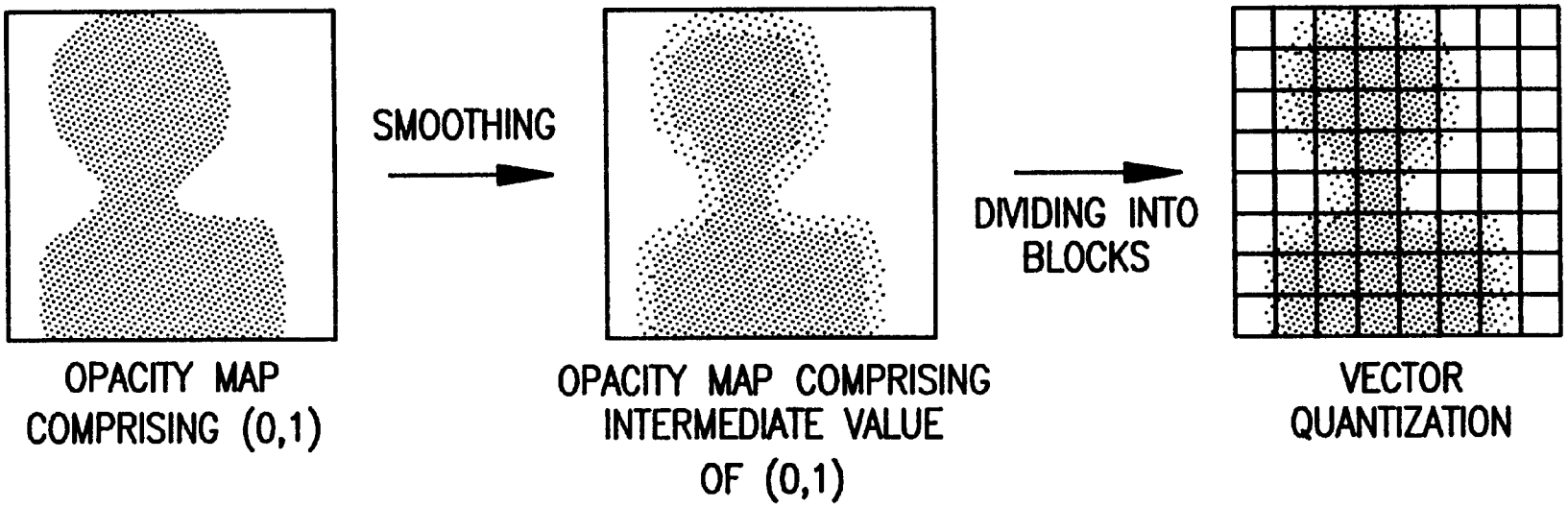
FIG. 5 is an image view showing the change of image in the state that the image is sequentially subjected to processings such as smoothing and vector quantization of the other embodiment.

In the image-encoding device and the image-decoding device of the present embodiment constituted as described above, one embodiment of the image-encoding methods and the image-decoding methods of the present invention will be described with reference to FIG. 4 and FIG. 5, while describing the actions thereof. FIG. 5 is a view simply expressing the change of the image in an image view in the state that the image is subjected in sequence to the processings such as smoothing, vector quantization and the like, when a human image is embedded into the background image.

Here, the image to be coded is an image of 0/1. Furthermore, $\alpha=1$ is assumed to express the existence region of a substance (in the present embodiment, corresponds to the human image), and $\alpha=0$ is assumed to express the opacity region where any substance does not exist.

First, the formation of the code book will be described.

Namely, each image is divided into blocks comprising pixel numbers of 4×4 by using plural kinds of images. Then, $\alpha$ value 1 is transformed to 255, and $\alpha$ value 0 is transformed to 0, and the image is subjected to the smoothing processing. Thereby, the regional image having an intermediate value is constituted.

Subsequently, the code book is designed by the LBG algorithm (Y. Linde, A. Buzo and R. B. Gray: "An Algorithm for Vector Quantizer Design", IEEE Transaction on Communication, Vol. COM-28, No. 8, pp. 957–971, August 1988). Thereby, the code book is designed for the regional image having an intermediate value, not the value of 0/1. The size of the code book is made to be 256 selected as a representative pattern. This is 1/256 compared to the 0/1 pattern numbers (the 16th power of 2) which the block comprising the pixel numbers of 4×4 has.

Next, the processing of vector quantization will be described (see FIG. 5).

Referring to FIG. 4, the dividing means 15 divides the image to be coded into blocks comprising pixel numbers of 4×4, and the smoothing means 19 transforms $\alpha$ value 1 to 255 and $\alpha$ value 0 to 0 to subject the image to the smoothing processing. Thereby, the regional image having an intermediate value is composed. The selecting means 17 examines the code book 16, compares with the pixel pattern divided into blocks subjected to the smoothing processing, and searches a pattern having the smallest squared error sum, and as a result, outputs the index information corresponding to the pattern expressed most approximately to the transmission means 18, thus the index information is transmitted from the transmission means 18 to the image-decoding device 25.

In the image-decoding device 25, the input means 21 obtains said index information, the reading means 23 reads out the quantized pattern corresponding to the index information obtained by the input means 21 from the code book 22, and the decoding means 24 uses the read-out quantized pattern to decode the image to be decoded as an image whose pixel value is more finely quantized compared to the original image to be coded.

As described above, according to the present invention, such an effect is exerted that high efficient coding and high efficient decoding can be performed while suppressing the visual deterioration, by subjecting a pattern of a pixel value ($\alpha$ value in the present embodiment) having coarse amplitude resolution (called also as quantized accuracy) to the vector quantization with the pattern of the pixel value having slightly degraded space resolution but having finer amplitude resolution (quantized accuracy). Moreover, such an effect is particularly successful when the image is animation or the like.

Next, while describing more concretely the structure of the smoothing means 19 of the image-encoding device 20 described referring to FIG. 4, the image-encoding device as one embodiment of the image processing device which is other embodiment of the present invention will be described.

Figure 6:
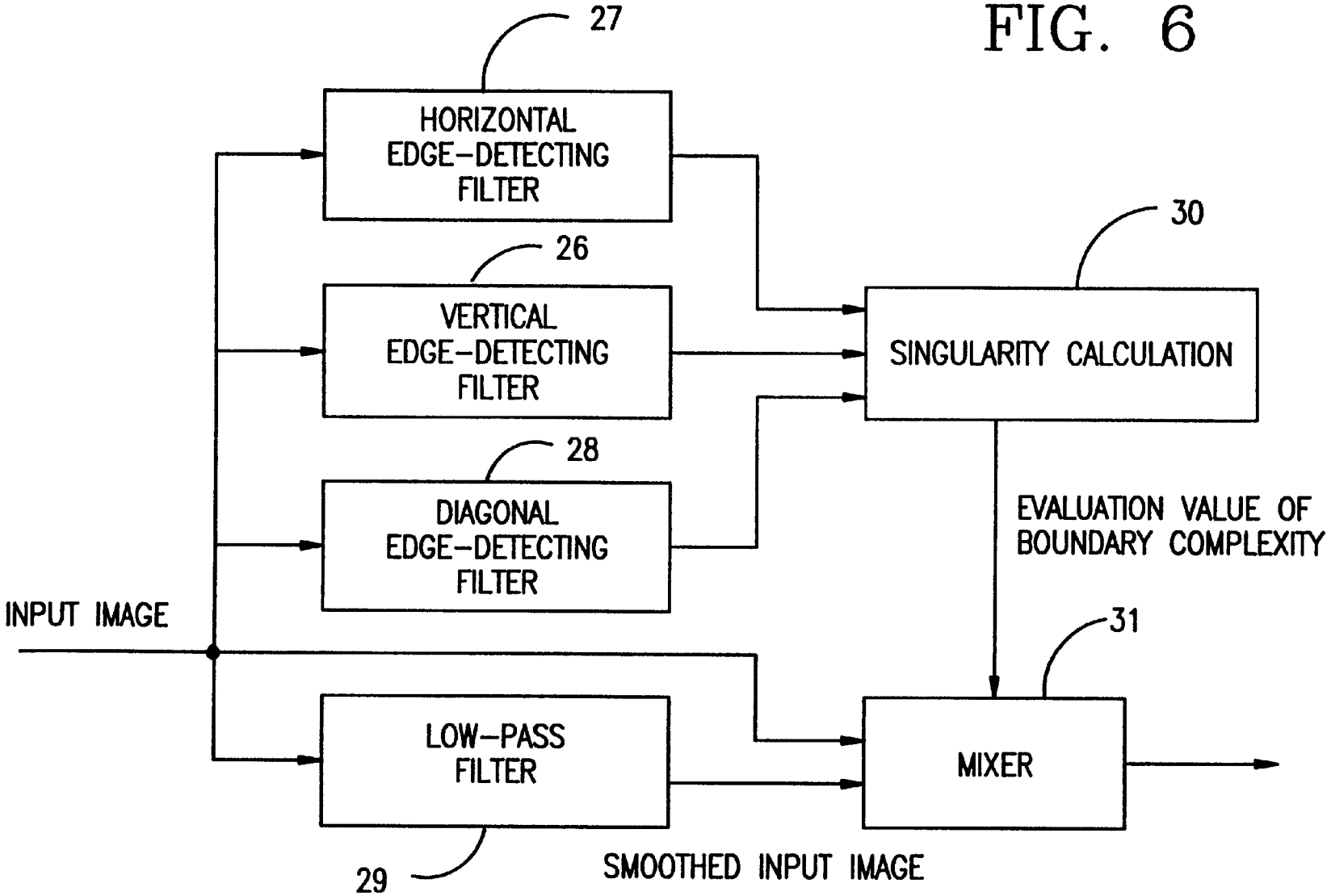
FIG. 6 is a block diagram showing the structure of the smoothing means of the image-encoding device of the other embodiment.

FIG. 6 is a block diagram showing the structure of the smoothing means which is a characteristic part of the image encoding device of the present embodiment, and the structure of the present embodiment will be described with reference to FIG. 6. In addition, description of the same portions as those of FIG. 4 will be omitted.

Referring to FIG. 6, a vertical edge-detecting filter 26, a horizontal edge-detecting filter 27, an diagonal edge-detecting filter 28, and a low-pass filter 29 are filters having characteristics shown in FIGS. 7(a), (b), (c) and (d), respectively, and any filter inputs the original signal of the input image and outputs a predetermined response. A singularity-calculating section 30 inputs response V from the vertical edge-detecting filter 26, response H from the horizontal edge-detecting filter 27, and response D from the diagonal edge-detecting filter 28 to calculate C as the complexity of the contour by Expression 201 described below, and outputs the value of C as the calculation result. The mixer 31 inputs the output C of the singularity-calculating section 30, the output from the low-pass filter 29 and the original signal of the input image to calculate them by Expression 202 described below, and outputs the result. FIGS. 7(a)–(d) are diagrams showing the characteristics of various filters.

In the image-encoding device as one embodiment of the image processing device of the so-constituted present embodiment, one embodiment of the image processing methods of the present invention will be described with reference to FIG. 6 and FIG. 8, as well as describing the action thereof.

Referring to FIG. 6, the vertical edge-detecting filter 26, the horizontal edge-detecting filter 27, and the diagonal edge-detecting filter 28 which have obtained the signal of the input image output V, H and D to the singularity-calculating section 30 as responses corresponding to respective filter characteristics. The singularity-calculating section 30 determines the value of the complexity of contour C, by using these inputs V, H, D based on the following Expression 201:

$$C=|V*H|-D*D \tag{201}$$

(wherein * means multiplication).

Thus obtained value of C is subjected to clipping so that it is between 0 and a predetermined value Cmax.

Figure 8A:
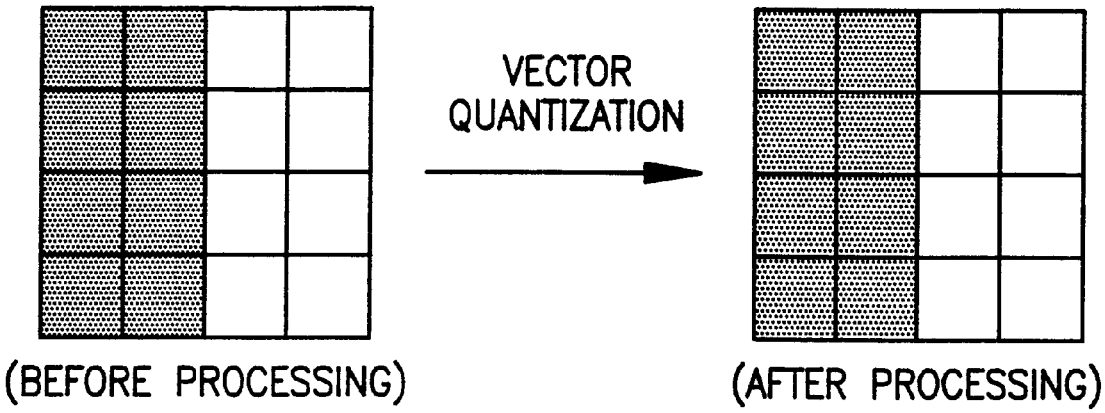
FIG. 8(a) is a view illustrating the case where smoothing processing is performed for a linear edge in the other embodiment.
Figure 8B:
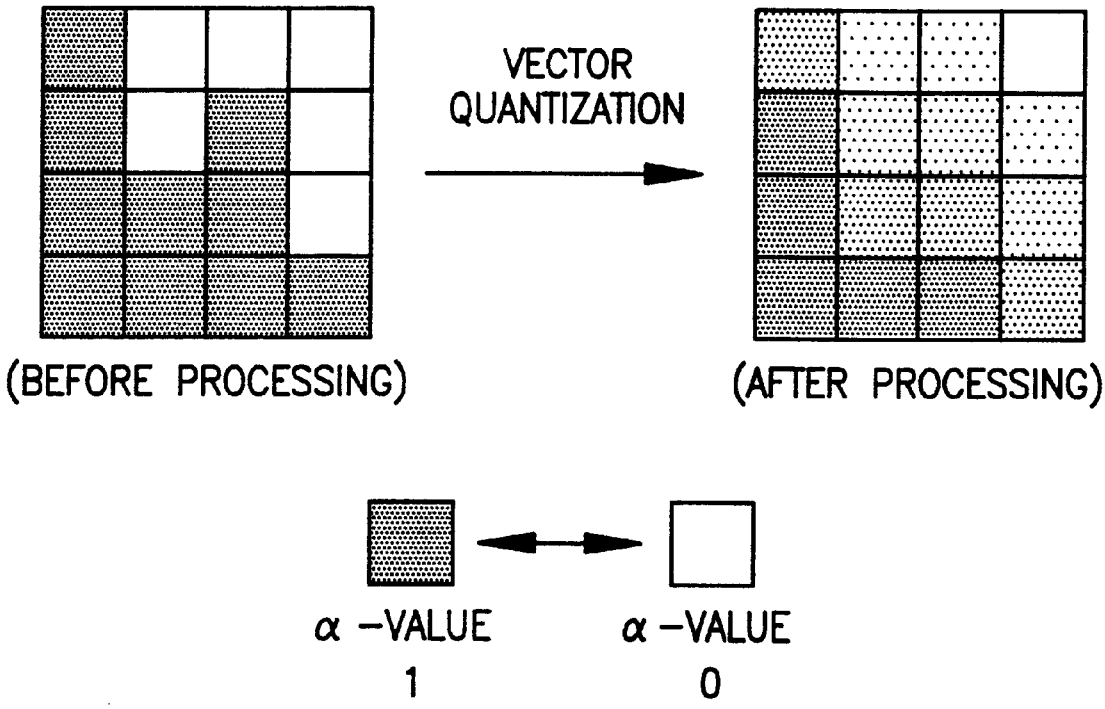
FIG. 8(b) is a view illustrating the case where smoothing processing is performed for an edge having a complicated contour in the other embodiment.

Thereafter, the mixer 31 mixes the signal based on the following Expression 202:

$$\text{Output}=((\text{Cmax}-C)*\text{original signal}+C*(\text{Smoothing signal}))/\text{Cmax} \tag{202}$$

and outputs the image signal in which such a processing that a linear edge holds it (see FIG. 8(a)), and an edge having a complex contour suppresses it (see FIG. 8(b)) is applied. FIGS. 8(a) and (b) are views illustrating examples of the smoothing processing of the present embodiment, and FIG. 8( a) shows the smoothing processing with respect to the linear edge, and FIG. 8(b) shows the smoothing processing with respect to the edge having a complex contour.

Thus, according to the present embodiment, whose processing is such that when the pattern of pixel value forming the input image is more complex, the degree of smoothing applied to the pixel value becomes strong compared to the case where the pattern of pixel value is simpler, and when said pattern is simpler, the degree of smoothing applied to the pixel value becomes weak compared to the case where the pattern is more complex, various filters as described above have small low-pass characteristics in the flat portion of the contour, and have large low-pass characteristics in the uneven portion of the contour, thereby the present embodiment exerts effects excellent in the visual characteristics in the coding of the regional image.

Here, for example, in a filter having binary opacity, judgment of complexity of the contour can be performed by dispersion of the whole curvature functions of the contour. Furthermore, in the more general case containing concentration value, it can be evaluated by Hadamard's transformation coefficient, Fourier transformation coefficient, DCT coefficient and the like.

The above-described matter is based on the principle that "the regional image requires the space resolution lower than the color image, and the amplitude resolution higher than 0/1".

In addition, in the above embodiment, description has been made with regard to the case where the input image has two values of 0/1, however, it is not restricted to that case and, for example, the input image may have multiple values.

Furthermore, in the above embodiment, description has been made with regard to the case where chain coding is used as the contour coding, however, the present embodiment is not restricted to that case, and for example, Bezier curve and spline curve may be used.

Furthermore, in the above embodiment, description has been made with regard to the case where the smoothing means is used as a means for quantization patterning, however, it is not restricted to that case, and any means applying any processing may be used, so long as respective pixel values of the pixel pattern in the image to be coded are subjected to the quantization patterning so that the pixel values are more finely quantized.

Furthermore, in the above embodiment, description has been made with regard to the case where a value is used as a pixel value, but for example, the one utilizing the luminance level of the image may be used.

Furthermore, in the above embodiment, the case where the image processing device and the method thereof are utilized as the smoothing means 19 which is the pre-processing of the image-encoding device 20 has been described, but it is not restricted to that case, and for example, they are utilized as the means of the pre-processing of the image-encoding device 7, or the post-processing of the image-decoding device 10, or the post-processing of the image-decoding device 25.

As is obvious from the above description, the present invention has an advantage in that the coding volume can be further reduced compared to the conventional devices, while suppressing the visual deterioration.

Furthermore, the present invention has another advantage in that it can obtain properties excellent in the visual characteristics with respect to coding of the regional image.

[II]

In respective embodiments of the present invention, it is assumed that the image is composed of the length and the breadth 288×352 pixels in order to easily understand the action of the device, and that the hierarchy does not loose the generality and is composed of only two portions, background and foreground. Moreover, it is assumed that the block which performs correlation operation for detecting the motion vector is composed of the length 16 pixels×the breadth 16 pixels.

Figure 9:
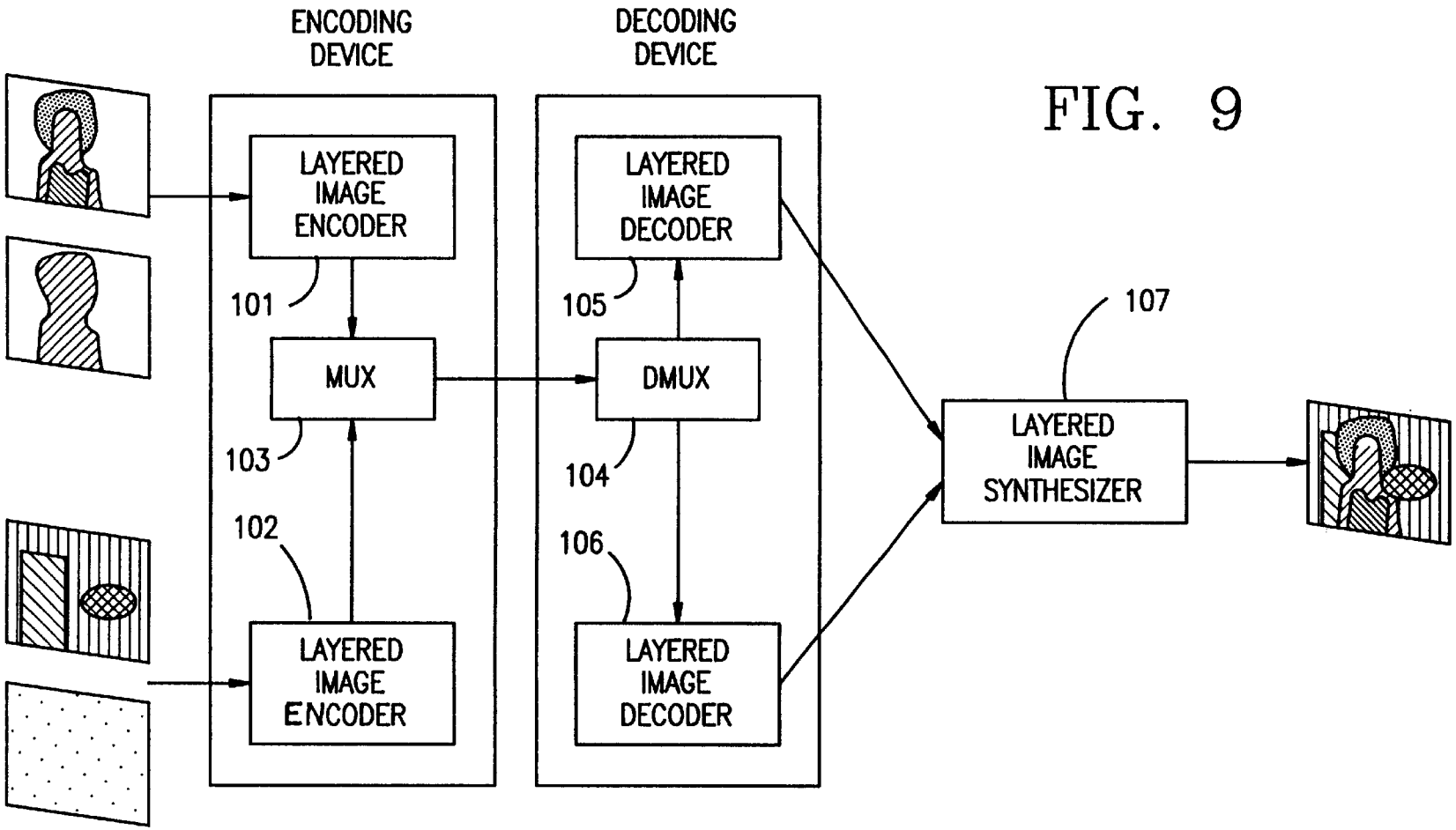
FIG. 9 is a structural view of a layer encoding system in one embodiment of the present invention.
Figure 10:
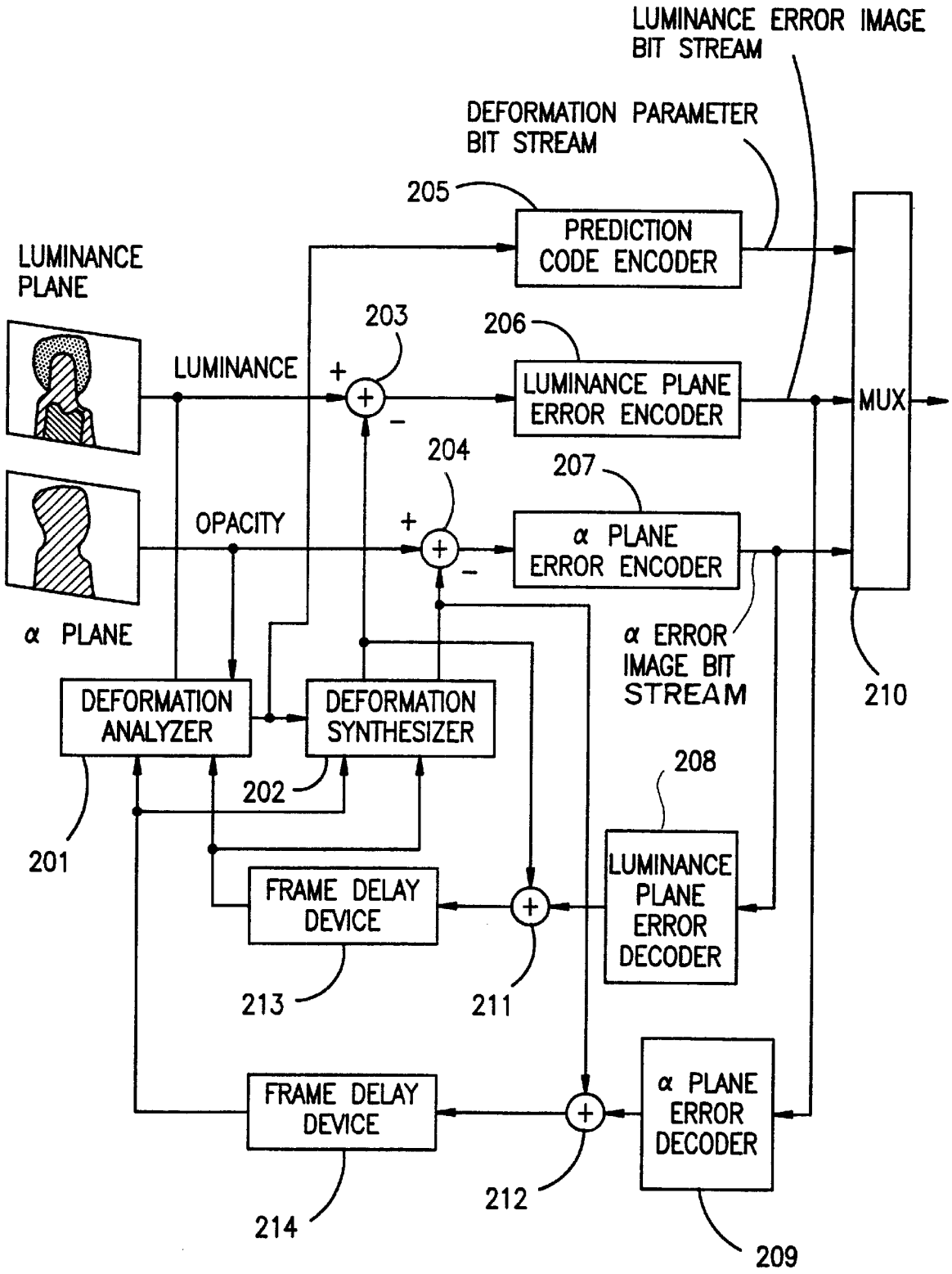
FIG. 10 is a structural view of a layer image encoder in the first embodiment.
Figure 11:
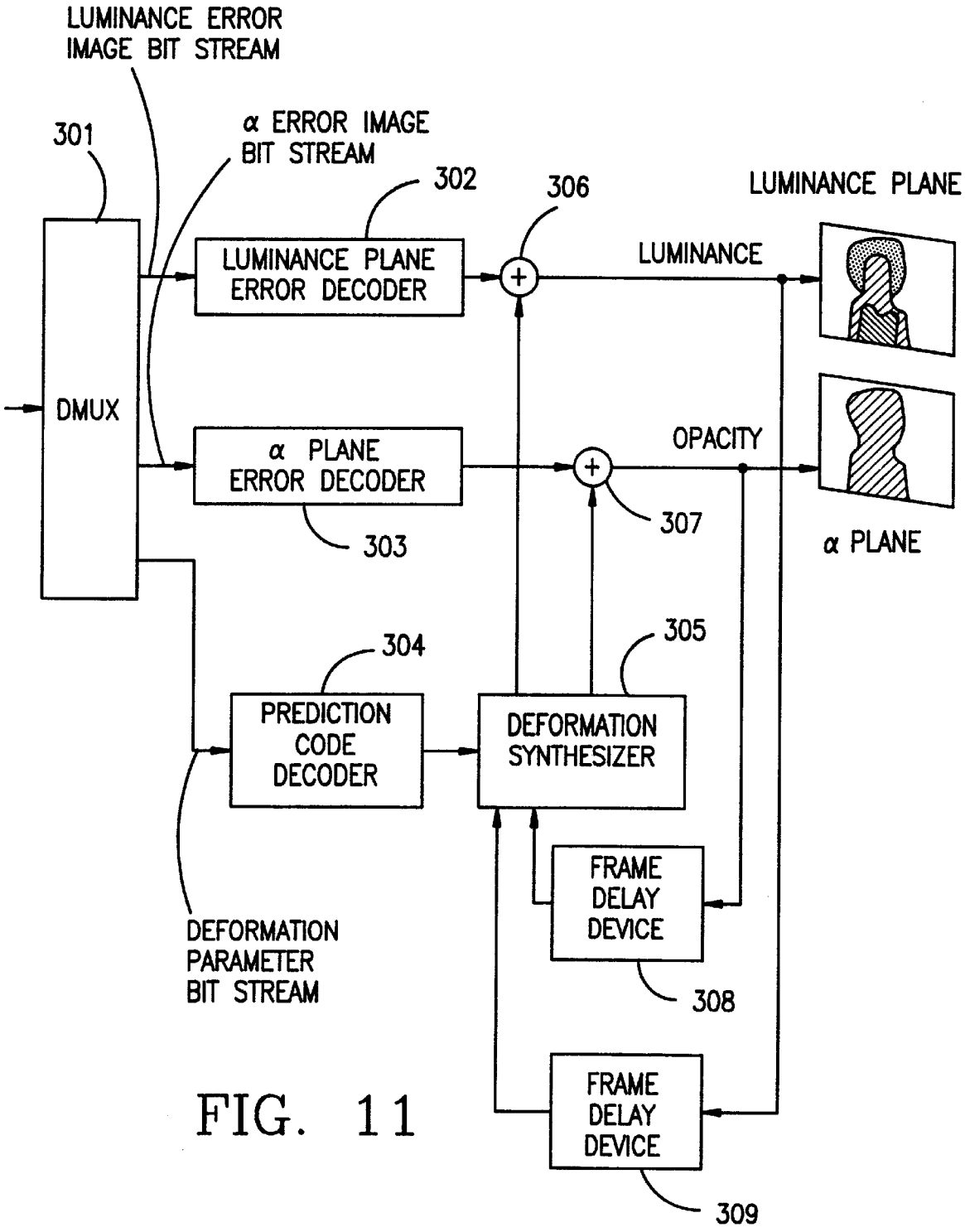
FIG. 11 is a structural view of a layer image decoder in the first embodiment.
Figure 12:
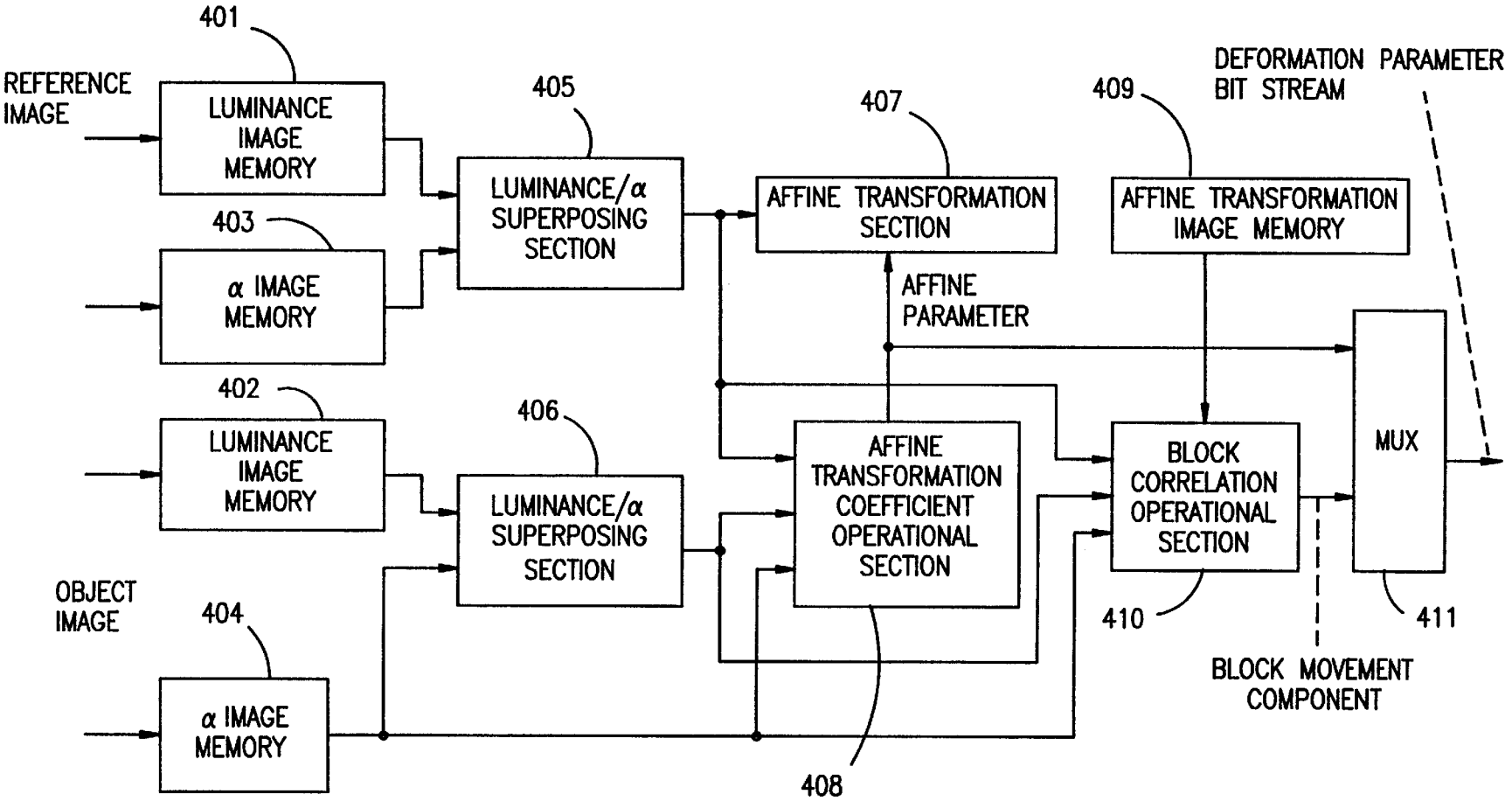
FIG. 12 is a structural view of a deformation analyzer of the present embodiment.
Figure 13:
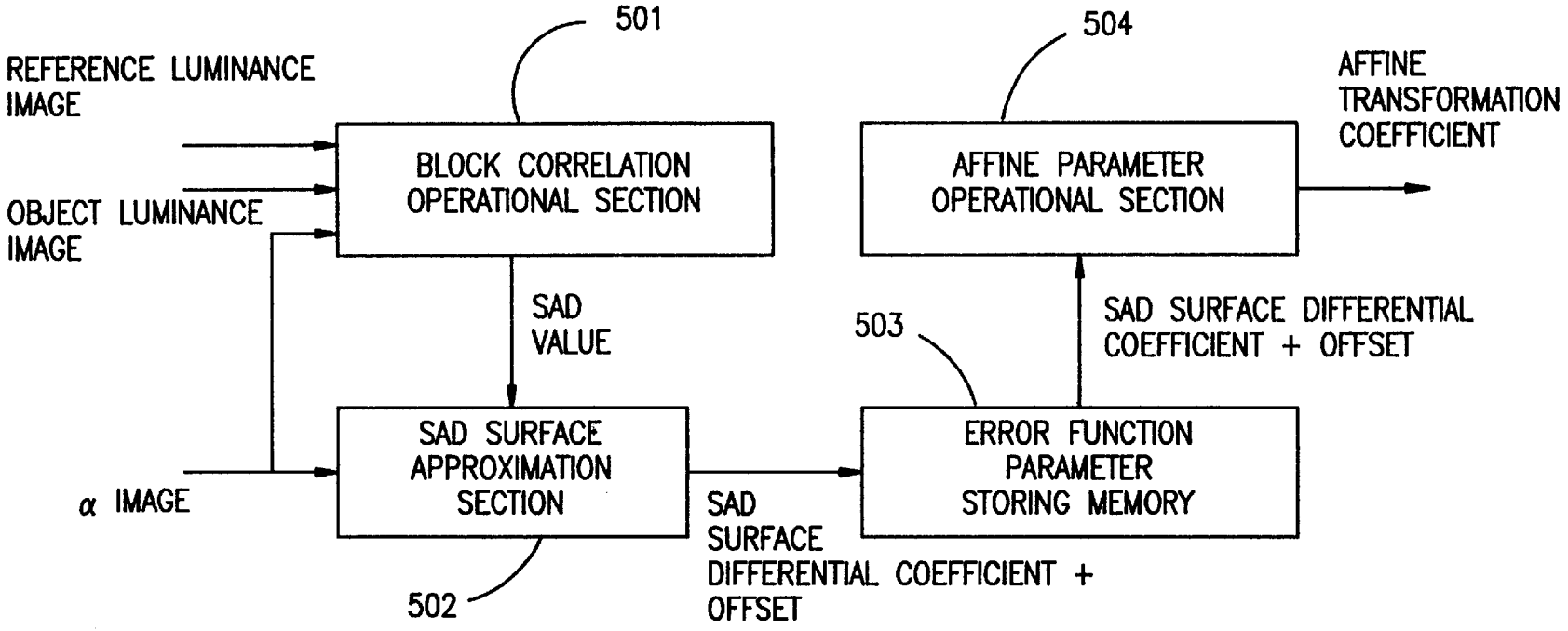
FIG. 13 is a structural view of an affine transformation coefficient-calculation section of the present embodiment.

The embodiment of the present invention will be described with reference to drawings. The first embodiment of the present invention (claims 13, 14, 21 and 22) will be described with reference to FIGS. 9–20. Here, FIG. 10 is a view showing the structural example of the first invention, FIG. 11 is a view showing the structural example of the second invention, FIG. 12 is a view showing the structural example of the 9th invention, and FIG. 13 is a view showing the structural example of the 10th invention. FIG. 9 is a structural view of the layer coding system illustrating the action of the image-encoding device and the image-decoding device. The layer image is composed of two frames: luminance and opacity. These are referred to, respectively, as the luminance plane and the α-plane. In the layer image synthesizer 107, synthesis expressed by Equation 2 is carried out:

$$g(x,y)=\alpha(x,y)g_f(x,y)+(1-\alpha(x,y))g_b(x,y) \tag{2}$$

In Equation 2, (x, y) represents the horizontal/vertical position, $g_f$ and $g_b$ represent a luminance value [0, 255] of the foreground and the background, respectively, and α represents the opacity [0, 1] of the foreground. g is a synthesized luminance value. In the present embodiment, since the hierarchy is assumed to be two, for the sake of brevity, all the opacity of the background is composed of 1. The layer image encode 101 and 102 encodes respective dynamic images of the luminance plane and the α plane in the foreground and the background, and the bit stream multiplexed by the multiplexer 103 are sent to the decoding device. In the decoding device, the data of respective layer images are divided by the demultiplexer 104, and the layer images are reconstructed by the layer image decoders 105 and 106. The reconstructed layer images are synthesized by the layer image synthesizer 107. Now, this coding system will be described in sequence.

FIG. 10 is a structural view of the layer image encoders 101 and 102 in one embodiment of the present invention (claim 13) in FIG. 9. Referring to FIG. 10, 201 represents a deformation analyzer, 202 represents a deformation synthesizer, 203 and 204 represent differential devices, 205 represents a prediction code encoder, 206 represents a luminance plane error encoder, 207 represents an α plane error encoder, 208 represents a luminance error decoder, 209 represents an α plane error decoder, 210 represents a multiplexer, 211 and 212 represent adders, and 213 and 214 represent frame delay devices. The action of the layer image encoder thus constituted will now be described.

First, the deformation analyzer 201 determines which position of the luminance plane and the α plane which are the decoding result of the previous frame corresponds to each other with respect to respective positions of the luminance plane and the α plane currently input. The correspondence information of this position is encoded as the affine transformation parameter and the block parallel movement component by the prediction code encoder 205. The deformation synthesizer 202 receives this correspondence information, and deforms the luminance plane and α plane which are the decoded results of the previous frame, to make them the differential signal by the differential devices 203 and 204. When it is restricted to the luminance plane, this generally corresponds to a processing called "motion compensation" in the image-encoding devices and the like described in CCITT Recommendation H.261. Here, the different point is that the motion compensation combining not only the block movement in which the sum of the error absolute value (abbreviated as SAD) becomes minimum in the block of 16×16 pixels, but the affine transformation of the whole screen is performed. This will be described with reference to FIG. 14.

Figure 14:
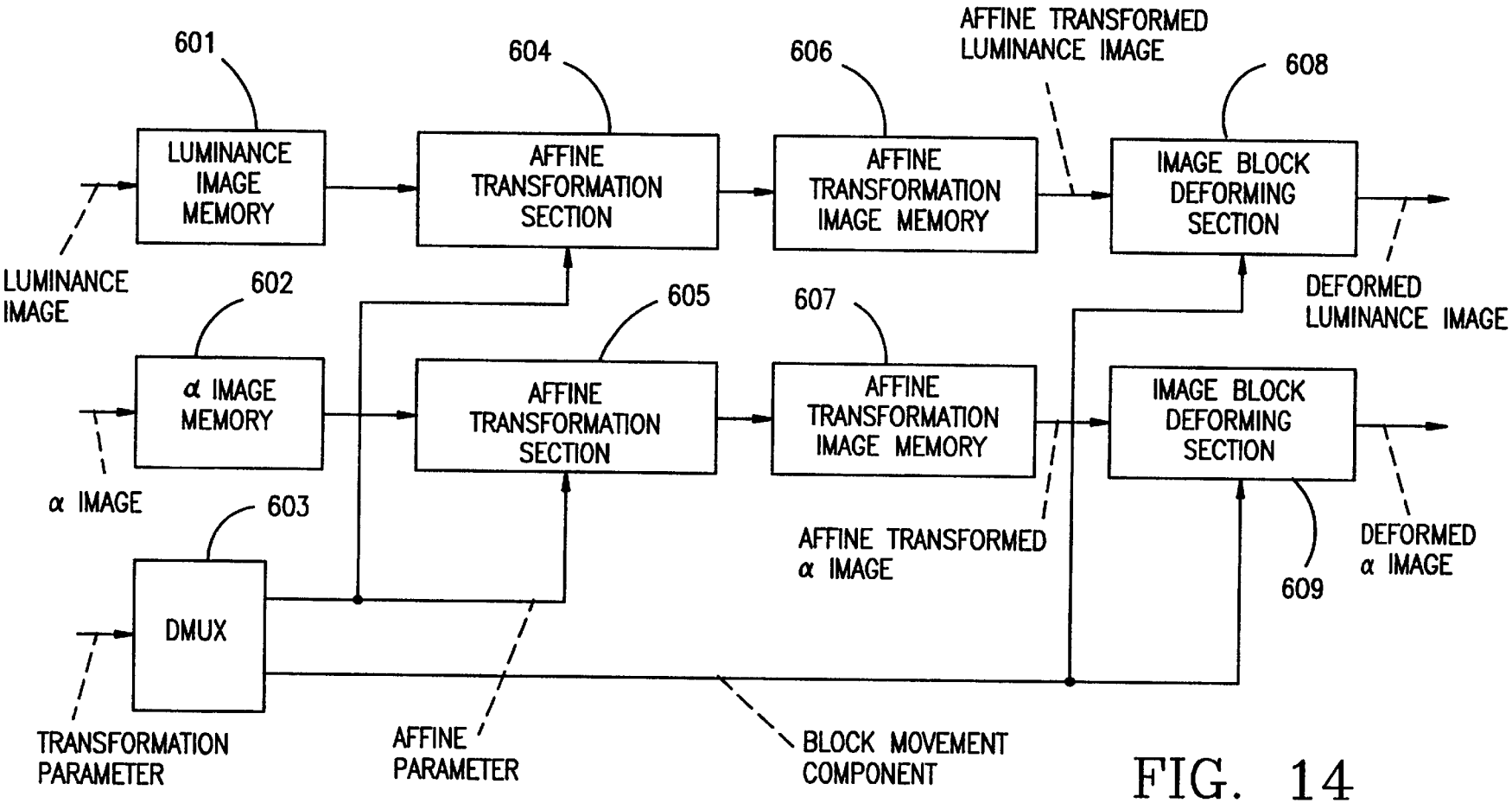
FIG. 14 is a structural view of a deformation synthesizer of the present embodiment.

FIG. 14 shows the structure of the deformation synthesizer 202 of FIG. 10, and in the drawing, 601 represents a luminance image memory, 602 represents an α-image memory, 603 represents a demultiplexer, 604 and 605 represent affine transformation sections, 606 and 607 represent affine transformation image memories, 608 and 609 represent image block-deforming sections. The correspondence information (deformation parameter) is composed of the affine transformation parameter (see Equation 1) and translational movement component (See FIG. 20) with respect to blocks divided into the length and the breadth 18×22. The steps of the motion compensation are as follows:

1. The pixel value of the luminance plane and the α-plane are taken into the luminance image memory 601 and the α-image memory 602. Simultaneously, the affine transformation parameter and the block translational movement component are separated by the demultiplexer 603.
2. The image is shifted by the affine transformation sections 604 and 605 with respect to the movement volume shown in Equation 1 by the affine transformation parameter. The result is stored in the affine transformation image memories 606 and 607.
3. The image stored in the affine transformation image memories 606 and 607 performs the translational movement per block unit having a size of 16×16 pixels, with respect to the blocks divided into the length and the breadth 18×22 by the image block-deforming sections 608 and 609.

The deformation analyzer 201 of FIG. 10 has to extract the affine transformation parameter and the block movement component to perform this processing. FIG. 12 is a structural view of the deformation analyzer 201 of FIG. 10. The action of the deformation analyzer 201 will be described by using FIG. 12. In addition, the structure of the deformation analyzer 201 shown in FIG. 12 is a structural example of the motion vector-detecting device of the present invention (claim 21).

Referring to FIG. 12, 401 and 402 represent luminance image memories, 403 and 404 represent α-image memories, 405 and 406 represent luminance/α superposing sections, 408 represents an affine transformation image memory, 409 represents an affine transformation image memory, 410 represents a block correlation operation section, 411 represents a multiplexer. In the deformation analyzer 201 shown in FIG. 12, the luminance image memory 401 and the α-image memory 403 buffer the result of the previous frame as the reference image. The luminance image memory 402 and the α-image memory 404 hold the image of the current input frame which is the image to be encoded. The luminance/α superposing sections 405 and 406 perform the processing shown in Equation 3 to form one luminance image. In Equation 3, h(x, y) represents a synthesized luminance image, g represents a luminance value [0, 255] of the luminance plane, and α represents α value [0, 1] of α plane, with respect to the horizontal/vertical position (x, y) of the pixel.

$$h(x, y) = \begin{cases} g(x, y) & \text{in the case of } a(x, y) > 0.5 \\ -100 & \text{other than the above} \end{cases} \tag{3}$$

Figure 19:
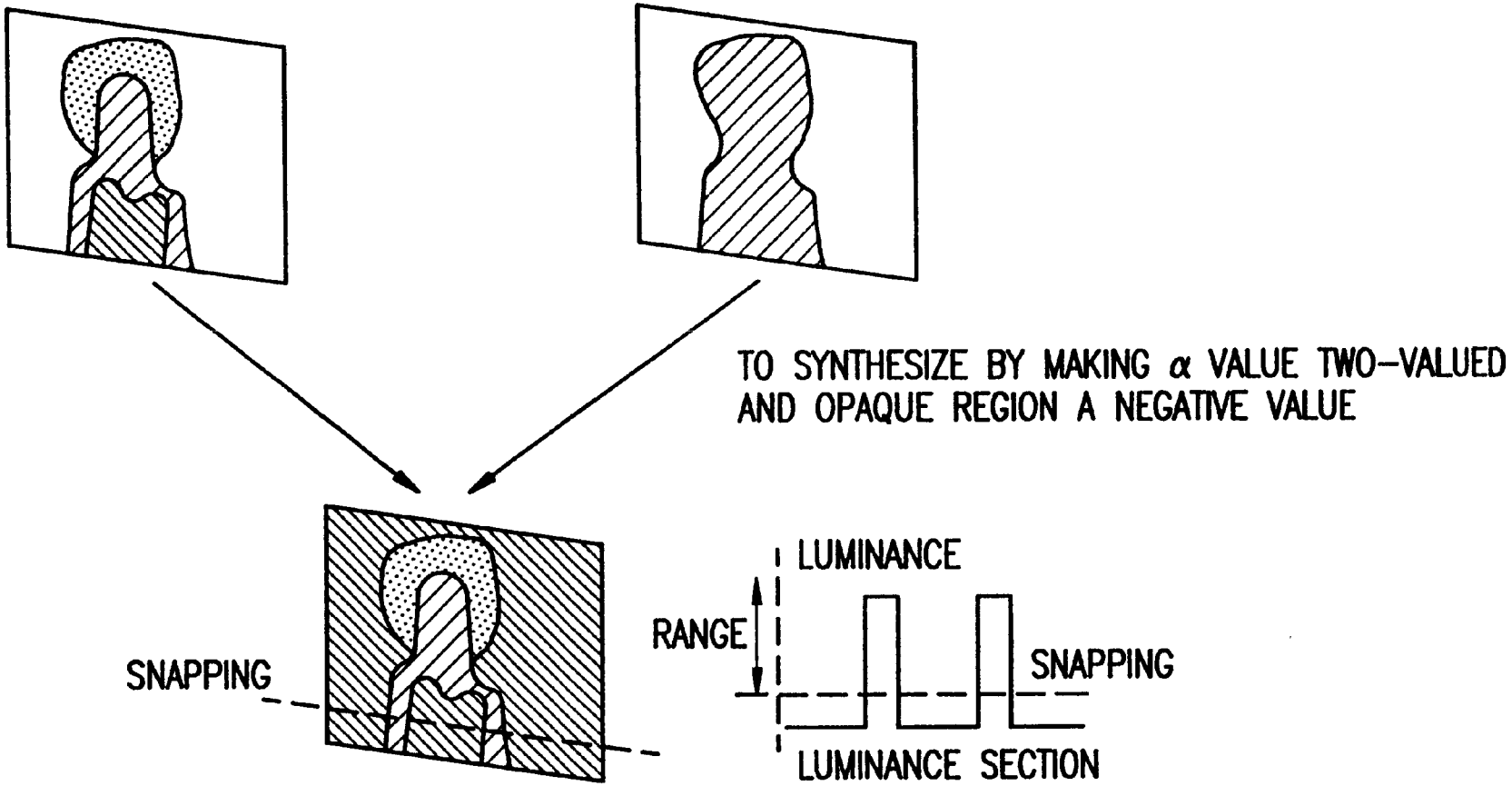
FIG. 19 is a view showing the action of a luminance/α superposing section of the present embodiment.

In Equation 3, the luminance value is superposed in the opaque region, and a proper negative value (−100) is superposed in the transparent region by the value of α. Thereby, the luminance image superposed by the information of the opacity is formed. FIG. 19 shows this illustration. Furthermore, not using such threshold processing, but by multiplying a superposition coefficient r determined empirically, superposition may be conducted as shown in Equation 4:

$$h(x,y)=g(x,y)-\gamma\alpha(x,y) \tag{4}$$

In the present embodiment, it is assumed that the luminance/α superposing section conducts the action provided in Equation 3, since the luminance/α superposing section is used for other purposes in other embodiments described below. Thus, the correlation operations provided by Equation 5 and Equation 6 are performed for the image to which the luminance and the α value are superposed.

$$E(u, v) = \begin{cases} \sum_{(x,y)\in R} |h_{t-1}(x+u, y+v) - h_t(x, y)| & \\ & \text{in the case of } 3a_t(x, y) > 0.5 \in R \\ 0 & \text{other than the above} \end{cases} \tag{5}$$

$$(p, q) = \underset{(u,v)}{\operatorname{argmin}} E(u, v) \tag{6}$$

Figure 20:
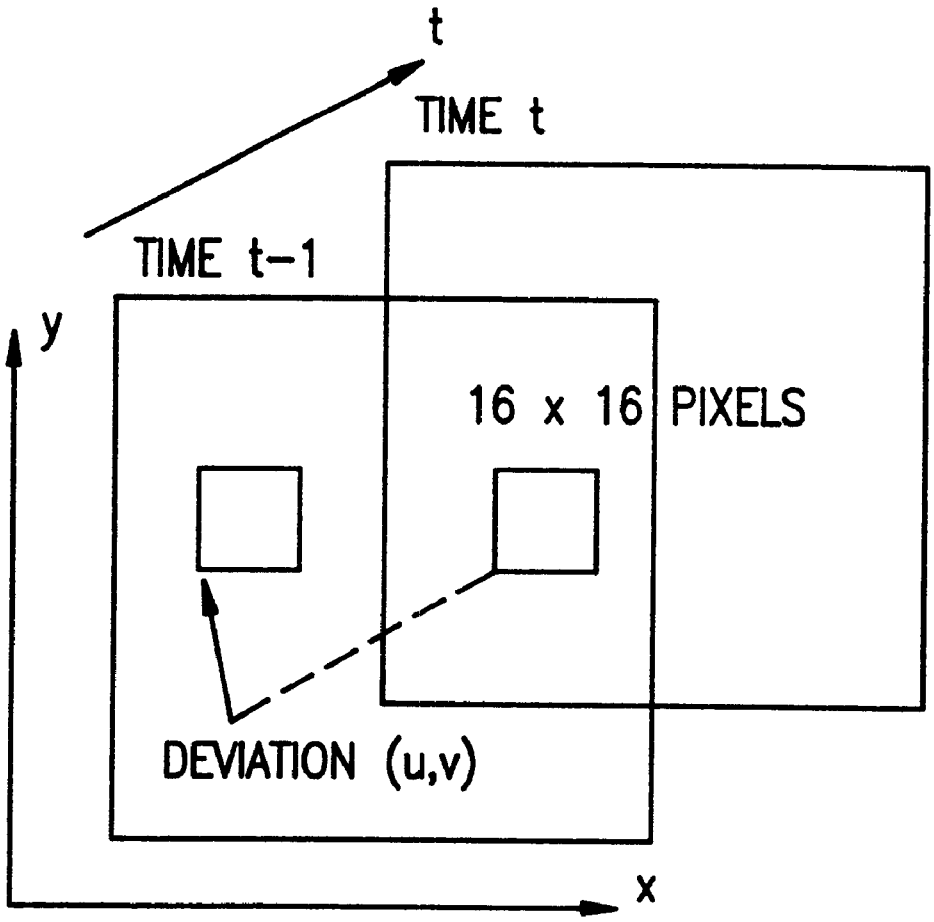
FIG. 20 is a block correlation view of the present embodiment.

In Equation 5, $h_{t-1}$ represents the superposed pixel value of the previous frame (FIG. 12, reference image), and $h_t$ represents the superposed pixel value of the current frame (FIG. 12, object image). R represents the region of 16×16 pixels, and (u, v) represents deviation to the corresponding block region, as shown in FIG. 20. According to Equation 6, the smallest deviation of SAD is determined as a motion vector. The block correlation section 410 carries out this operation relating to the affine transformed reference superposed image and the object superposed image. In addition, the output of the α-image memory 404 is input to the block correlation section 410. This is because the motion vector becomes indefinite relating to the region where the α planes of the object image are all transparent, therefore, it is to omit the calculation. The block correlation section 410 outputs the smallest deviation (p, q) relating to 18×22 blocks as the motion vector. The affine transformation section 407 and the affine transformation image memory 409 perform the same actions as those of the block of the same name described in FIG. 14.

Next, the affine transformation coefficient operational section 408 will be described. FIG. 13 is a structural view of the affine transformation coefficient operational section 408, and shows the structural example of the motion vector-detecting device of the present invention (claim 10). Referring to FIG. 13, 501 represents a block correlation operational section, 602 represents a SAD surface approximation section, 503 represents an error function parameter-storing memory, 504 represents an affine transformation parameter operation section. The action of the block correlation operational section 501 is roughly the same as that of the block correlation section 410 of FIG. 12. The different point is that the block correlation operational section 501 outputs the deviation (p, q) which becomes the smallest with respect to 18×22 blocks, and in addition to that, the SAD smallest value of the position and the SAD value in the vicinity of 8. This is shown in Equation 7. In Equation 7, t represents transpose of the matrix.

$$S=(E(p-1,q-1), E(p-1, q), E(p-1, q+1), E(p,q-1), E(p,q), E(p,q+1), E(p+1, q-1), E(p+1,q), E(p+1,q+1))^t \tag{7}$$

The SAD phase approximation section 502 receives this to carry out the operations of Equation 8 to Equation 13. The operation results are stored in the error function parameter storing memory 503. Operations of Equation 8 to Equation 13 correspond to performing the second order Taylor development in the vicinity of the smallest deviation (p, q), considering the SAD value as the function of the deviation (u, v). If the position of the block of the length and the breadth 18×22 is expressed as i and j, respective quadratic error functions can be expressed by Equation 14, except for the transparent region.

$$E(p, q) = \frac{1}{9}(-1, 2, -1, 2, 5, 2, -1, 2, -1)S \tag{8}$$

$$\frac{\partial E(u, v)}{\partial u}\Big|(u, v) = (p, q) = \frac{1}{6}(-1, 0, 1, -1, 0, 1, -1, 0, 1)S \tag{9}$$

$$\frac{\partial E(u, v)}{\partial u} = \Big|(u, v) = (p, q) = \frac{1}{6}(-1, -1, -1, 0, 0, 0, 1, 1, 1)S \tag{10}$$

$$\frac{\partial^2 E(u, v)}{\partial u^2}\Big|(u, v) = (p, q) = \frac{1}{3}(1, -2, 1, 1, -2, 1, 1, -2, 1)S \tag{11}$$

$$\frac{\partial^2 E(u, v)}{\partial u^2}\Big|(u, v) = (p, q) = \frac{1}{3}(1, 1, 1, -2, -2, -2, 1, 1, 1)S \tag{12}$$

$$\frac{\partial^2 E(u, v)}{\partial u \partial v}\Big|(u, v) = (p, q) = \frac{1}{4}(1, 0, -1, 0, 0, 0, -1, 0, 1)S \tag{13}$$

-continued $$E_{ij}(u, v) = E_{ij}(p_{ij}, q_{ij}) + (u - p_{ij})\frac{\partial E_{ij}}{\partial u} + (v - q_{ij})\frac{\partial E_{ij}}{\partial u} + \frac{(u - p_{ij})^2}{2}\frac{\partial^2 E_{ij}}{\partial u^2} + (u - p_{ij})(v - q_{ij})\frac{\partial^2 E_{ij}}{\partial u \partial v} + \frac{(v - q_{ij})^2}{2}\frac{\partial^2 E_{ij}}{\partial v^2} \tag{14}$$

Here, as shown in Equations 15 and 16, since the motion vector is described by the affine transformation parameter, as the necessary condition to make the sum total of respective SAD error functions minimum by the variational principle, as shown in Equation 17, the Euler's equation can be derived in which the partial differential of the affine transformation parameter a must be zero vector. This can be expressed by the matrix of Equation 18. The affine parameter operational section 504 first determines Equation 19 (6×6 matrix) and Equation 20 (6×1 matrix), and calculates the affine transformation parameter by Equation 21.

Incidentally, in Equations 19 and 20, (xj, yi) represents the central position of the blocks i and j.

$$\begin{pmatrix} u(x, y) \\ v(x, y) \end{pmatrix} = \begin{pmatrix} 1 & x & y & 0 & 0 & 0 \\ 0 & 0 & 0 & 1 & x & y \end{pmatrix} a \tag{15}$$

$$a = (a_0, a_1, a_2, a_3, a_4, a_5)^t \tag{16}$$

$$\frac{\partial \sum_{ij} E_{ij}(u, v)}{\partial a} = 0 \tag{17}$$

$$Aa - b = 0 \tag{18}$$

$$A = \sum_{ij} \begin{pmatrix} \frac{\partial^2 E_{ij}}{\partial u^2}\begin{pmatrix} 1 & x_j & y_i \\ x_j & x_j^2 & x_j y_i \\ y_i & x_j y_i & y_i^2 \end{pmatrix} & \frac{\partial^2 E_{ij}}{\partial u \partial v}\begin{pmatrix} 1 & x_j & y_i \\ x_j & x_j^2 & x_j y_i \\ y_i & x_j y_i & y_i^2 \end{pmatrix} \\ \frac{\partial^2 E_{ij}}{\partial u \partial v}\begin{pmatrix} 1 & x_j & y_i \\ x_j & x_j^2 & x_j y_i \\ y_i & x_j y_i & y_i^2 \end{pmatrix} & \frac{\partial^2 E_{ij}}{\partial u^2}\begin{pmatrix} 1 & x_j & y_i \\ x_j & x_j^2 & x_j y_i \\ y_i & x_j y_i & y_i^2 \end{pmatrix} \end{pmatrix} \tag{19}$$

$$b = \sum_{ij} \left( \begin{pmatrix} 1 & 0 \\ x_j & 0 \\ y_i & 0 \\ 0 & 1 \\ 0 & x_j \\ 0 & y_i \end{pmatrix} \begin{pmatrix} \frac{\partial E_{ij}}{\partial u} + \frac{\partial^2 E_{ij}}{\partial u^2} p_{ij} + \frac{\partial^2 E_{ij}}{\partial u \partial v} q_{ij} \\ \frac{\partial E_{ij}}{\partial v} + \frac{\partial^2 E_{ij}}{\partial v^2} q_{ij} + \frac{\partial^2 E_{ij}}{\partial u \partial v} p_{ij} \end{pmatrix} \right) \tag{20}$$

$$a = A^{-1} b \tag{21}$$

In the deformation analyzer 201 (FIG. 4) constituted as described above, the motion vector can be determined from both informations by conducting the correlation operation with the image superposed with the luminance and α. If the absolute value of the negative value (−100) of the tranparent region determined by Equation 3, the motion vector in which the information of contour of the opaque region is further stressed can be obtained. Particularly, it is effective when there are no clues such as edges or patterns effective for predicting the motion within said region. The affine transformation coefficient operational section 408 determines the affine transformation parameter by performing the quadratic function approximation, not by the local correlation operation. In the local correlation operation, there are many cases that the motion vector has the freedom in the direction of the contour tangent in the periphery of monotonous contour. In this case, though a large prediction error is expected in the two-staged affine transformation parameter prediction shown in the conventional example, however, in the technique shown in the present embodiment, the freedom is expressed by the quadratic function, and the sum total of the quadratic function is comprehensively minimized, thereby it is expected to predict the parameter more stably.

Furthermore, the quadratic function approximation in which the deviation of SAD correlation is a variable has an advantage in that it can easily derive the undetermined parameters, since the Euler's equation represented by Equation 17 becomes linear expression with respect to the undetermined parameters. This is true in common even in the case where a more general polynomial is used. For example, the equation of the motion vector shown in Equation 22 and Equation 23 can express the motion vector generated from the projective image of the plane substance under the perspective transformation.

$$\begin{pmatrix} u(x, y) \\ v(x, y) \end{pmatrix} = \begin{pmatrix} 1 & x & y & 0 & 0 & 0 & x^2 & xy \\ 0 & 0 & 0 & 1 & x & y & xy & y^2 \end{pmatrix} r \tag{22}$$

$$r = (r_0, r_1, r_2, r_3, r_4, r_5, r_6, r_7)^t \tag{23}$$

In this case, as in the affine transformation, the Euler's formula of Equation 24 is calculated and the parameter can be easily predicted by the similar procedures as in Equations 19–21.

$$\frac{\partial \sum_{ij} E_{ij}(u, v)}{\partial r} = 0 \tag{24}$$

The deformation analyzer 201 and the deformation synthesizer of the layer image encoders 101 and 102 have been heretofore described. Simultaneously, the structural example of the motion vector-detecting device of the present invention (claims 21, 22) has been shown. Hereinafter, remaining blocks in FIG. 10 will be described.

Figure 15:
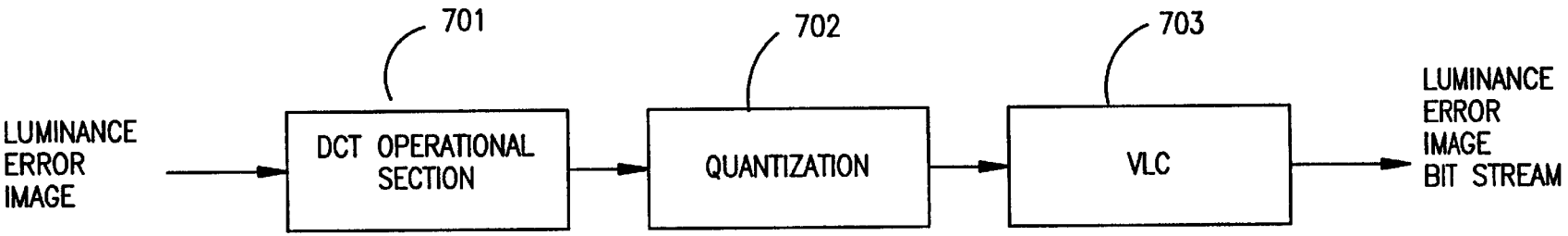
FIG. 15 is a structural view of a luminance plane error encoder of the present embodiment.

The difference of the luminance data and the opacity data are transmitted, respectively, to the luminance plane error encoder 206 and the α plane error encoder 207 by the differential devices 203 and 204, and encoded individually. Each encoder has the structure shown in FIG. 15 and FIG. 16, respectively. FIG. 15 is a structural view of the luminance plane error encoder, and 701 represents a DCT operational section, 702 represents a quantization section, and 703 represents a variable-length coding section 1.

Figure 16:
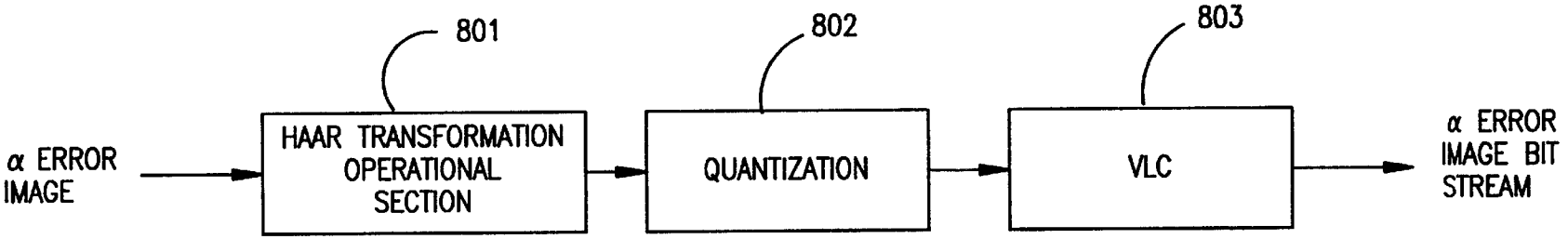
FIG. 16 is a structural view of an α plane error encoder of the present embodiment.

FIG. 16 is a structural view of the α plane error encoder, and 801 represents a Haar transformation operational section, 802 represents a quantization section, and 803 represents a variable-length coding section 2. DCT operational section 701 performs the discrete cosine transform at the blocks of 8×8 pixels, and the transformed DCT coefficient is quantized by the quantization section 702, and the cosine transform coefficient is scanned by the variable-length coding section 703 to be subjected to the two-dimensional Huffman coding in combination with the zero coefficient length and the quantization coefficient. This processing is roughly the same with the technology disclosed in CCITT Recommendation H.261, therefore, detailed description will be omitted.

In the α plane error encoder 207, Haar transformation is used in the blocks of 8×8 pixels, instead of the discrete cosine transform. Here, the Haar transformation is realized by performing the one-dimensional Haar transformation in which the column vector of 8×1 is multiplied from the right of the Equation 25 with respect to the pixel blocks of 8×8 lengthwise and crosswise.

$$\frac{1}{\sqrt{8}} \begin{pmatrix} 1 & 1 & 1 & 1 & 1 & 1 & 1 & 1 \\ 1 & 1 & 1 & 1 & -1 & -1 & -1 & -1 \\ \sqrt{2} & \sqrt{2} & -\sqrt{2} & -\sqrt{2} & 0 & 0 & 0 & 0 \\ 0 & 0 & 0 & 0 & \sqrt{2} & \sqrt{2} & -\sqrt{2} & -\sqrt{2} \\ 2 & -2 & 0 & 0 & 0 & 0 & 0 & 0 \\ 0 & 0 & 2 & -2 & 0 & 0 & 0 & 0 \\ 0 & 0 & 0 & 0 & 2 & -2 & 0 & 0 \\ 0 & 0 & 0 & 0 & 0 & 0 & 2 & -2 \end{pmatrix} \tag{25}$$

The difference with the luminance plane encoder 206 is that the quantization table and the Huffman table are slightly changed because of using the Haar transformation instead of the discrete cosine transform. However, since the basic action is the same, detailed description will be omitted. Now, return to FIG. 2 again.

The output of the luminance plane error encoder 206 and the α plane error encoder 207 heretofore described is multiplexed by the multiplexer 210 and output. On the other hand, the output described above is input to the luminance plane error decoder 208 and the α plane error decoder 209 in order to form the predicting image of the next frame. Each decoder has the structure shown in FIG. 17 and FIG. 18.

Figure 17:
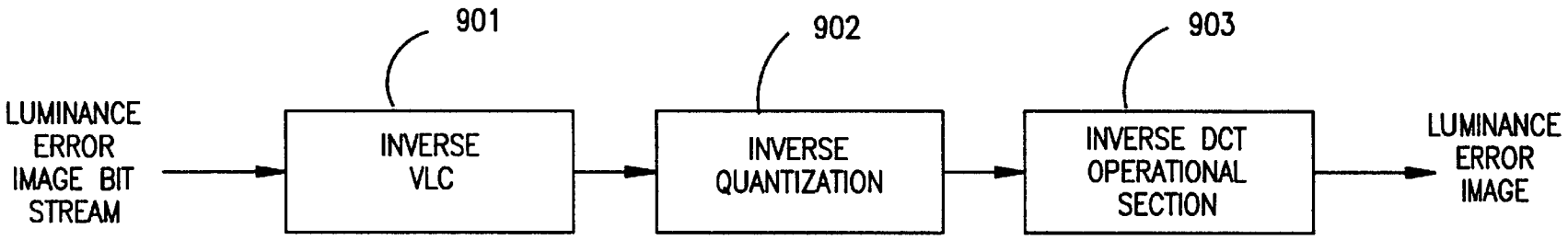
FIG. 17 is a structural view of a luminance plane error decoder of the present embodiment.
Figure 18:
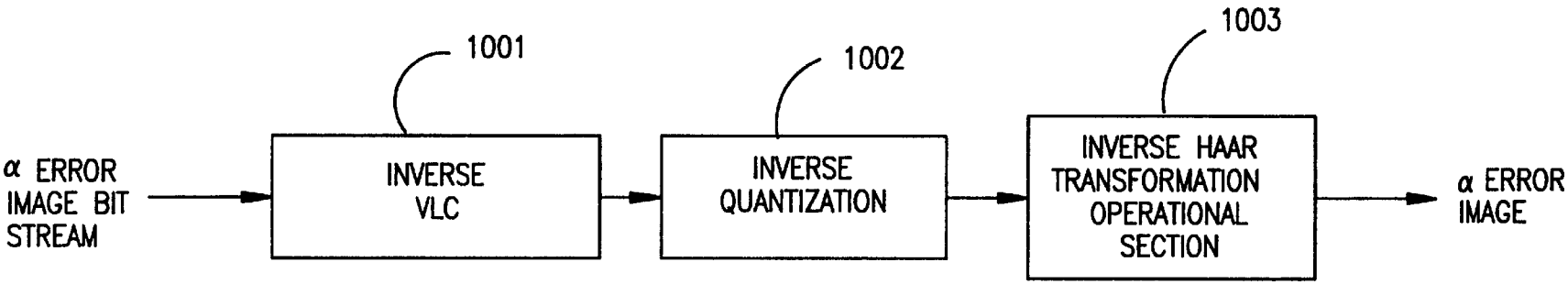
FIG. 18 is a structural view of an α plane error decoder of the present embodiment.

FIG. 17 is a structural view of the luminance plane error decoder, and 901 represents a variable-length decoding section, 902 represents an inverse-quantization section, 903 represents an inverse DCT operational section. FIG. 18 is a structural view of the α plane error decoder, and 1001 represents a variable-length decoding section, 1002 represents an inverse-quantization section, 1003 represents an inverse Haar transformation operational section. The variable-length decoding section 901 subjects the combination of the zero coefficient length and the quantization coefficient to Huffman decoding and returns it to the cosine transform coefficient. And, the inverse-quantization section 902 replaces the quantization index with the representative value, and lastly, the image of 8×8 pixel blocks is reproduced by the inverse DCT operational section 903. This processing is roughly the same with the technology disclosed in CCITT Recommendation H.261 as in the luminance plane error encoder 206, therefore, detailed description will be omitted.

The inverse Haar transformation operational section 906 is realized by taking out the column vector of 8×1 lengthwise and crosswise with respect to the Haar coefficient of 8×8, and multiplying the matrix shown in Equation 26 from the left. The action of the variable-length decoding section 1001 and the inverse-quantization section 1002 is different only in the contents of the table from said block of the luminance plane decoder 209, corresponding to the α plane error encoder 207, therefore the detailed description thereof will be omitted.

$$\frac{1}{\sqrt{8}}\begin{pmatrix} 1 & 1 & \sqrt{2} & 0 & 2 & 0 & 0 & 0 \\ 1 & 1 & \sqrt{2} & 0 & -2 & 0 & 0 & 0 \\ 1 & 1 & -\sqrt{2} & 0 & 0 & 2 & 0 & 0 \\ 1 & 1 & -\sqrt{2} & 0 & 0 & -2 & 0 & 0 \\ 1 & -1 & 0 & \sqrt{2} & 0 & 0 & 2 & 0 \\ 1 & -1 & 0 & \sqrt{2} & 0 & 0 & -2 & 0 \\ 1 & -1 & 0 & -\sqrt{2} & 0 & 0 & 0 & 2 \\ 1 & -1 & 0 & -\sqrt{2} & 0 & 0 & 0 & -2 \end{pmatrix} \tag{26}$$

Next, the layer image decoders 105 and 106 constituting the layer coding system of FIG. 9 will be described with reference to FIG. 12. FIG. 12 is a structural view of the layer image decoders 105 and 106 corresponding to the structural example of the image decoding device of the present invention (claim 14).

Referring to FIG. 11, 301 represents a demultiplexer, 302 represents a luminance plane error decoder, 303 represents an α plane error decoder, 304 represents a prediction code decoder, 305 represents a deformation synthesizer, 306 and 307 represent adders, 308 and 309 represent frame delay devices. To the input of the demultiplexer 301, there are multiplexed deformation parameters composed of the luminance error, the α error, the affine transformation parameter and motion vector relating to blocks divided into the length and the breadth 18×22. These are separated and output, respectively, to the luminance plane error decoder 302, the α plane error decoder 303 and the prediction code decoder 304.

Here, the luminance plane error decoder 302, the α-plane error decoder 303 and the deformation synthesizer 305 perform the same action with that of the luminance plane error decoder 208, the α plane error decoder 209 and the deformation synthesizer 202 of FIG. 10, respectively. The first embodiment in which the structures of the layer encoders 101 and 102 and layer decoders 105 and 106 constituting the layer encoding of FIG. 9 are as shown in FIG. 10 and FIG. 11 has been described. The present embodiment has a characteristic in that the template is up-dated sequentially as encoding between frames. The difference of the opacity among templates is subjected to the transformation encoding as the waveform information having a gray-scale. By encoding independently the α-plane, the dynamic image of the semitransparent substance such as a frosted glass and the like can be handled, being different from the second embodiment described below. Since the image is stratified, such cases where the foreground and the background can be described only by the affine transformation parameter are increased.

In this case, since only the affine transformation parameter is transmitted, and it is not required to encode the block movement component, other luminance error images and α plane error images, the encoding efficiency is greatly improved. Furthermore, when the substance is deformed and cannot be described by the affine transformation parameter, the template is up-dated by the block movement component, other luminance error images and α plane error images, thereby the image is not deteriorated largely.

By the way, the operations of Equations 19–21 carried out by the affine parameter operational section 504 are not required to be conducted in the whole image. By performing prediction except for blocks having a large error value by using Equation 14 from the predicted affine transformation parameter, the affine transformation parameter matching to the movement of a plurality of blocks, not the total block assembly divided into 18×22, can be predicted. Thereby, it becomes possible that encoding of the block movement component, other luminance error images and α plane error images for the correction of templates is conducted locally. Moreover, in the present embodiment, though the calculation of the block correlation is performed by SAD, but it is possible to use other evaluation measures such as squared error sum (SSD) and correlation coefficient.

Next, the second embodiment of the present invention (claims 15, 16) will be described with reference to FIGS. 9, 19, 21, 22, 23, 24 and 25. In the second embodiment, the structure of the layer image coding system is the same as FIG. 9. The layer image encoders 101 and 102 in FIG. 9 have the structure shown by FIG. 21 in the present embodiment. Furthermore, the different point from the first embodiment is that the structure of the layer image decoders 105 and 106 are the ones shown in FIG. 22. Here, FIG. 21 corresponds to the structural example of the third invention and FIG. 22 corresponds to the structural example of fourth invention.

Figure 21:
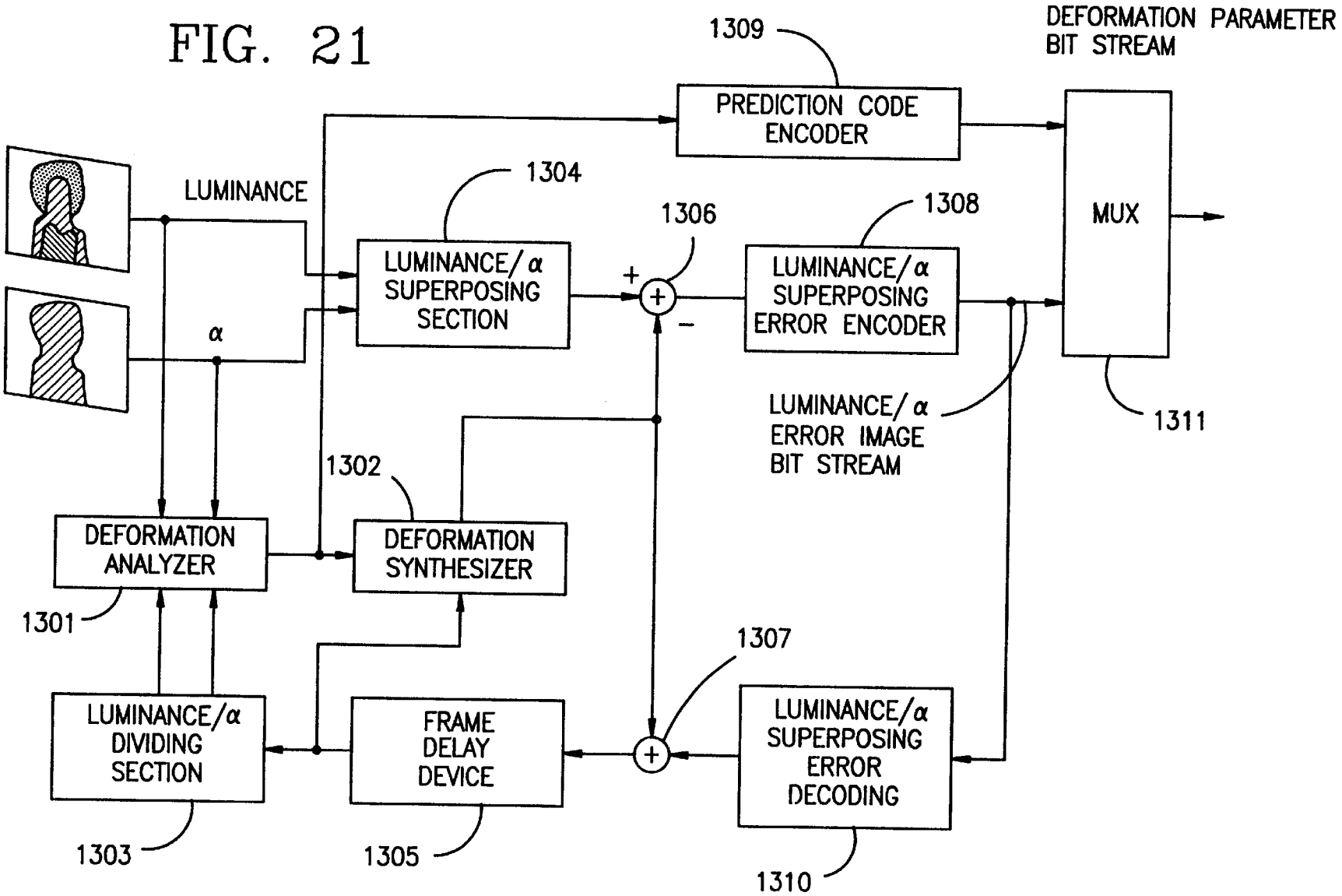
FIG. 21 is a structural view of a layer image encoder in the second embodiment of the present invention.

Referring to FIG. 21, 1301 represents a deformation analyzer, 1302 represents a deformation synthesizer, 1303 represents a luminance/α dividing section, 1304 represents a luminance/α superposing section, 1305 represents a frame delay device, 1306 represents a differential device, 1307 represents an adder, 1308 represents a luminance/α superposing error encoder, 1309 represents a prediction code encoder, 1310 represents a luminance/α superposing error encoder, and 1311 represents a multiplexer. The structure of FIG. 21 is basically the same with that of the layer encoder shown in FIG. 10.

In respective blocks constituting FIG. 21, the action of the deformation analyzer 1301, the frame delay device 1305, the differential device 1306, the adder 1307 and the prediction code encoder 1309 is the same with that of blocks having the same name in FIG. 2. In the first embodiment, though the luminance plane and the α plane are independently encoded, in the present embodiment, in the luminance/α superposing section 1304, the luminance value is superposed in the opaque region and a suitable negative value (−100) is superposed in the transparent region according to the value of α, as shown in FIG. 19. This is shown in Equation 27.

$$h(x, y) = \begin{cases} g(x, y) & \text{in the case of } a(x, y) > 0.5 \\ -10 & \text{other than the above} \end{cases} \tag{27}$$

Thereby, the luminance image superposed with the opacity information is formed. On the contrary, in the luminance/α dividing section 1303, the luminance and α are separated from the superposed luminance information by Equations 28 and 29.

$$g(x, y) = \begin{cases} h(x, y) & \text{in the case of } h(x, y) \geqq 0 \\ \text{optional} & \text{other than the above} \end{cases} \tag{28}$$

$$g(x, y) = \begin{cases} 1.0 & \text{in the case of } h(x, y) \geqq 0 \\ 0.0 & \text{other than the above} \end{cases} \tag{29}$$

The constant −10 in Equation 27 is a value set so that the luminance/α separation can be performed by Equation 28 and Equation 29, according to the quantization error with encoding/decoding. The action of the deformation synthesizer 1302 is roughly the same with that of the deformation synthesizer 202 in FIG. 2, except that the image to be handled is a luminance/α superposed image. The structure is shown in FIG. 23.

Figure 23:
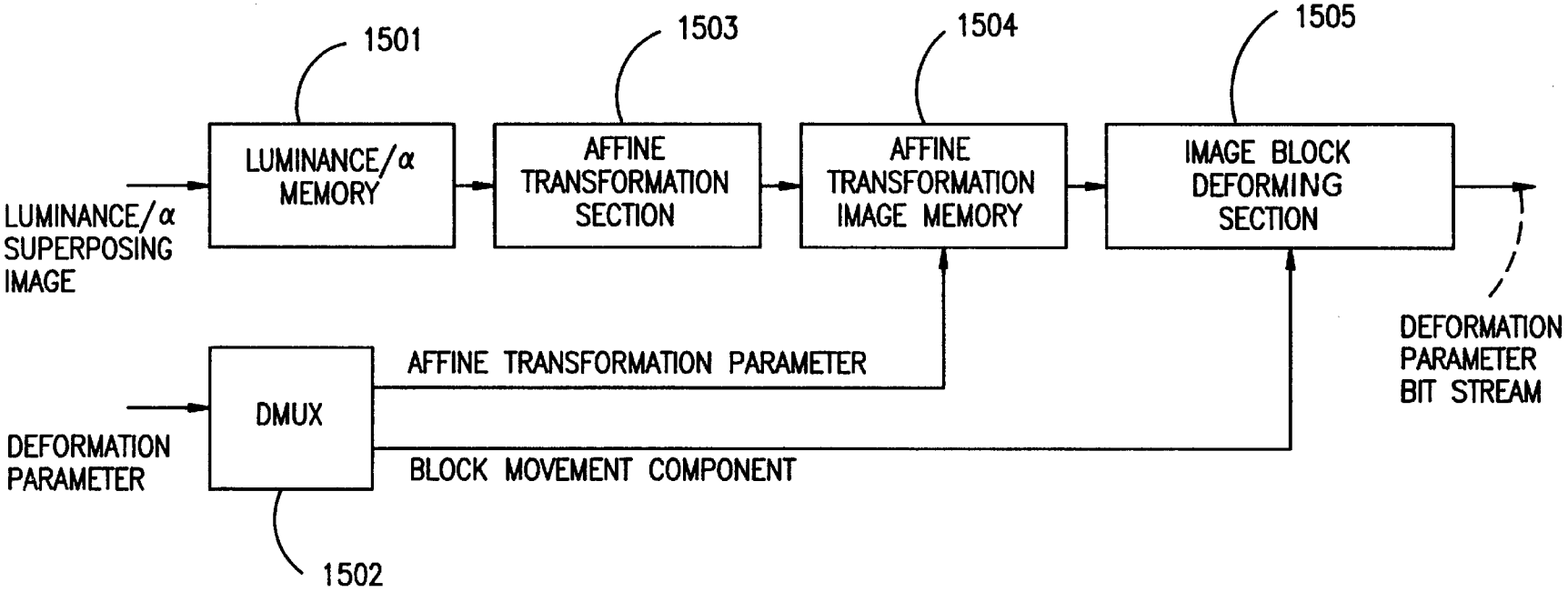
FIG. 23 is a structural view of a deformation analyzer of the present embodiment.

FIG. 23 is a structural view of the deformation synthesizers 1302 and 1405, and 1501 represents a luminance/α memory, 1502 represents a demultiplexer, 1503 represents an affine transformation section, 1504 represents an affine transformation image memory, and 1505 represents an image block deforming section. The deformation synthesizer 1302 inputs the corresponding information (deformation parameter) composed of the parallel movement component with respect to the affine transformation parameter and blocks divided into the length and the breadth of 18×22. The luminance/α memory 1501 is a memory to buffer the luminance/α superposed image. The action of other blocks of FIG. 23 is the same with that of blocks with the same name, therefore, the description thereof will be omitted.

Figure 24:
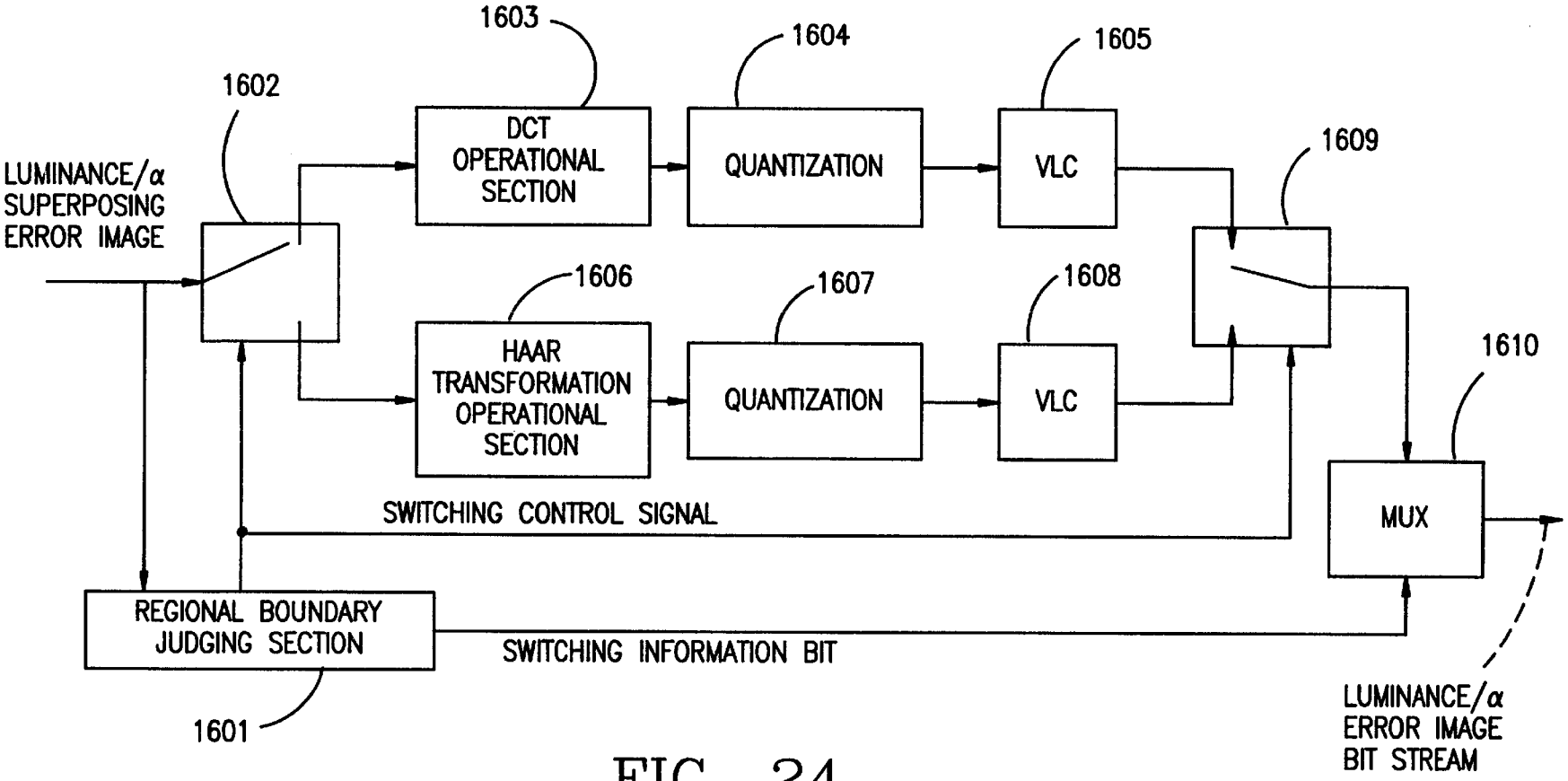
FIG. 24 is a structural view of a luminance/α superposing error encoder of the present embodiment.

The luminance/α superposing error encoder 1308 in FIG. 21 will be described below. FIG. 24 is a structural view of the luminance/α superposing error encoder 1308, and 1601 represents a domain boundary judging section, 1602 and 1609 represent switches, 1603 represents a DCT operational section, 1604 represents a quantization section, 1605 represents a variable-length coding section, 1606 represents a Haar transformation operational section, 1607 represents a quantization section, 1608 represents a variable-length coding section, and 1610 represents a multiplexer. The domain boundary judging section 1601 performs the control shown in (Table 1) and outputs the switching information bit.

TABLE 1

| Switches (1602, 1609) | Switching control signal | Input h(x, y) 8 × 8 blocks |
|---|---|---|
| Select DCT (1603–1605) | 1 | $^{\forall}h(x, y) \geqq 0$ |
| Select Haar1 (1606–1608) | 0 | $^{\forall}h(x, y) \leqq 0$ |

In the region within the substance where all values of α within blocks of 8×8 becomes 1, the action of the luminance plane error encoder 206 described with reference to FIG. 15 is performed, in the contour region where the value of at least one a within blocks of 8×8 becomes 0, the action of the α plane error encoder 207 described with reference to FIG. 16 is performed.

The action of the block with the same name in FIGS. 24, 15 and 16 is the same. In order to encode the multi-value pattern on the periphery of contour superposed with the luminance, the quantization section 1007 and the variable-length coding section 1608 have different points from the quantization section 802 and the variable-length coding section 803 in that the quantization table and the Huffman table are slightly changed. With the above-mentioned structure, the transformation code and the switching information bit are multiplexed and output by the multiplexer 1610.

Generally, for the luminance information, DCT is superior to the Haar transformation in the coding efficiency, but in the region including step edges, ripples called "mosquito noise" are caused. This is not preferable for the reproduction of a value in the periphery of the contour. Therefore, in the periphery of the contour, the Haar transformation which does not cause said mosquito noise is used.

Figure 25:
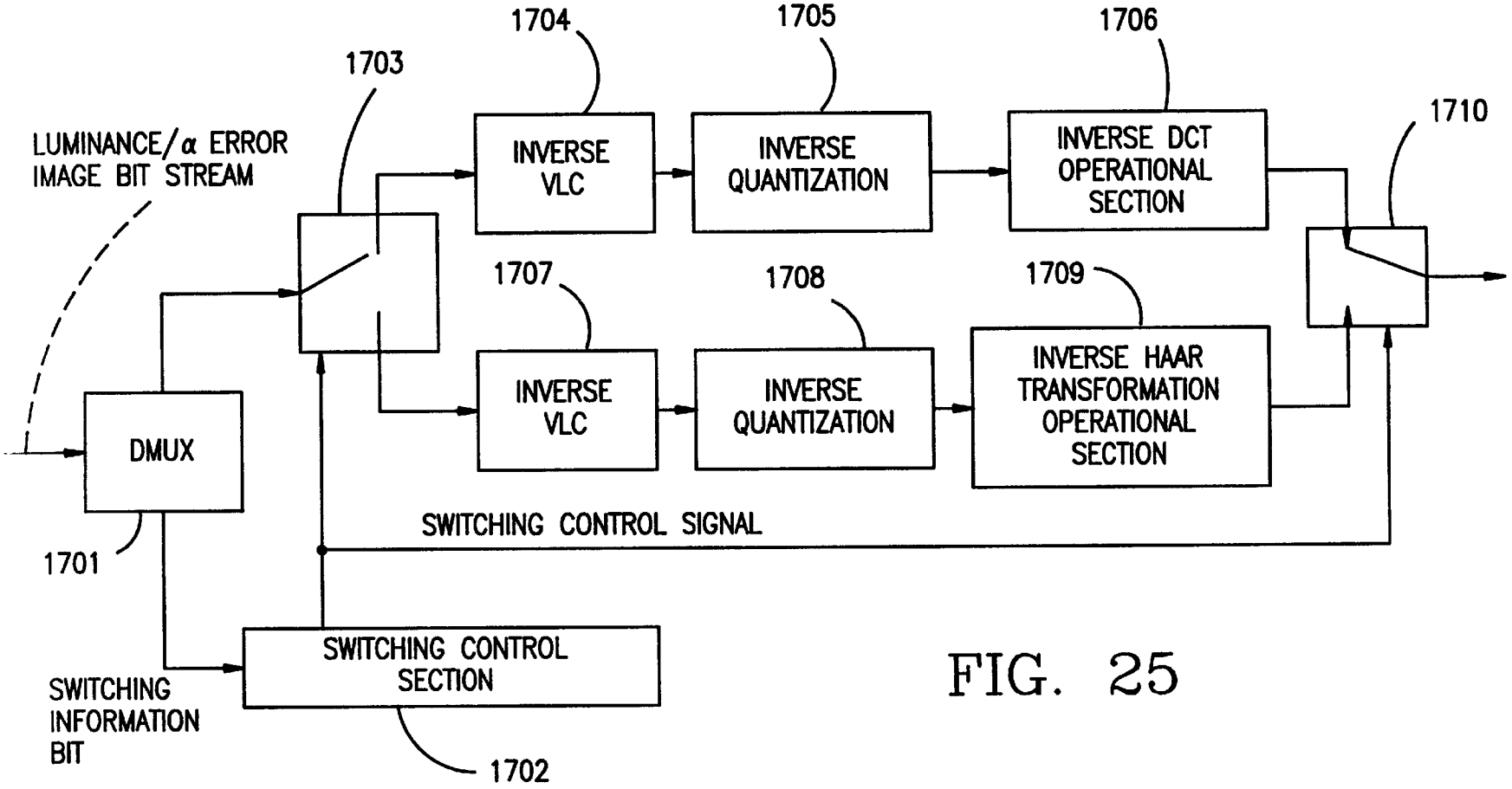
FIG. 25 is a structural view of a luminance/α superposing error decoder of the present embodiment.

Next, the structure of the luminance/α superposing error decoders 1310 and 1402 corresponding to the aforementioned luminance/α superposing error encoder 1308 will be described with reference to FIG. 25. FIG. 25 is a structural view of the luminance/α superposing error decoders 1310 and 1402, and 1701 represents a demultiplexer, 1702 represents a switching control section, 1703 and 1710 represent switches, 1704 represents a variable-length decoding section, 1706 represents an inverse Quantization section, 1706 represents an inverse DCT operational section, 1707 represents a variable-length decoding section, 1708 represents an inverse quantization section, and 1709 represents an inverse Haar transformation operational section. The switching control section 1702 controls switches 1803 and 1710 such that when the bit is 1, the inverse DCT operational section 1706 is selected and when the bit is 0, the inverse Haar transformation 1709 is selected, corresponding to (Table 1) by the switching information bit divided by the demultiplexer 1701. The action of blocks with the same name shown in FIGS. 25, 17 and 18 is the same.

The variable-length decoding section 1707 and the inverse quantization section 1708 in FIG. 25 performs the inverse processings corresponding to the quantization section 1607 and the variable-length encoding section 1608 in FIG. 24, respectively.

Figure 22:
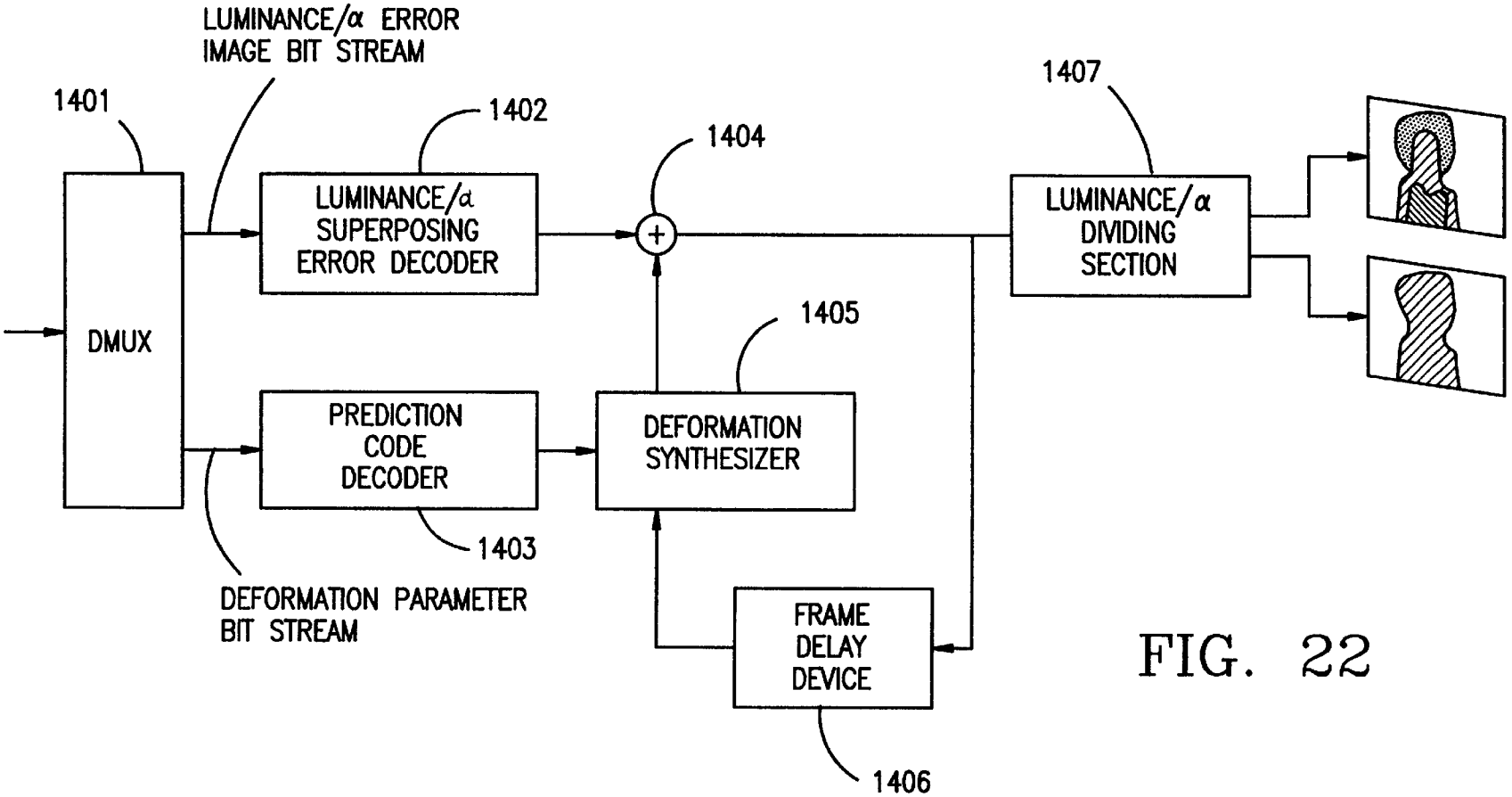
FIG. 22 is a structural view of a layer image decoder in the second embodiment.

Then, the structure of the layer image decoders 105 and 106 in FIG. 9 will be described with reference to FIG. 22. Referring to FIG. 22, 1401 represents a demultiplexer, 1402 represents a luminance/α superposing error decoder, 1403 represents a prediction code decoder, 1404 represents an adder, 1405 represents a deformation synthesizer, 1406 represents a frame delay device, and 1407 represents a luminance/α dividing section. The demultiplexer 1401 receives the output of the layer image encoders 101 and 102 having the structure shown in FIG. 21 to divide the deformation parameter and the bit series of the luminance/α error image. The divided data is output to the luminance/α superposing error decoder 1402 and the prediction code decoder 1403, respectively. The prediction code decoder 1403 outputs the affine transformation parameter and the motion vector of blocks of the length and the breadth of 18×22. The action of other blocks is the same with that of blocks with the same name described with reference to FIG. 21.

The second embodiment has been described above. In the second embodiment, differing from the first embodiment, the information of α plane degenerates from multi-values of [0, 1] to two values. Instead, by superposing the information of α plane to the luminance plane, it becomes possible to handle the deformation of templates as the difference of the luminance information. In the present embodiment, as shown in Equation 27, the luminance value of the transparent region is made to be −10, but, when the luminance of the opaque region is close to 255, there is caused discontinuity having a large luminance in the contour of a substance, and it is anticipated that the coding volume increases. In this case, dilation that the action of the luminance/α dividing sections 1303 and 1407 is changed by Equations 31 and 32 is also easy.

$$h(x, y) = \begin{cases} g(x, y) & \text{in the case of } a(x, y) > 0.5 \\ 265 & \text{other than the above} \end{cases} \tag{30}$$

$$g(x, y) = \begin{cases} h(x, y) & \text{in the case of } 0 \leqq h(x, y) \leqq 255 \\ \text{optional} & \text{other than the above} \end{cases} \tag{31}$$

$$a(x, y) = \begin{cases} 1.0 & \text{in the case of } 0 \leqq h(x, y) \leqq 255 \\ 0.0 & \text{other than the above} \end{cases} \tag{32}$$

Furthermore, it can be considered that the superposition of the α plane information to the luminance plane is performed in the vector space by dilating the luminance treated by the present embodiment to the vector. For example, let's consider the three-dimensional color vector c which is composed of the three primary colors or the luminance and color difference signal. Calculate the average c- and the dispersion E of this color vector, and calculate the range Th in the quadratic form of c-c- normalized by the dispersion E, as shown in Equation 33.

$$(c(x,y)-\bar{c})^t\Sigma^{-1}(c(x,y))-\bar{c})\leqq Th \tag{33}$$

Then Th of Equation 33 is determined for one template, and the data of the dispersion, the average vector and the range Th are accompanied thereto, the information of α plane can be superposed by using an optional vector c in which the value of the quadratic form becomes larger than the threshold.

$$c(x, y) = \begin{cases} c(x, y) & \text{in the case of } a(x, y) > 0.5 \\ e:(e-\bar{c})^t\Sigma^{-1}(e-\bar{c}) > Th & \text{other than the above} \end{cases} \tag{34}$$

This separation can be conducted by Equations 35 and 36.

$$c(x, y) = \begin{cases} c(x, y) & \text{in the case of } (c(x, y)-\bar{c})^t\Sigma^{-1}(c(x, y)-\bar{c}) \leqq Th \\ \text{optional} & \text{other than the above} \end{cases} \tag{35}$$

$$a(x, y) = \begin{cases} 1.0 & \text{in the case of } (c(x, y)-\bar{c})^t\Sigma^{-1}(c(x, y)-\bar{c}) \leqq Th \\ 0.0 & \text{other than the above} \end{cases} \tag{36}$$

According to these equations, the strength of the step edge caused in the vicinity of the contour of substance can be reduced by the separated luminance image.

Figure 26:
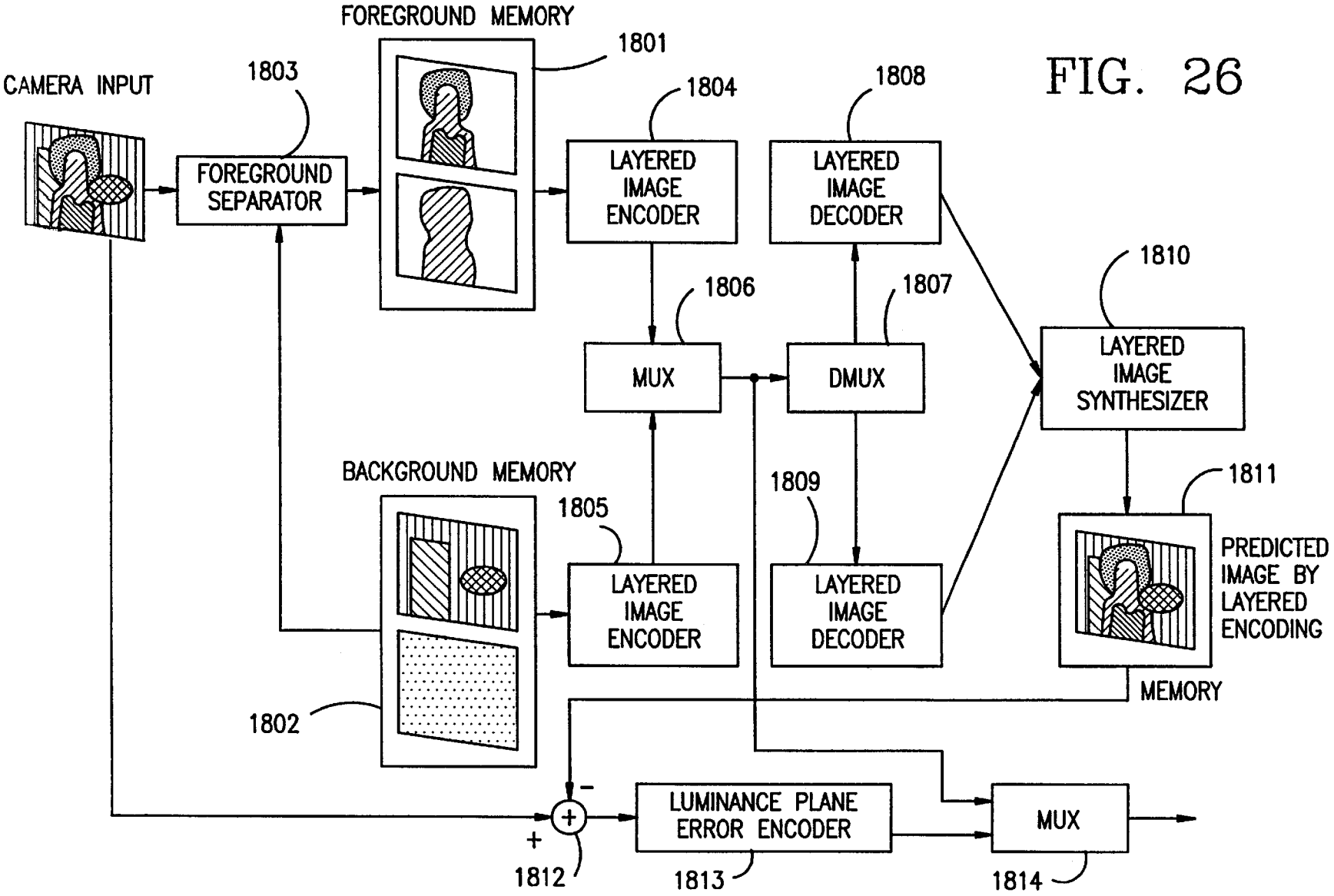
FIG. 26 is a structural view of an image-encoding device in the third embodiment.

Next, the third embodiment of the present invention (claims 17 and 18) will be described with reference to FIGS. 26 and 27. FIG. 26 is a structural view of the image-encoding device corresponding to the structural example of the present invention (claim 5), and 1801 represents a foreground memory, 1802 represents a background memory, 1803 represents a foreground separator, 1804 and 1805 represent layer image encoders, 1806 represents a multiplexer, 1807 represents a demultiplexer, 1808 and 1809 represent layer image decoders, 1810 represents a layer image synthesizer, 1811 represents a predicted image memory, 1812 represents a differential device, 1813 represents a luminance plane error encoder, and 1814 represents a multiplexer.

Figure 27:
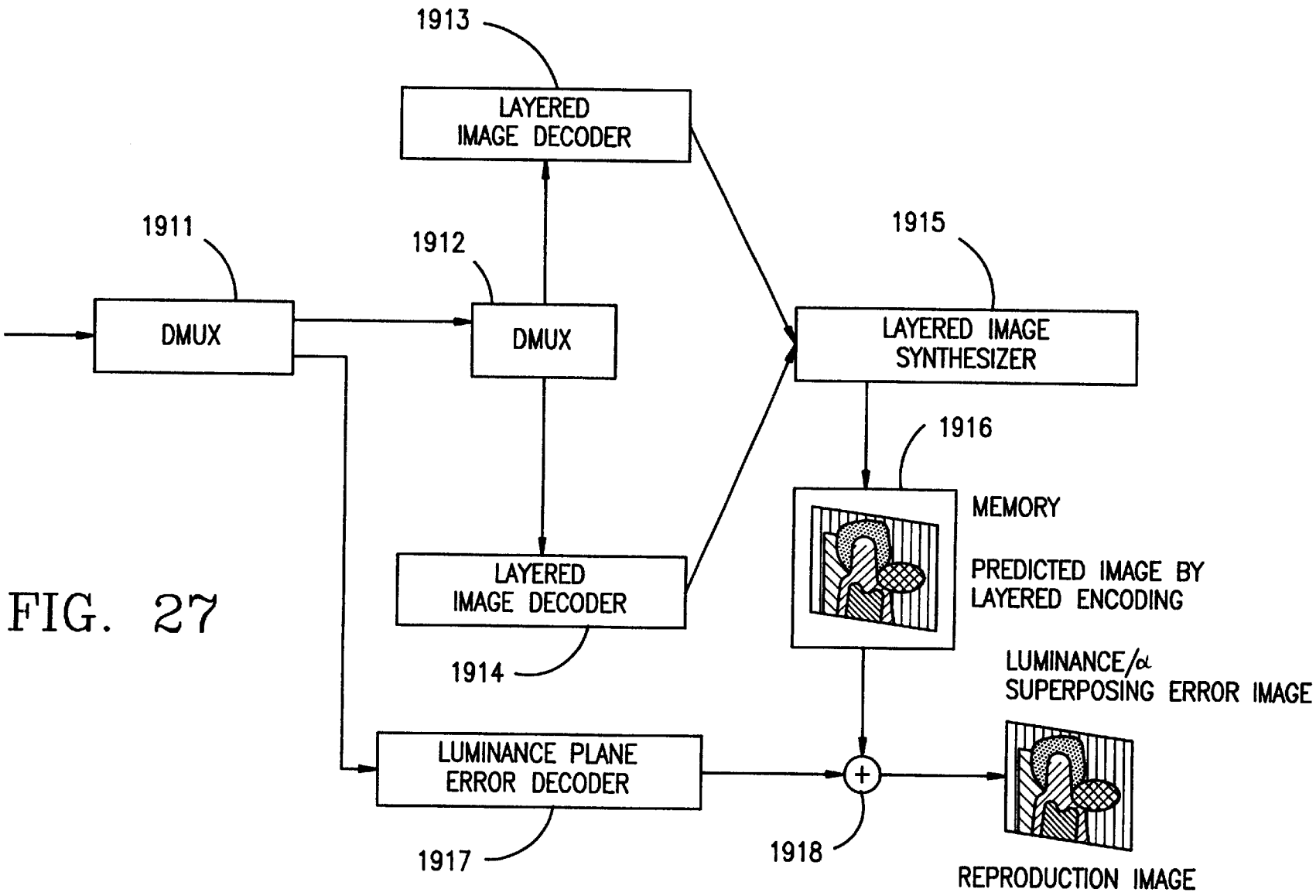
FIG. 27 is a structural view of an image-decoding device in the third embodiment.

FIG. 27 is a structural view of the image-decoding device corresponding to the structural example of the present invention (claim 6), and 1911 and 1912 represent demultiplexers, 1913 and 1914 represent layer image decoders, 1915 represents a layer image synthesizer, 1916 represents a predicted image memory, 1917 represents a luminance plane error decoder, and 1918 represents an adder. In the above blocks, for the layer image encoders 1804 and 1805, the multiplexer 1806, the demultiplexers 1807 and 1912, the layer image decoders 1808, 1809, 1913 and 1914, and the layer image synthesizers 1810 and 1915, blocks with the same name of FIG. 1 in the first or the second embodiment are used. Furthermore, the luminance plane error encoder 207 of FIG. 10 is used for the luminance plane error encoder 1813, and the luminance plane error decoder 208 of FIG. 10 is used for the luminance plane error decoder 1917.

In the image-encoding device and the image-decoding device constituted as described above, the background image is preliminarily photographed and stored in the background image memory 1802. In the foreground separator 1803, the α-value is determined by Equation 37 to separate the foreground.

$$a(x, y) = \begin{cases} 1 & \text{in the case of } \dfrac{g(x, y)-gb(x, y))^2}{g(x, y)gb(x, y)} < T \\ 0 & \text{other than the above} \end{cases} \tag{37}$$

In Equation 37, g represents the luminance value of the camera input, gb represents the luminance value of the background memory, and T represents the threshold [0, 1] determined experimentally. The result is input to the foreground memory 1801. Thereafter, the layer image is subjected to the processings described in the first embodiment or in the second embodiment, respectively, and the processed result is output to the predicted image memory 1811.

In the two embodiments described above, this is made to be the output of the reconstructed image, but in the present embodiment, the output of the predicted image memory 1811 and the difference with the original image are determined by the differential device 1812, the result is subjected to the error encoding, and the encoded result is multiplexed and output by the multiplexer 1814. The one of the decode of this output is sent to the demultiplexer 1912 through the demultiplexer 1911, and subjected to the same processings as in the first and the second conventional examples. And the other is sent to the adder 1918 through the luminance plane error decoder 1917. In the adder 1918, the predicted image re-synthesized by the layer image synthesizer 1915 and the error image are added to output the image data. In the present embodiment, when the foreground separation is successful, and the substance in the foreground performs the movement which can be described by the affine transformation parameter, high coding efficiency can be obtained as in the first and the second embodiments. In addition, by subjecting the synthesized results of the layer image to the error encoding, even if there is included an error in the result of the foreground separation, or the update of the template has been poor due to the restriction of the coding volume, transmission of the image can be recorded with a little visual deterioration.

Next, the fourth embodiment of the present invention (claims 19, 20) will be described with reference to FIGS. 28, 29, 30, 9, 13, 21 and 22. As in the second embodiment, in the present embodiment the layer image is held in a form superposed with the luminance and the opacity (see Equation 27). In the present embodiment, the transmission of the plural templates is recorded preliminarily by using the layer image encoder and the layer image decoder described in FIGS. 21 and 22 used for the second embodiment.

Figure 30:
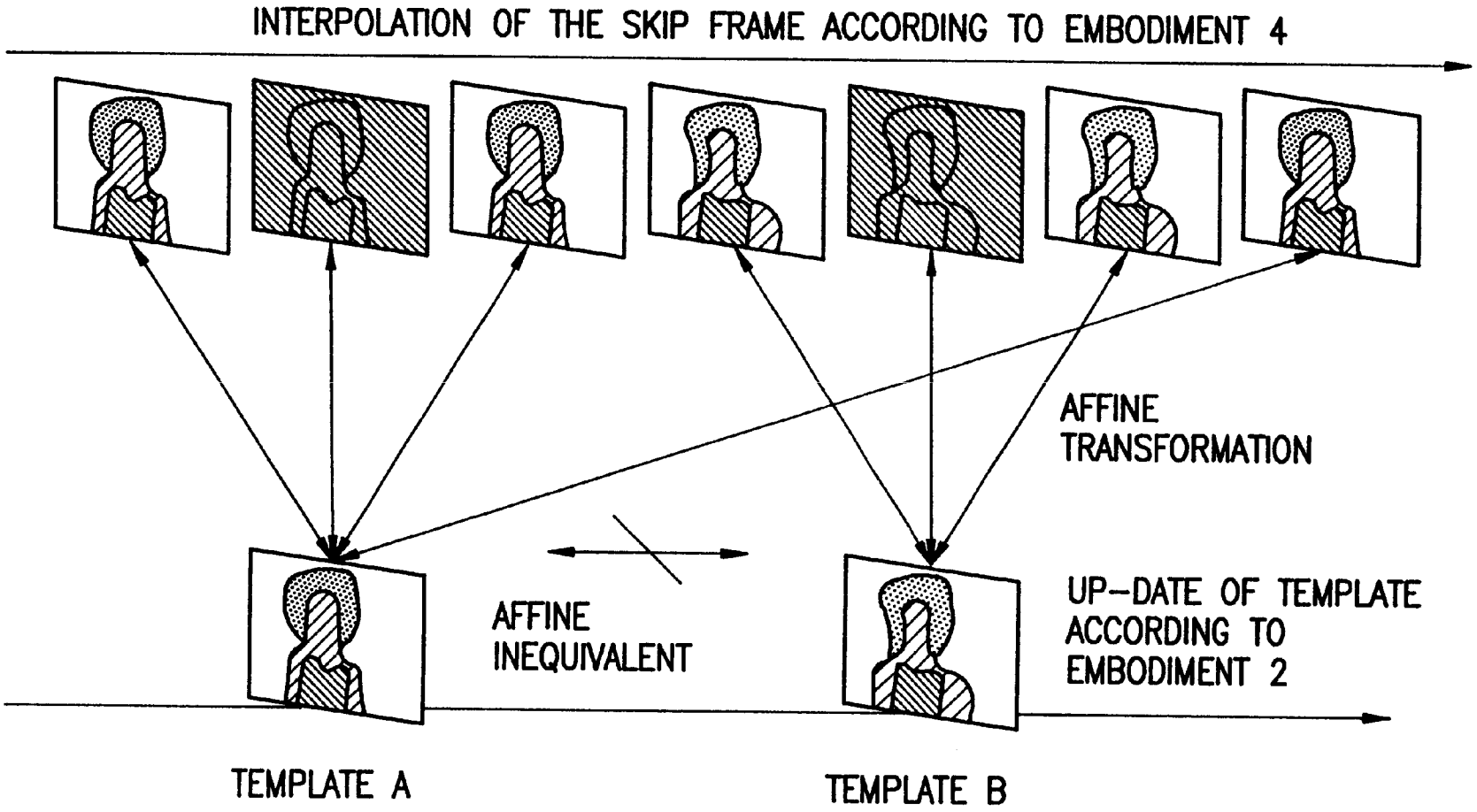
FIG. 30 is a conceptual view of the layer image encoding by multiple templates of the present embodiment.
Figure 31:
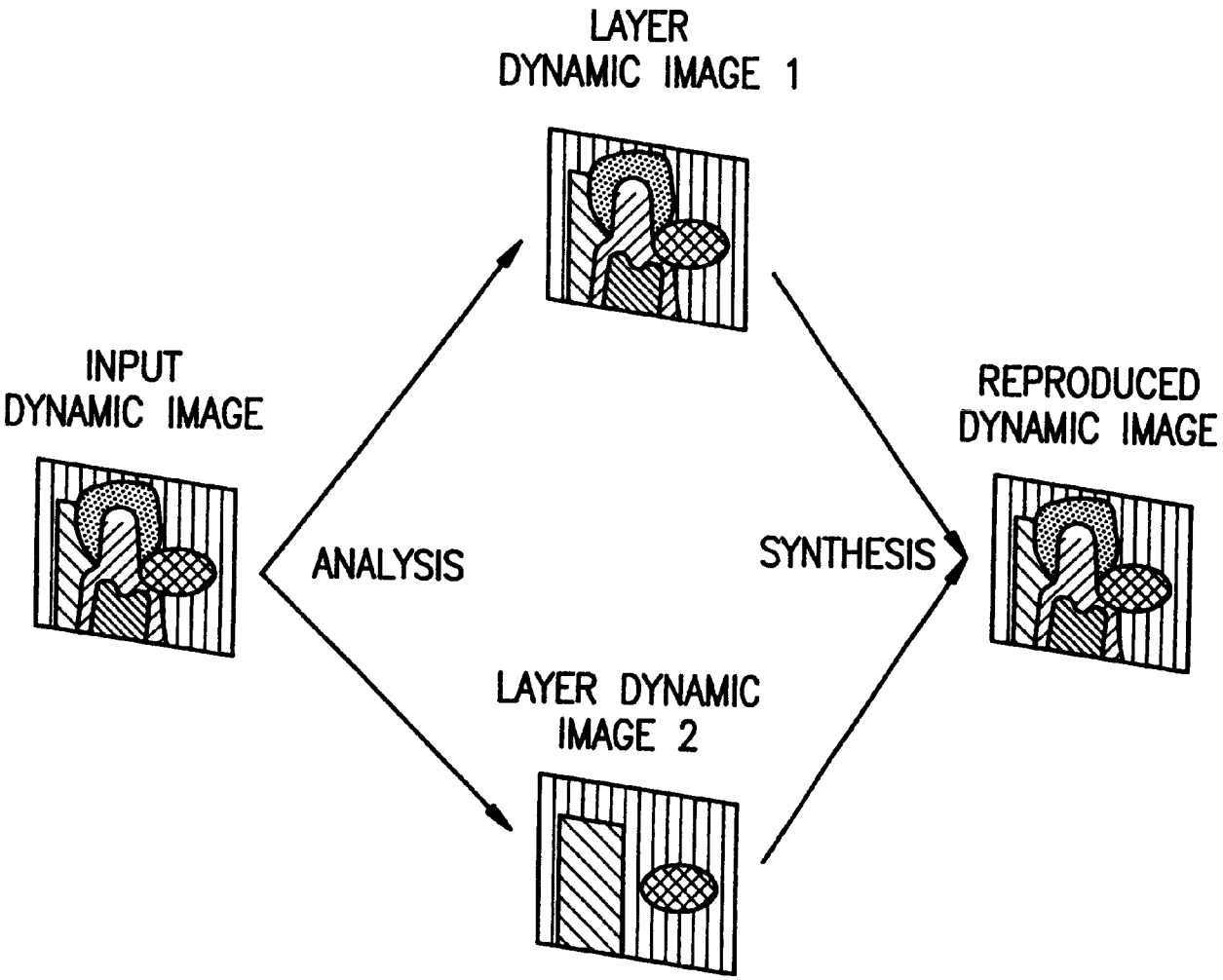
FIG. 31 (PRIOR ART)
FIG. 31 is a conceptual view of the conventional layer image encoding.

FIG. 30 is a conceptual view showing the layer image encoding by the multiple templates. In FIG. 30, images shown as template A and template B are obtained by directly connecting the layer image encoder and the layer image decoder in the second embodiment. Templates are transmitted by being selected one for several frames or one for several tens frames. As a result, encoding of templates is realized as "encoding between templates" utilizing the correlation between templates, thereby efficient transmission of templates can be performed.

Figure 28:
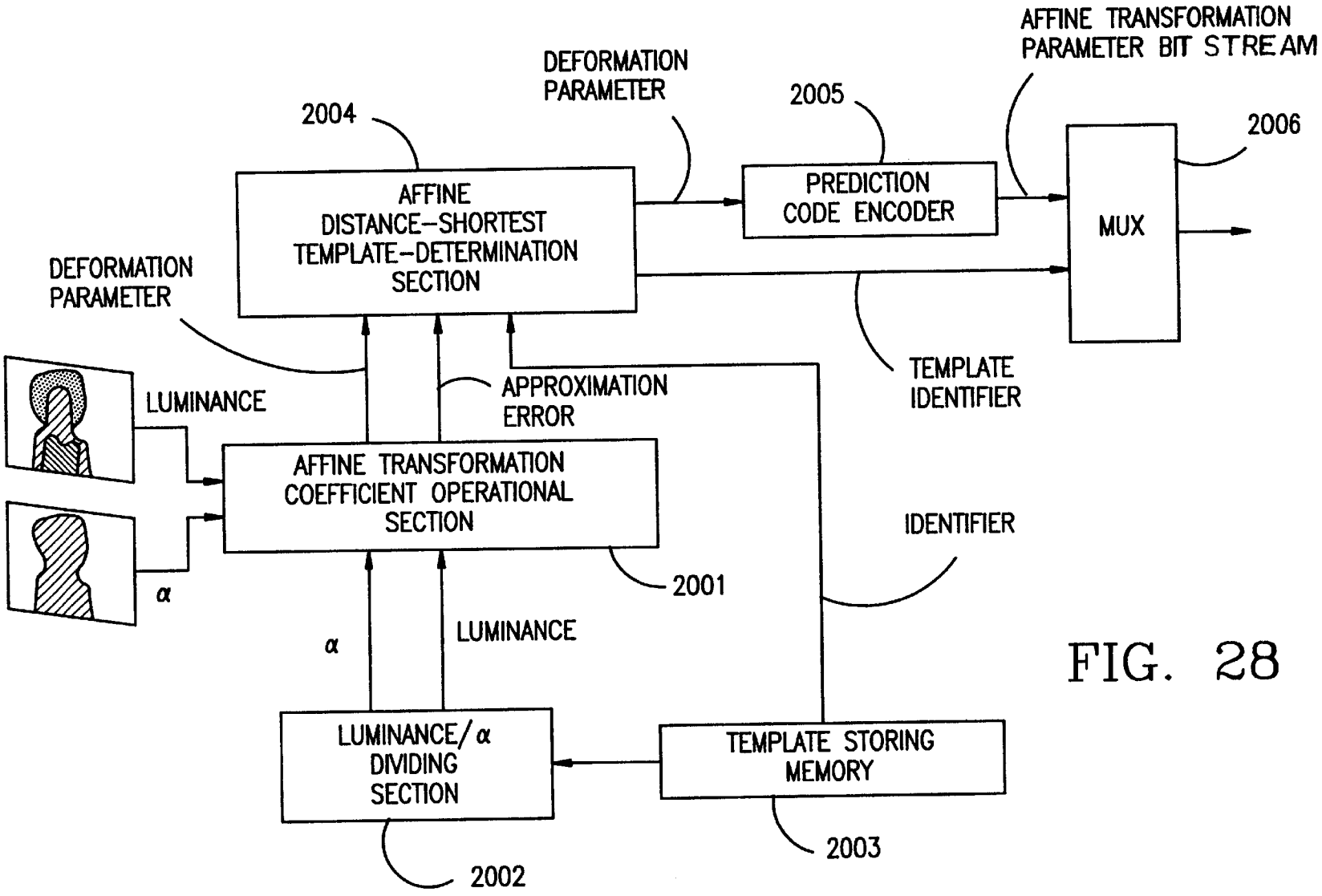
FIG. 28 is a structural view of a layer image-encoding device in the fourth embodiment.

FIG. 28 is a structural view of the image-encoding device of one embodiment of the present invention (claim 19), and 2001 represents an affine transformation coefficient operational section, 2002 represents a luminance/α dividing section, 2003 represents a template storing memory, 2004 represents an affine distance-shortest template-determination section, 2005 represents a prediction code encoder, and 2006 represents a multiplexer.

Figure 29:
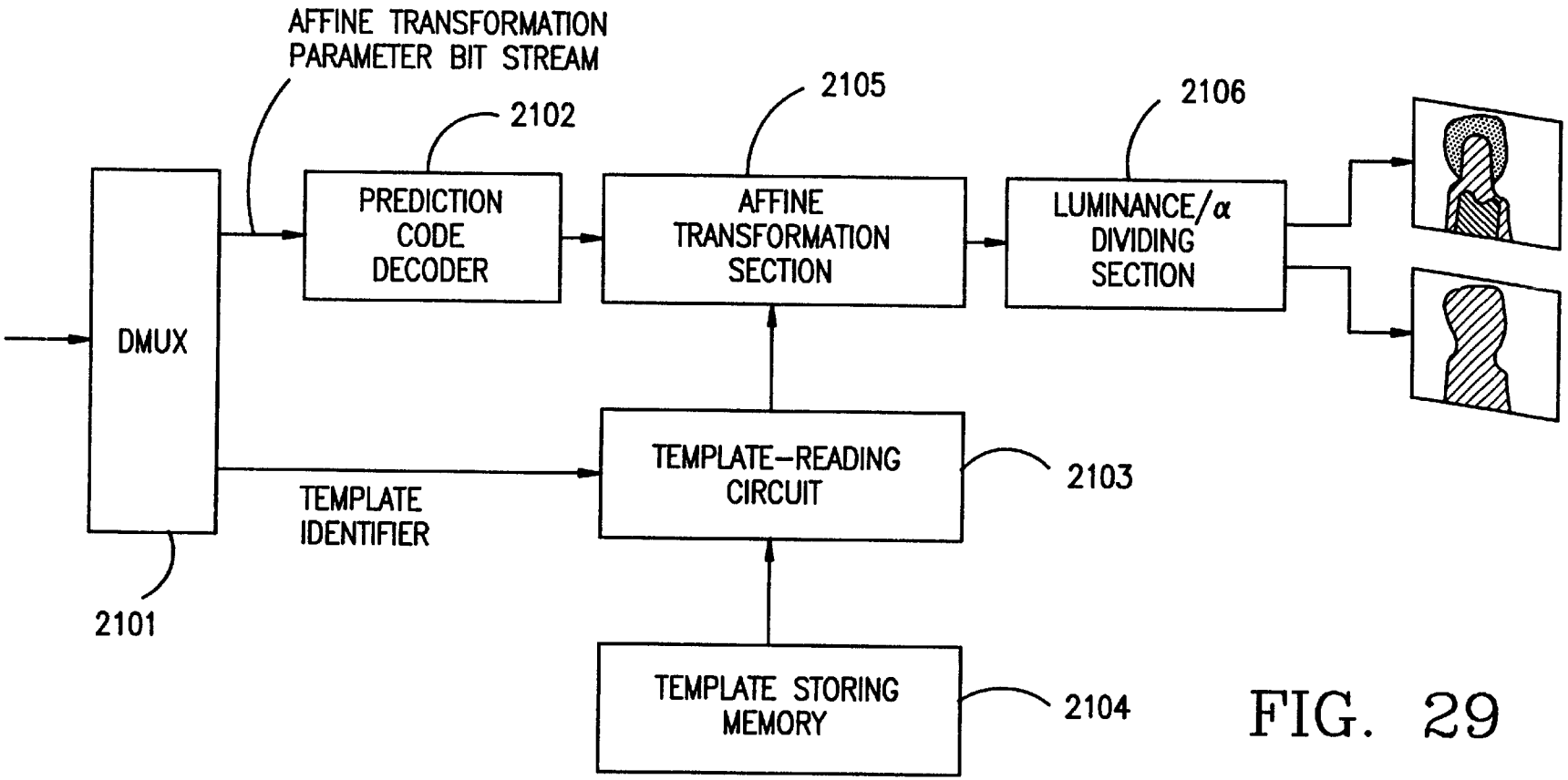
FIG. 29 is a structural view of a layer image-decoding device in the fourth embodiment.

FIG. 29 is a structural view of the image-decoding device of one embodiment of the present invention (claim 20), and 2101 represents a demultiplexer, 2102 represents a prediction code encoder, 2103 represents a template reading circuit, 2104 represents a storing memory, 2105 represents an affine transmission section, and 2106 represents a luminance/α superposing section. After transmitting the templates in the foreground and the background, the layer image encoder shown in FIG. 28 is used as the layer image encoders 101 and 102 of FIG. 9, and the layer image decoder shown in FIG. 29 is used as the layer image decoders 105 and 106 of FIG. 9.

The template after being transmitted is stored in the template memories 2003 and 2104 by giving the same identifier thereto on the encoding side the decoding side, respectively. The affine transformation coefficient operational section 2001 calculates the deviation of each block by Equation 15 from the obtained affine transformation coefficient, in addition to the action of the affine transformation coefficient operational section 408 described with reference to FIG. 13, replaces the deviation of each block by Equation 14 to determine the error sum of each block, and outputs the result to the affine distance-shortest template-determination section 2004 as the approximation error. The affine distance-shortest template-determination section 2004 selects the minimum template among the obtained approximation error and outputs the deformation parameter with the identifier thereof.

The prediction code encoder encodes the affine transformation parameter. The multiplexer 2006 multiplexes the encoded affine transformation parameter and the identifier of template to form the output bit stream of the layer image encoder. On the decoding side, the input bit stream is separated by the demultiplexer 2101, and the affine transformation parameter is decoded by the prediction code decoder 2102. The template reading circuit 2103 reads out the template corresponding to the input template identifier and outputs it to the affine transformation section 2105. The processing of the affine transformation section 2105 is the same with that of the affine transformation section 407 in FIG. 12. Furthermore, the action of the luminance/α dividing sections 2002 and 2106 is the same with that of the luminance/α dividing sections 1303 and 1407 in FIGS. 21 and 22.

According to the processings described above, as shown in FIG. 30, since the image can be transmitted based on the template which can be approximated by the affine transformation, the image can be transmitted with a very small coding volume. Particularly, since the template to be used can be selected without depending upon the order of time, high efficiency can be expected. Furthermore, since a single template is not used to synthesize the image as in the conventional example, but a plurality of templates are selectively used, it can correspond to the case where the image has an irregular deformation. Incidentally, the transformation used here is not restricted to the affine transformation, but can utilize the deformation description by the general polynomial such as the deformation of plane substance shown in Equation 22. Moreover, the handling of the template is based on the second embodiment, but it can be changed to the template used in the first embodiment.

According to the image-encoding device of the first invention and the image-decoding device of the second invention, the deformation of the reference (template) composed of the luminance and the opacity of a substance can be handled as the difference between the prediction by the correspondence between templates and the predicted result.

According to the image-encoding device of the third invention and the image-decoding device of the fourth invention, by superposing the luminance and the opacity of a substance to handle an image as the luminance image, conventional highly efficient coding technique can be applied to handle the deformation of templates efficiently.

According to the image-encoding device of the fifth invention and the image-decoding device of the sixth invention, by making the synthesis of the layer image not a final result, but a predicted image, and transmitting and recording the difference between this predicted image and the original image, the image can be transmitted and recorded without large visual deterioration, even if there is an error in the foreground/background separation processing.

According to the image-encoding device of the seventh invention and the image-decoding device of the eighth invention, a plurality of templates are preliminarily transmitted to select sequentially the template with the minimum distortion for the input image irrespective of the time order, and the image series are reproduced by the deformation of the selected template, thereby the image can be transmitted highly efficiently.

The motion vector-detecting device of the ninth invention can handle the correspondence problem of the image composed of the luminance and the opacity as the correspondence problem of the luminance image superposed with information of the luminance and the opacity. Thereby, it can obtain the correspondence result considering both the luminance and the opacity, that is, the motion vector.

The motion vector-detecting device of the tenth invention can determine the correspondence between images directly from the error function of the partial region correspondence, not by two-staged polynomial approximation after determining the motion vector, when the correspondence between images is subjected to the polynomial approximation of image coordinates, thereby motion vector which is strong against noise can be predicted.

The layer encoding which separates the projective image of a substance by the front and back relation and encodes individually can reduce the coding volume generated by the appearance of motions of different regions or concealed regions, and highly efficient coding characteristics can be expected. The layer coding has very high industrial values, since the layer images formed by chroma-modulated layout system and computer graphics have been used for the synthesis of images, recently. According to the invention described above, efficient encoding of images with luminance and opacity having irregular deformation necessary for the layer image encoding, and the strong presumption of motion vector relating thereto can be performed, and the effect is large.

[III]

Figure 32:
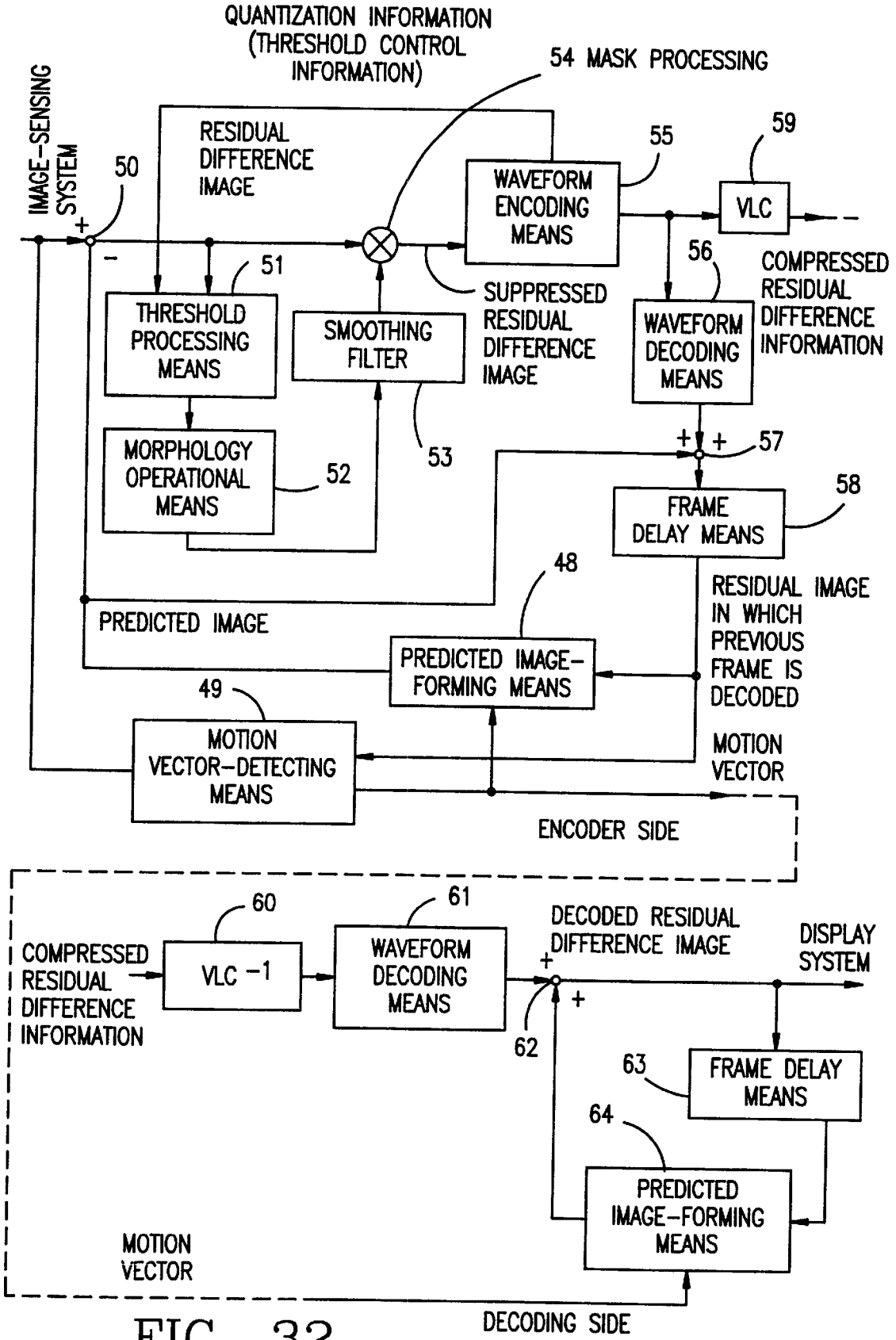
FIG. 32 is a block diagram showing the structure of the image-encoding device in the first embodiment of the present invention.

Further one embodiment of the image-encoding device according to the present invention will be described with reference to FIGS. 32, 33, 34, 35 and 36. FIG. 32 is a block diagram showing the structure of the present embodiment, and 48 represents a predicted image forming means, 49 represents a motion vector-detecting means, 50 represents an adder, 51 represents a threshold processing means, 52 represents a morphology operational means, 53 represents a smoothing filter, 54 represents a mask processing means, 55 represents a waveform-encoding means, 56 represents a waveform-decoding means, 57 represents an adder, 58 represents a frame delay means, 59 represents a Huffman encoder, 60 represents a Huffman decoder, 61 represents a waveform decoding means, 62 represents an adder, 63 represents a frame delay means, and 64 represents a predicted image forming means. FIG. 32, blocks of from 48 to 58 constitute devices on the encoding side and blocks of from 60 to 64 constitute devices on the decoding side. The action of the embodiment of this image-encoding device will be described with the description of one embodiment of the image-encoding method of the present invention. However, since the structure and the action of each block constituting the present embodiment are the same with those of blocks with the same name of the image-encoding device (FIG. 37) based on H.261 shown by the conventional example except of blocks of from 51 to 54, description for the overlapping portion will be omitted, and only the different points from the conventional examples will be emphasized and described.

Figure 33:
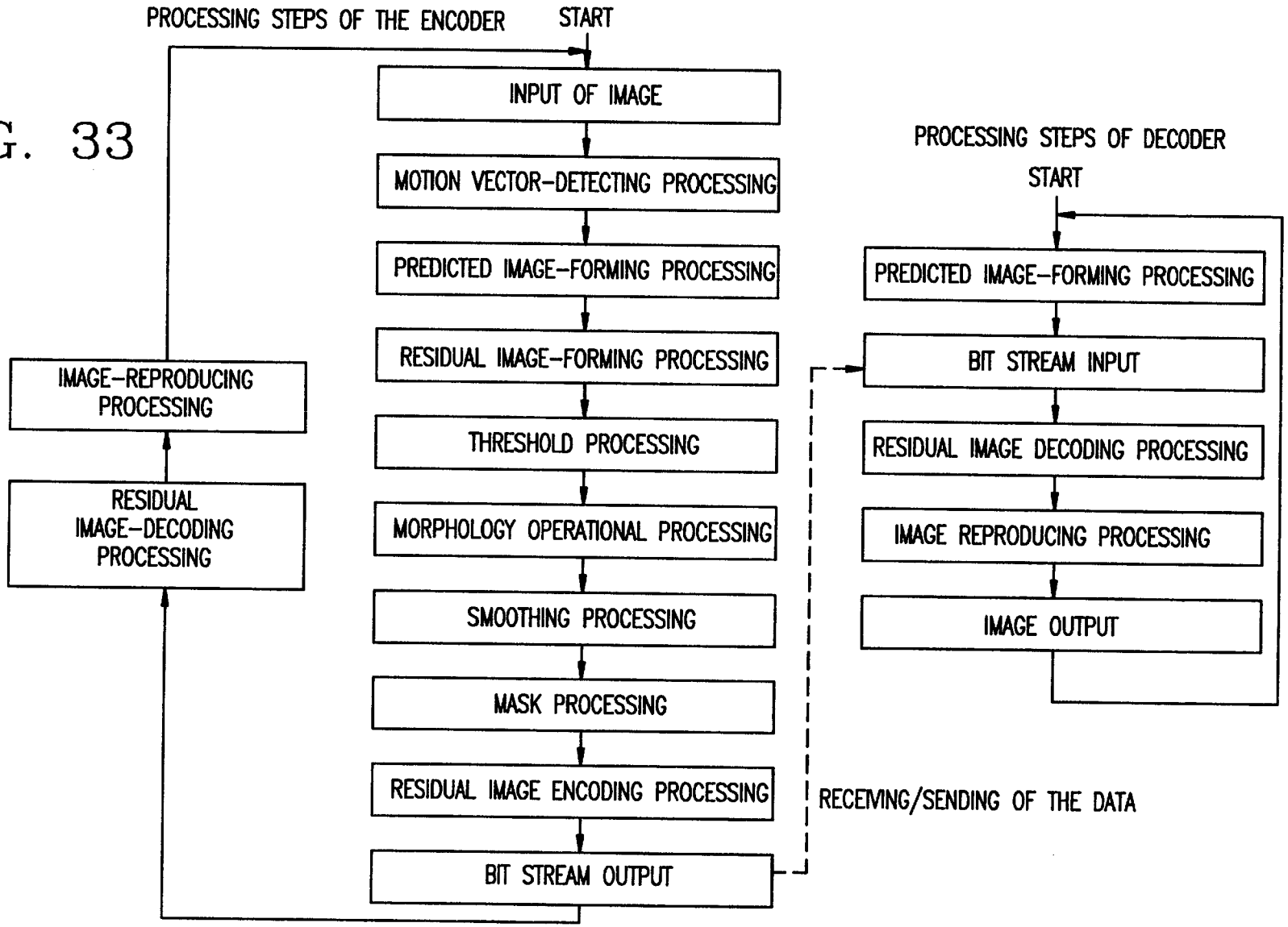
FIG. 33 is a flow chart showing the image encoding in the first embodiment of the present invention.
Figure 34A:
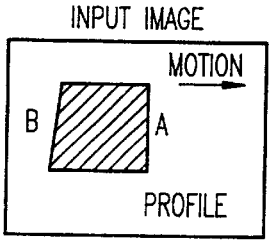
FIGS. 34(a)–(l) are diagrams showing the motion compensation, the threshold processing and the morphology operation of the present embodiment.
Figure 34B:
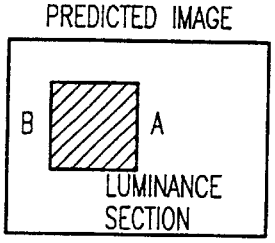
Figure 34C:
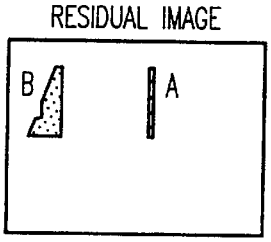
Figure 34D:
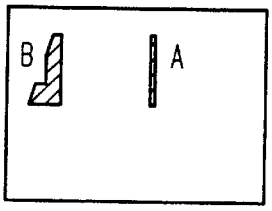
Figure 34E:
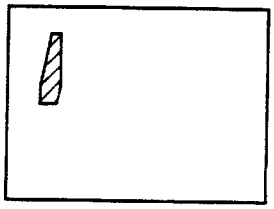
Figure 34F:
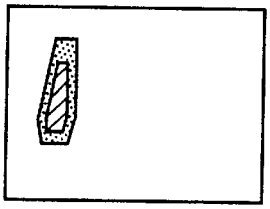
Figure 34G:
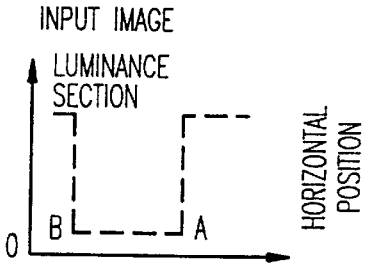
Figure 34H:
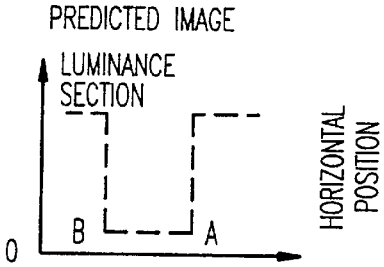
Figure 34I:
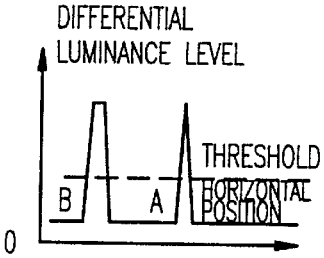
Figure 34J:
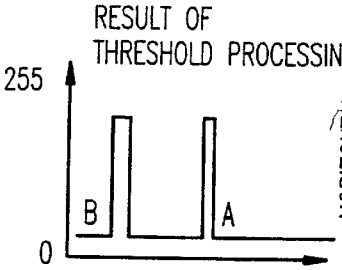
Figure 34K:
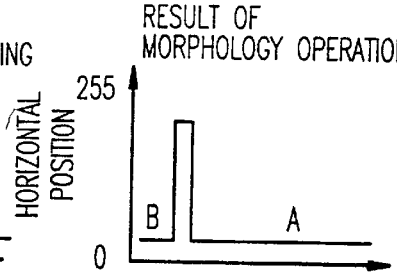
Figure 34L:
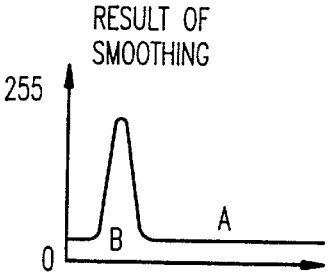
Figure 35:
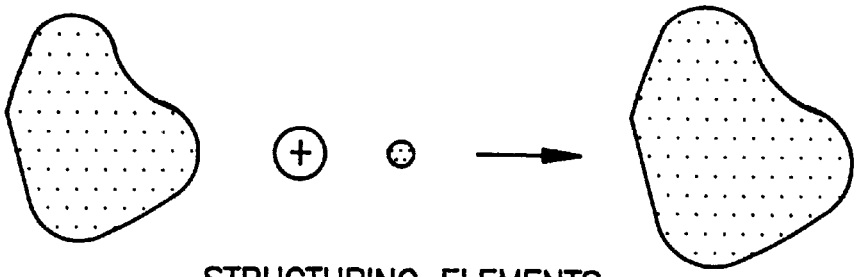
FIG. 35 is a diagram showing the dilation and erosion processings and the structuring elements in said morphology operation.
Figure 35:
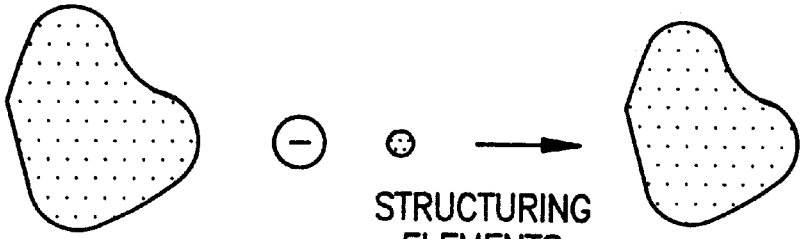
Figure 35:
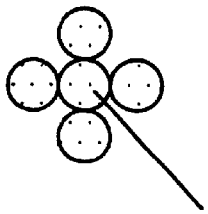

FIG. 33 is a flow chart of one embodiment of the image-encoding method of the present invention corresponding to FIG. 32. As in the image-encoding method based on H.261, the residual difference image e(x) (x is a positional vector on the screen) is formed through input of the image input, detection of the motion vector and formation of the predicted image. This residual difference image is subjected to the threshold processing determined by the average luminance quantization width Q and the minimum quantization width Q_min at the time of encoding of the previous frame to be made f(x). This processing is shown in Equation 113:

$$f(x) = \begin{cases} 255 & \text{in the case of } e(x) \geqq Q - Qmin \\ 0 & \text{other than the above} \end{cases} \tag{113}$$

This f(x) represents a region to be subjected to the residual difference encoding, and 0 represents a region other than said region. This corresponds to the resultant state of the threshold processing shown in FIGS. 34(d) and (j). Here, considering 255 to be an image inside the region, and 0 to be an image outside the region, in f(x)={255, 0}, the opening operation shown in (Equation 107) is performed. The structuring elements are central pixel and four vicinity elements shown in the lower stage of FIG. 35. Thereby, a pattern of the morphology operation results of (e) and (k) of FIG. 34 can be obtained. In FIG. 32, this processing is performed by the morphology operation means 52. In the present embodiment, the binary pattern f(x) is subjected to the smoothing processing. Smoothing is performed by horizontal and vertical one-dimensional filtering comprising five coefficients of 1, 2, 6, 2 and 1 normalized by 1/12. In FIG. 52, this is carried out by a smoothing filter 53. As a result, a mask pattern can be obtained as multi-values of [255, 0]. This is assumed to be h(x). By using the h(x), the mask processing shown in (Equation 114) is performed for each pixel position x.

$$e'(x)=e(x)h(x)/255 \tag{114}$$

The e'(x) in (Equation 114) is the suppressed residual difference image. In FIG. 32, this is performed by the mask processing means 54. In FIG. 34, the results of the smoothing processing of (f) and (l) can be obtained. Though the residual difference in the form of impulse is suppressed by the mask processing by the morphology operation of the opening, there is a threat that discontinuity may be caused in the decoding results in the boundary of the suppressed region and the unsuppressed region. Therefore, in the present embodiment, by subjecting the two-valued mask pattern to the smoothing processing, the threat of visual disturbance which may be caused in the two-valued mask processing is removed. The processing of the present embodiment is the same with the processing based on H.261 except that the residual difference image is masked in such a manner. As a matter of fact, the data formed in the present embodiment can be reproduced on the decoding side of the convention H.261 device shown in FIG. 37.

The second and the third embodiments generated by diverging the morphology operation means of the present embodiment will now be described. One is to be realized as the opening processing of the concentration morphology described in (Equation 111) by considering f(x)={255, 0} to be a multi-values image. Namely, the second embodiment is the one in which the action of the morphology operational means 52 in FIG. 32 is changed from (Equation 7) to (Equation 111).

The third embodiment is realized by replacing the action of the morphology operational means 52 by the median filtering processing of 3×3 with respect to f(x)={255, 0}. In the afore-mentioned Literature 1, "Academic Press" (Henk J. A. M. Heijmans: Morphological Image operators, Academic Press, Inc. 1994), page 457, it is described that the repetitive application of the median filter is equivalent to the opening processing. Therefore, even if the morphology operational means is realized by the intermediate value filter, the same action and effects can be obtained as those of the first and the second embodiments.

Figure 36A:
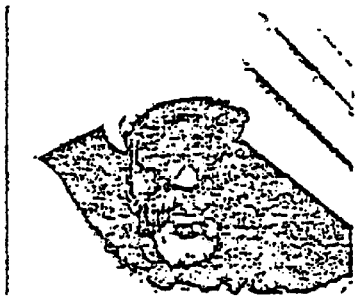
FIGS. 36(a)–(e) are diagrams showing the processing results in the first embodiment.
Figure 36B:
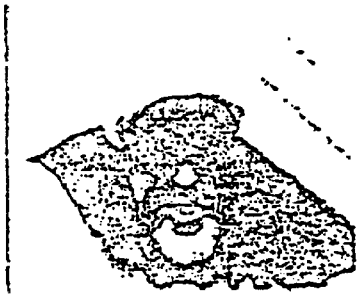
Figure 36C:
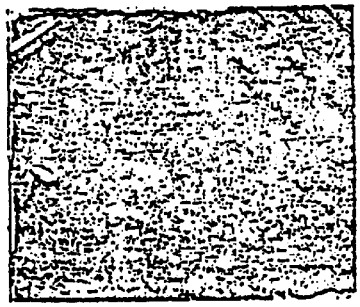
Figure 36D:
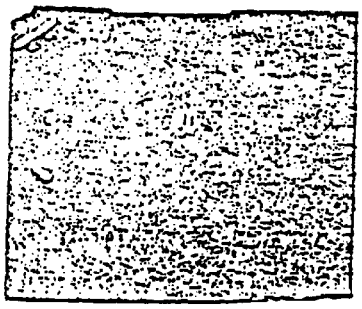
Figure 36E:
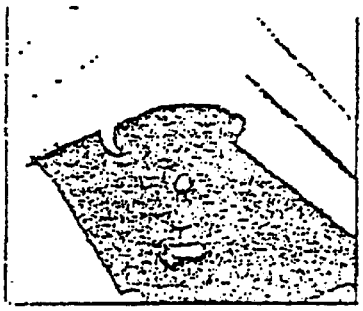
Figure 37:
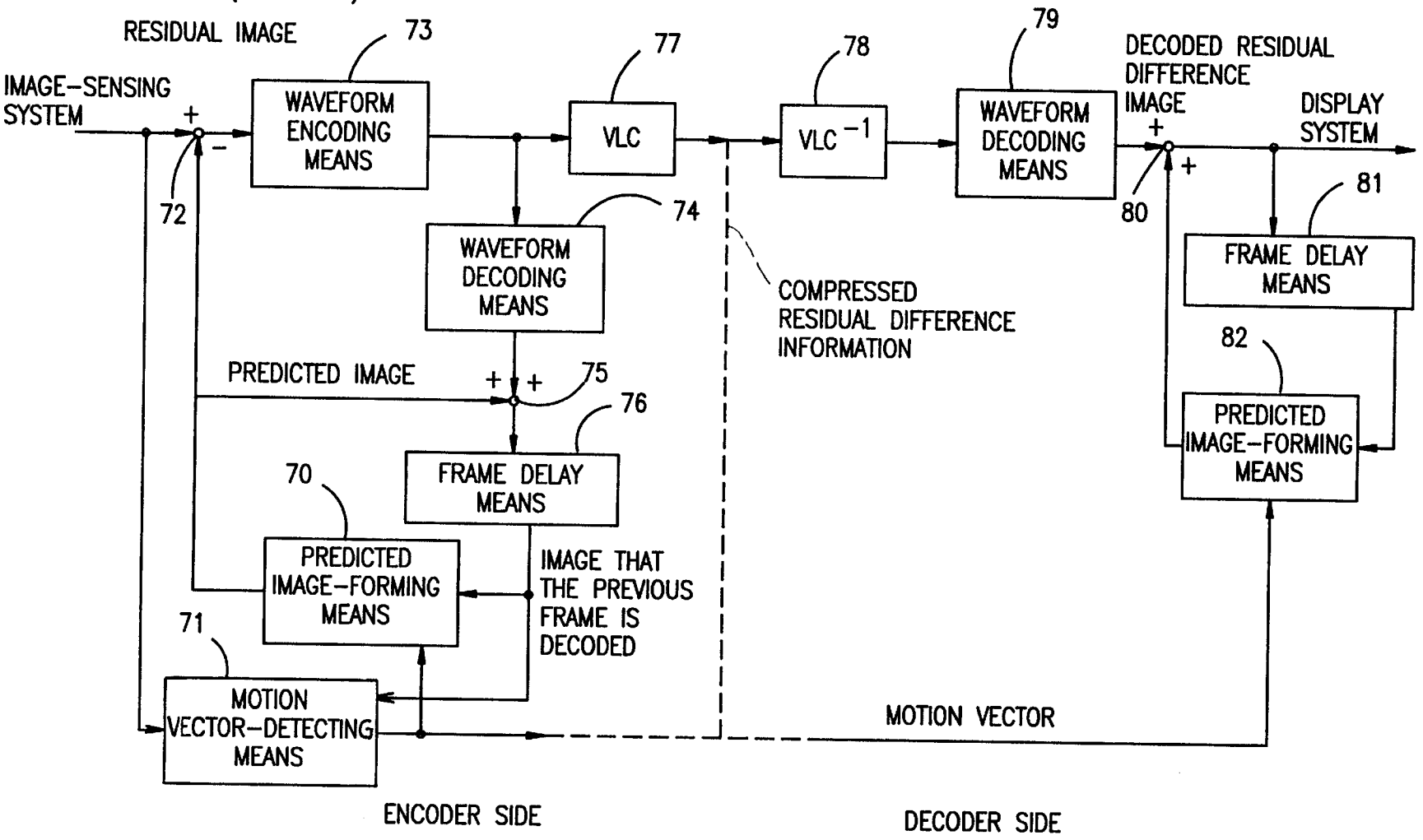
FIG. 37 (PRIOR ART)
FIG. 37 is a block diagram showing the structure of the conventional image encoding device.

FIG. 36 shows the result applied to the actual image in the first embodiment, and FIGS. 36(a), (b), (c), (d) and (e) are the results of input image, predicted image, residual difference image, mask pattern and image decoding, respectively. Though the edge of the background, and the residual difference components caused in the boundary of a figure are not encoded, visually proper result has been obtained.

In addition, in H.261, rate control is performed according to the state of output buffer. Corresponding thereto, in the present embodiment, the threshold used for the threshold processing changes for every frame from the average luminance quantization width of the previous frame. When there is a room in the output buffer, the threshold becomes small to make the suppression of the residual difference image small. Particularly, when Q=Q_min, the threshold shown in (Equation 113) becomes 0, and the mask patterns become all 255, irrespective of the morphology operation and the smoothing processing, thereby suppression of the residual difference encoding cannot be performed at all. Thereby, an image quality adaptive according to the state of output buffer can be maintained.

As described above, according to the present invention, the coding volume in the region where even if residual difference encoding is not conducted, any large visual deterioration is not caused, among the residual difference images, can be saved, thus the coding efficiency can be improved. Moreover, with the same coding volume, large coding volume can be allotted according to the region to be subjected to the residual difference coding, thereby the image quality can be improved.

What is claimed is:

1. An image encoding method comprising:

dividing an image into blocks each containing a plurality of pixels;

extracting a block having pixels with different values to each other from among said divided respective blocks;

obtaining a positional information for identifying a position of said extracted block in said image and subjecting the positional information to contour encoding; and waveform encoding a pixel pattern in said extracted block.

2. An image decoding method comprising:

inputting at least contour encoded data which has been subjected to contour encoding as information showing that pixels having different values exist in a certain block, said certain block among such blocks having a plurality of pixels and being formed by dividing an image into blocks, and encoded data based on encoding a pixel pattern in said certain block which has been subjected to the contour encoding;

dividing an image to be decoded into blocks;

decoding said inputted contour encoded data, thereby to identify said certain block having pixels with different values mixed together from among said divided blocks; and decoding the encoded data of the pixel pattern in said identified block.

3. An image encoding device comprising:

a dividing means for dividing an image into blocks each containing a plurality of pixels;

an extracting means for extracting a block having pixels with different values present in the same block from among said divided respective blocks;

a contour encoding means for obtaining positional information for identifying the position on said image of said extracted block and to subject the positional information to contour encoding; and a waveform encoding means for waveform encoding a pixel pattern in said extracted block.

4. An image-decoding device comprising:

an input means for inputting at least a contour encoded data which has been subjected to contour encoding as information showing that pixels having different values exist in a certain block, said certain block among such blocks having a plurality of pixels and being formed by dividing an image into blocks, and encoded data based on encoding a pixel pattern in said certain block which has been subjected to the contour encoding;

a dividing means for dividing the image to be decoded into said blocks;

an identifying means for decoding said inputted contour encoded data, thereby to identify said certain block having pixels with different values mixed together from among said divided blocks; and a decoding means for decoding the encoded data of the pixel pattern in said identified block.

5. An image encoding method comprising:

forming a code book by subjecting respective pixel values of pixel patterns obtained from dividing an image into regions containing a plurality of pixels to a quantization patterning so that pixel values thereof are quantized, subjecting respective pixel values of a pixel pattern in an image to be encoded to a quantization patterning so that pixel values thereof are quantized, comparing the quantization-pattern pixel values and said code book, selecting an approximate quantization pattern from the code book for the quantization-patterned pixel values, and transmitting index information corresponding to the selected quantization pattern from the code book.

6. An image-decoding method wherein a code book formed by subjecting respective pixel values of pixel patterns obtained from dividing a predetermined image into regions containing a plurality of pixels to a quantization patterning so that pixel values thereof are quantized, respective pixel values of the pixel pattern in an image to be encoded are subjected to a quantization patterning so that pixel values thereof are quantized, the quantization-patterned pixel values and the code book are compared, an approximate quantization pattern is selected from the code book for the quantization-patterned pixel values, and index information corresponding to the selected quantization pattern from the code book is transmitted, the image-decoding method comprising:

inputting the transmitted index information;

examining a code book substantially identical with the encoding code book and reading out a quantization pattern corresponding to the transmitted index information; and decoding an image to be decoded as an image in which the pixel values are quantized more finely than said predetermined image using the read out quantization pattern.

7. An image encoding device comprising:

a code book formed by subjecting respective pixel values of pixel patterns obtained from dividing an image into regions containing a plurality of pixels to a quantization patterning so that pixel values thereof are quantized, a quantization patterning means for subjecting respective pixel values of a pixel pattern in an image to be encoded to a quantization patterning so that pixel values thereof are quantized, a selecting means for comparing the quantization-patterned pixel values and said code book and selecting an approximate quantization pattern from the code book for the quantization-patterned pixel values, and a transmission means for transmitting index information corresponding to the selected quantization pattern from the code book.

8. An image-decoding device wherein an encoding code book is formed by subjecting respective pixel values of pixel patterns obtained from dividing a predetermined image into regions containing a plurality of pixels to a quantization patterning so that pixel values thereof are quantized, respective pixel values of the pixel pattern in an image to be encoded are subjected to a quantization patterning so that pixel values thereof are quantized, the quantization-patterned pixel values and the encoding code book are compared, an approximate quantization pattern is selected from the code book for the quantization-patterned pixel values, and index information corresponding to the selected quantization pattern from the code book is transmitted, the image-decoding device comprising:

an inputting means for inputting the transmitted index information;

a code book substantially identical with the encoding code book;

a reading means for examining said code book and read out a quantization pattern corresponding to the transmitted index information; and a decoding means for decoding the image to be decoded as the image in which the pixel values are quantized more finely than said image to be encoded using the read-out quantization pattern.

9. An image processing method according to claim 5, further comprising:

determining whether a pixel pattern is complex or simple based on when the pixel pattern forming an image is complex, a degree of smoothing applied to the pixel value is made stronger than a case when the pattern is simpler, and when the pixel pattern is simple, the degree of smoothing applied to the pixel value is made weaker than a case when the pattern is more complex.

10. An image processing method according to claim 9, further comprising determining whether the pattern of the pixel value forming the image is complex or simple based on differential values in a horizontal direction, a vertical direction and a diagonal direction of said pixel value.

11. An image processing device according to claim 7 further comprising:

an evaluating means for evaluating whether the pixel pattern forming an image is complex or simple; and a smoothing means which makes a degree of smoothing applied to the pixel value stronger than a case where the pattern is simpler when said evaluating means determines that the pixel pattern is complex by said evaluating means, and makes a degree of smoothing applied to a pixel value weaker than a case where the pattern is more complex when said evaluated means determines that the pixel pattern is simple by said evaluating means.

12. An image processing device according to claim 11, wherein said evaluating means evaluates whether the pixel pattern is complex or simple by differential values in a horizontal direction, a vertical direction and a diagonal direction of said pixel value.

13. An image encoding device, comprising:

a predicting means for predicting an image based on a luminance and an opacity for an image which is to be encoded by using a correspondence between partial regions from a reference image composed of a luminance and an opacity and an inputted image series composed of a luminance and an opacity of a substance, a prediction coding means for encoding the correspondence between the partial regions in said predicting means as a prediction code, an error operational means which determines a difference of the luminance and the opacity between said predicted image and said image to be encoded as an error image, and an error coding means for encoding said error images as an error image code; and wherein said image series are transmitted as the error image code and the prediction code with respect to the reference image.

14. An image decoding device for holding the same reference image as that of the image encoding device according to claim 13 and decoding an output of said image encoding device, said image decoding device comprising:

a prediction code decoding means for decoding the correspondence between the partial regions from the prediction code, a predicted image formation means for forming a predicted image from the reference image by using the decoded correspondence between the partial regions, an error image decoding means for decoding the error image from the error image code, and an adding means for adding the predicted image and the error image to obtain an image comprising the luminance and the opacity; and wherein an image composed of the luminance and the opacity is decoded as the output of said predicted image formation means or said adding means.

15. An image encoding device according to claim 13 further comprising:

a superposing means for inputting the luminance and the opacity of the substance, classifying a region of the image into a transparent region and an opaque region, and forming a luminance image which is superposed with a luminance information and an opacity information in a manner that a luminance value of the substance is for the opaque region and a value outside the range of the luminance value is for the transparent region, wherein the luminance image superposed with the luminance and the opacity is encoded.

16. An image decoding device for decoding the output of the image encoding device of claim 15, said image decoding device comprising:

a dividing means for dividing the luminance image into the opacity image and the luminance image by making a transparent region when the luminance value is a value outside the range, and making an opaque region when the luminance value is a value inside the range, wherein the luminance image of the luminance and the opacity is decoded.

17. An image encoding device for when an original image is layered by a front and back relation on an axis of eyes and an opacity of a region as well as a luminance, the device comprising:

a layer image encoding means for inputting a plurality of such layer images and encoding the luminance and the opacity as a layer image code for every layer image, and a layer image decoding means for obtaining a decoded layer image from an output of said layer image encoding means, a synthesizing means for synthesizing said decoded plural layer image by the front and back relation, the luminance and the opacity thereof, and an error image encoding means for determining an error image between said original image and said synthesized image and encoding the error image, and wherein said original image is transmitted as the plurality of layer image codes and the error code between the original image and the synthesizer image.

18. An image decoding device for decoding the output of the image encoding device of claim 17, said image decoding device comprising:

a layer image decoding means for decoding the layer image including the luminance, the opacity, and the front and back relation on the axis of eyes by using the plurality of layer image code, a synthesizing means for forming a synthesized image with said layer image, and an error image decoding means for decoding the error image from the error code and decoding the image by adding the error image to said synthesized image.

19. An image encoding device comprising:

a reference image encoding means for preliminarily recording and transmitting a plurality of reference images, an approximating means for approximating a deviation of positions which is deformation where a luminance is corresponding between an input image and said plurality of reference images as a polynomial function of image coordinates and determining an approximation error, and a minimum distortion reference image-selecting means for determining a reference image having small approximation error among said plurality of reference images and outputting an identifier for the selected reference image and a coefficient of the polynomial function, and wherein a plurality of reference images are encoded by said reference image encoding means and the input image is transmitted as the identifier for said selected reference image and the coefficient of said polynomial function.

20. An image decoding device for decoding the output of the image encoding device of claim 19, said image decoding device comprising:

a reference image decoding means for reconstructing a plurality of reference images in advance, a reference image-selecting means for selecting from said plurality of reference images a reference image corresponding to the identifier of the reference image contained in the output from said reference image decoding means, and a reference image-deforming means for determining the polynomial function of image coordinates on a basis of the coefficient of the polynomial function contained in the output and for deforming said selected reference image by said polynomial function, and wherein an image is decoded by using the reference image deformed by said reference image-deforming means.

21. A motion vector-detecting device comprising:

a superposing means for inputting a plurality of images composed of a luminance and an opacity of a substance, subjecting the opacity to at least one of addition or multiplication of a predetermined value to transform a value range, and forming the luminance image superposed with the luminance and the opacity by adding the transformed value to the luminance, and an image analyzing means for obtaining a correspondence of the partial regions of two images by a correlation of the luminance, and wherein the image composed of the luminance and the opacity is transformed to the image composed only of the luminance by said superposing means, and a correspondence of the partial regions is obtained using said image analyzing means between the transformed plural images.

22. A motion vector-detecting device for expressing a motion vector at an optional position on a screen as a polynomial function of image coordinates comprising:

an error calculating means for calculating a correspondence of the partial regions of two different images as an error with respect to a plurality of partial regions obtained by dividing an image and for determining a deviation between said partial regions which becomes a minimum error and an error value in a vicinity thereof, an error function-calculating means for determining a quadratic error function which makes a deviation a variable from said deviation which becomes said minimum error and the error value in the vicinity thereof, and an optimizing means for expressing a sum total or a partial sum of said quadratic error function with a coefficient of a polynomial function as a variable, and minimizing this sum total of the partial sum with respect to the coefficient, and wherein the motion vector between different images is outputted as the coefficient of the polynomial function.

23. An image encoding method comprising:

predicting an input image from different images, expressing a region with a large prediction error as pattern information with threshold processing of the prediction error, morphing said pattern information by eroding and dilating the region to form a mask pattern, and performing the encoding of the predicted error image based on said mask pattern.

24. An image encoding device comprising:

a means for predicting an input image from different images, a threshold processing means for expressing a region with a large prediction error as pattern information, a morphology means for morphing said pattern information by eroding and then dilating a region to form a mask pattern, and a waveform encoding means for performing encoding for the predicted error image on the basis of said mask pattern.

*25. An image decoding device for reproducing an image divided into plural blocks and including a luminance image block and an opacity image block, said image decoding device comprising:*

*an opacity decoder for decoding an encoded opacity image block to obtain a decoded opacity image block; and*

*a luminance decoder for decoding an encoded luminance image block to obtain a decoded luminance image block, said luminance decoder including*

*a corresponding decoder for decoding a correspondence between a block of an image to be decoded and a reference image block to obtain a decoded correspondence,*

*a formation decoder for forming a predicted image block from the reference image block by using the decoded correspondence,*

*an error image block decoder for obtaining an error image block by decoding an encoded difference of a luminance between a predicted image block and a block of an image to be encoded, and*

*an adder for adding the predicted image block formed by the formation decoder and the error image block obtained by the error image block decoder to obtain a decoded luminance image block.*

* * * * *